(12) United States Patent
Ishizaki et al.

(10) Patent No.: US 10,416,827 B2
(45) Date of Patent: *Sep. 17, 2019

(54) DISPLAY, INPUT DEVICE, AND METHOD OF MANUFACTURING DISPLAY

(71) Applicant: Japan Display Inc., Tokyo (JP)

(72) Inventors: Koji Ishizaki, Tokyo (JP); Hayato Kurasawa, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,331

(22) Filed: Jun. 27, 2018

(65) Prior Publication Data

US 2018/0321768 A1 Nov. 8, 2018

Related U.S. Application Data

(63) Continuation of application No. 15/187,065, filed on Jun. 20, 2016, now Pat. No. 10,031,630.

(30) Foreign Application Priority Data

Jul. 23, 2015 (JP) ................................ 2015-145778

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
CPC ...................... G06F 2203/04103; G06F 3/044
See application file for complete search history.

(56) References Cited

U.S. PATENT DOCUMENTS

| 8,310,460 B2 | 11/2012 | Saitou |
| 8,508,680 B2 | 8/2013 | Geaghan et al. |

(Continued)

FOREIGN PATENT DOCUMENTS

| CN | 101814256 | 8/2010 |
| CN | 104731423 | 6/2015 |

(Continued)

OTHER PUBLICATIONS

Chinese Office Action dated Aug. 10, 2018 in corresponding Chinese Application No. 201610575031.9.

(Continued)

*Primary Examiner* — Afroza Chowdhury
(74) *Attorney, Agent, or Firm* — K&L Gates LLP

(57) ABSTRACT

To provide a display capable of reducing each resistance of a drive electrode and a detection electrode, in the display which is provided with an input device having the drive electrode and the detection electrode formed on the same plane. A drive electrode includes a plurality of first electrode portions arranged in an X-axis direction, and a plurality of first connection portions each of which electrically connects the two first electrode portions adjacent to each other. A detection electrode includes a plurality of second electrode portions arranged in a Y-axis direction, and a plurality of second connection portions each of which electrically connects the two second electrode portions adjacent to each other. The first connection portion overlaps with the second connection portion in a planar view. Each of the first electrode portion and the second electrode portion contains metal or alloy, and has a mesh shape.

6 Claims, 37 Drawing Sheets

(56) References Cited

U.S. PATENT DOCUMENTS

| | | |
|---|---|---|
| 8,704,796 B2 | 4/2014 | Nishitani et al. |
| 9,013,642 B2 | 4/2015 | Ishizaki et al. |
| 9,152,260 B2 | 10/2015 | Chae et al. |
| 9,459,718 B2 | 10/2016 | Ishizaki et al. |
| 9,791,951 B2 | 10/2017 | Ishizaki et al. |
| 2010/0214262 A1 | 8/2010 | Ishizaki |
| 2011/0267297 A1 | 11/2011 | Yamazaki |
| 2011/0310033 A1 | 12/2011 | Liu |
| 2012/0194473 A1 | 8/2012 | Chang et al. |
| 2013/0293096 A1* | 11/2013 | Kang ............... H01H 1/10 313/511 |
| 2014/0049271 A1 | 2/2014 | Trend |
| 2014/0054070 A1 | 2/2014 | Ichiki |
| 2014/0354560 A1 | 12/2014 | Kim |
| 2015/0034472 A1 | 2/2015 | Li |
| 2015/0060125 A1* | 3/2015 | Stevenson ............... G06F 3/044 174/261 |
| 2015/0103276 A1 | 4/2015 | Ishizaki et al. |
| 2016/0117031 A1 | 4/2016 | Han |
| 2016/0139707 A1 | 5/2016 | Nakamura |
| 2016/0179259 A1 | 6/2016 | Watanabe |
| 2017/0024037 A1* | 1/2017 | Ishizaki ............... G06F 3/044 |
| 2017/0371466 A1 | 12/2017 | Ishizaki et al. |

FOREIGN PATENT DOCUMENTS

| | | |
|---|---|---|
| JP | 2010-170163 | 8/2010 |
| JP | 2011-227793 | 11/2011 |
| JP | 2013-206198 | 10/2013 |
| JP | 2013-218647 | 10/2013 |
| JP | 2014-021522 | 2/2014 |
| JP | 2014-085771 | 5/2014 |
| JP | 2014-123371 | 7/2014 |
| JP | 3192845 | 8/2014 |
| JP | 2014-229136 | 12/2014 |
| JP | 2015-069440 | 4/2015 |
| KR | 10-2010-0138964 | 12/2010 |

OTHER PUBLICATIONS

Office Action from related Korean Application No. KR10-2016-0091267; action dated Aug. 22, 2017.

Japanese Office Action dated Mar. 5, 2019 in corresponding Japanese Application No. 2015-145778.

* cited by examiner

DISPLAY, INPUT DEVICE, AND METHOD OF MANUFACTURING DISPLAY

CROSS-REFERENCE TO RELATED APPLICATION

The present application is a continuation of U.S. patent application Ser. No. 15/187,065, filed on Jun. 20, 2016, which application claims priority from Japanese Patent Application No. 2015-145778 filed on Jul. 23, 2015, the content of which is hereby incorporated by reference into this application.

BACKGROUND

The invention relates to a display, an input device, and a method of manufacturing the display.

Recently, there is a technique in which an input device called a touch panel or a touch sensor is mounted to a display plane side of a display, and an input position is detected and output when an input tool such as a finger or a touch pen is in contact with the touch panel to perform an input operation. In addition, an electrostatic capacitance system is one of detection systems to detect a contact position at which the finger or the like is in contact with the touch panel. In a touch panel using the electrostatic capacitance system, a pair of electrodes oppositely arranged with a dielectric layer interposed therebetween, that is, a plurality of capacitive elements formed of a drive electrode and a detection electrode are provided inside a plane of the touch panel. Further, the input position is detected using a fact that electrostatic capacitance of the capacitive element changes when the input tool such as the finger and the touch pen is in contact with the capacitive element to perform the input operation.

There is a touch panel in which a plurality of drive electrodes and a plurality of detection electrodes are formed on the same plane in order to reduce a thickness, for example, of the display provided with such a touch panel. Each of the plurality of drive electrodes includes a plurality of first electrode portions, which are arranged with an interval in a first direction, and each of the plurality of detection electrodes includes a plurality of second electrode portions which are arranged with an interval in a second direction.

For example, Japanese Patent Application Laid-Open Publication No. 2013-218647 (Patent Document 1) describes a technique regarding a conductor pattern structure of an electrostatic capacitive touch panel which is provided with first-axis conductor assemblies having a plurality of first-axis conductive cells arranged on a surface of a rigid substrate, and second-axis conductor assemblies having a plurality of second-axis conductive cells arranged on the surface of the rigid substrate.

For example, Japanese Patent Application Laid-Open Publication No. 2013-206198 (Patent Document 2) describes a technique regarding a touch sensor in which a first electrode pattern has a plurality of first island-shaped electrode portions formed with an interval in a first direction on a substrate, and a second electrode pattern has a plurality of second island-shaped electrode portions formed with an interval in a second direction on the substrate.

For example, Japanese Patent Application Laid-Open Publication No. 2014-85771 (Patent Document 3) describes a technique regarding an electrostatic capacitive touch panel sensor substrate in which first electrodes and second electrodes are arranged in a lattice shape on a transparent substrate, the first electrodes are coupled via a first connection portion to form a first electrode column, and the second electrodes are coupled via a second connection portion to form a second electrode column.

SUMMARY

It is difficult to easily reduce each resistance of the drive electrode and the detection electrode in a case where each of the plurality of first electrode portions included in the drive electrode and each of the plurality of second electrode portions included in the detection electrode are composed of a transparent conductive film made of, for example, indium tin oxide (ITO) or the like. Thus, it is difficult to easily improve detection speed or detection sensitivity in touch detection. Alternatively, when a width dimension of the drive electrode or the detection electrode is widened in order to reduce each resistance of the drive electrode and the detection electrode, positional accuracy of the touch detection is likely to decrease.

The invention has been made in order to solve the above-described problems of the related art, and an object thereof is to provide a display capable of easily reducing each resistance of a drive electrode and a detection electrode, in the display which is provided with an input device having the drive electrode and the detection electrode formed on the same plane.

Of the inventions disclosed in this application, the summaries of the representatives will be explained as below.

A display as one aspect of the present invention includes: a first substrate having a first main surface; a second substrate having a second main surface and a third main surface on an opposite side of the second main surface; a plurality of pixels which are provided on the first main surface of the first substrate; and a plurality of first electrodes and a plurality of second electrodes which are provided on the third main surface of the second substrate. The first main surface of the first substrate is opposite to the second main surface of the second substrate. Each of the plurality of first electrodes is provided along a first direction and is arranged with an interval in a second direction intersecting with the first direction in a planar view. Each of the plurality of second electrodes is provided along the second direction and is arranged with an interval in the first direction in a planar view. Each of the plurality of first electrodes includes: a plurality of first electrode portions which are arranged with an interval in the first direction in a planar view; and a plurality of first connection portions each of which electrically connects the two first electrode portions adjacent to each other in the first direction. Each of the plurality of second electrodes includes: a plurality of second electrode portions which are arranged with an interval in the second direction in a planar view; and a plurality of second connection portions each of which electrically connects the two second electrode portions adjacent to each other in the second direction. Any one of the plurality of first connection portions overlaps with any one of the plurality of second connection portions in a planar view. Each of the plurality of first electrode portions contains metal or alloy, and has a mesh shape, and each of the plurality of second electrode portions contains metal or alloy, and has a mesh shape.

An input device as one aspect of the present invention includes: a first substrate having a first main surface; and a plurality of first electrodes and a plurality of second electrodes which are provided on the first main surface of the first substrate. Each of the plurality of first electrodes is provided along a first direction and is arranged with an interval in a second direction intersecting with the first direction in a planar view. Each of the plurality of second electrodes is provided along the second direction and is arranged with an interval in the first direction in a planar view. Each of the plurality of first electrodes includes: a plurality of first electrode portions which are arranged with an interval in the first direction in a planar view; and a plurality of first connection portions each of which electrically connects the two first electrode portions adjacent to each other in the first direction. Each of the plurality of second electrodes includes: a plurality of second electrode portions which are arranged with an interval in the second direction in a planar view; and a plurality of second connection portions each of which electrically connects the two second electrode portions adjacent to each other in the second direction. Any one of the plurality of first connection portions overlaps with any one of the plurality of second connection portions in a planar view. Each of the plurality of first electrode portions contains metal or alloy, and has a mesh shape, and each of the plurality of second electrode portions contains metal or alloy, and has a mesh shape.

A method of manufacturing a display as one aspect of the present invention includes the steps of: (a) preparing a first substrate having a first main surface; and (b) preparing a second substrate having a second main surface and a third main surface on an opposite side of the second main surface. Further, the method of manufacturing the display includes the steps of: (c) providing a plurality of pixels on the first main surface of the first substrate; (d) providing a plurality of first electrodes and a plurality of second electrodes on the third main surface of the second substrate; and (e) oppositely arranging the first substrate and the second substrate such that the first main surface of the first substrate is opposite to the second main surface of the second substrate. Each of the plurality of first electrodes is provided along a first direction and is arranged with an interval in a second direction intersecting with the first direction in a planar view. Each of the plurality of second electrodes is provided along the second direction and is arranged with an interval in the first direction in a planar view. Each of the plurality of first electrodes includes: a plurality of first electrode portions which are arranged with an interval in the first direction in a planar view; and a plurality of first connection portions each of which electrically connects the two first electrode portions adjacent to each other in the first direction. Each of the plurality of second electrodes includes: a plurality of second electrode portions which are arranged with an interval in the second direction in a planar view; and a plurality of second connection portions each of which electrically connects the two second electrode portions adjacent to each other in the second direction. Any one of the plurality of first connection portions overlaps with any one of the plurality of second connection portions in a planar view. Each of the plurality of first electrode portions contains metal or alloy, and has a mesh shape, and each of the plurality of second electrode portions contains metal or alloy, and has a mesh shape. Additional features and advantages are described herein, and will be apparent from the following Detailed Description and the figures.

BRIEF DESCRIPTIONS OF THE FIGURES

DESCRIPTIONS OF THE PREFERRED EMBODIMENTS

Figure 1:
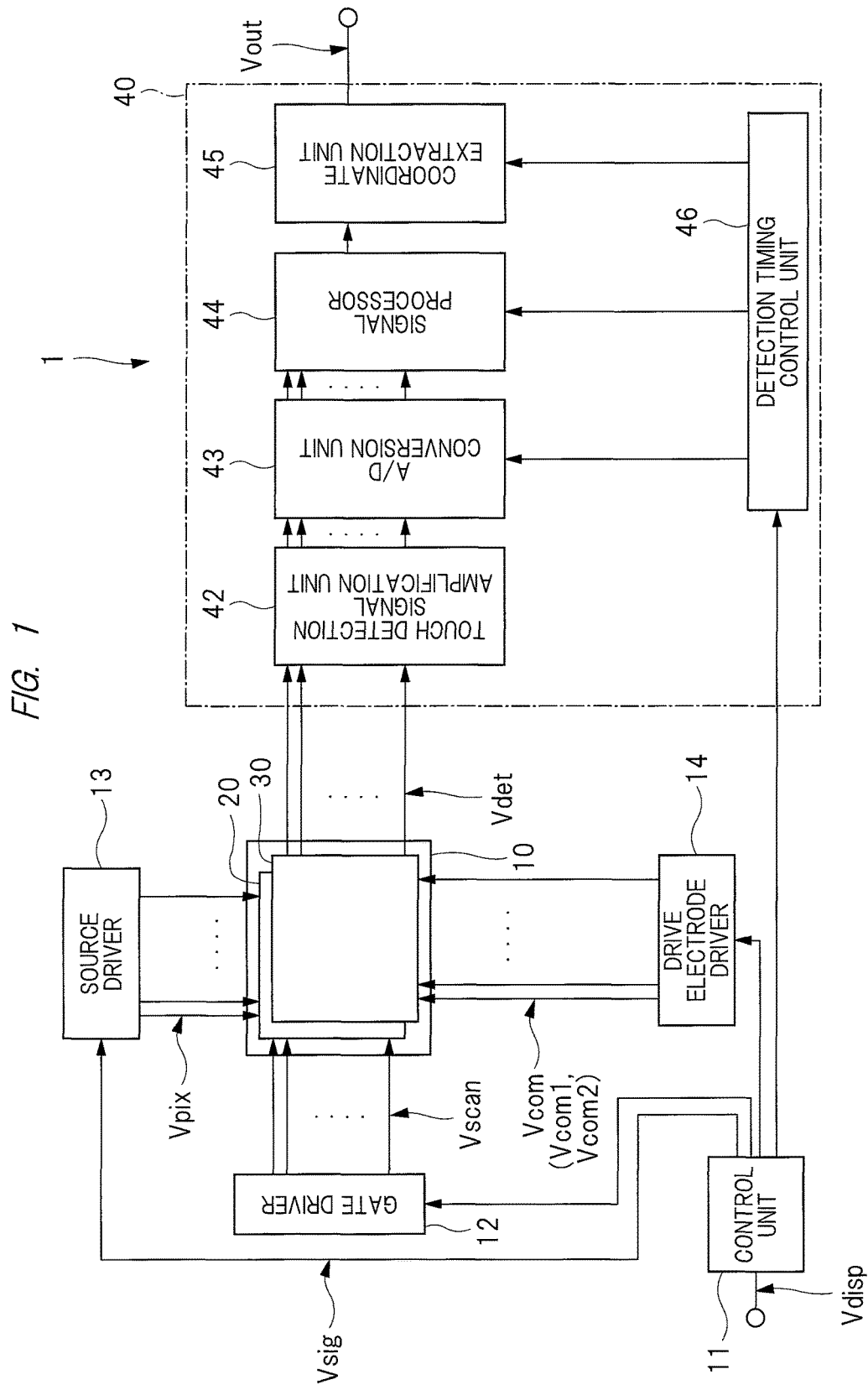
FIG. 1 is a block diagram illustrating a configuration example of a display according to a first embodiment.

Embodiments of the present application will be described below in detail with reference to the drawings.

Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

Further, in a drawing employed in the embodiments, hatching that is attached for distinguishing components may be omitted depending on the drawing.

Further, in the case where a range is indicated as A to B in the following embodiment, it is assumed to be A or more and B or less except for the cases where it is clearly indicated in particular.

First Embodiment

First, a description will be given regarding an example in which a display, which is provided with a touch panel serving as an input device, is applied to a touch detection function-equipped liquid crystal display having an on-cell structure as a first embodiment. Incidentally, the input device indicates an input device to detect at least electrostatic capacitance which changes according to capacitance of an object that is close to or in contact with an electrode in the specification of the present application. Here, a system to detect the electrostatic capacitance includes not only a mutual capacitance system that detects electrostatic capacitance between two electrodes but also a self-capacitance system that detects electrostatic capacitance of one electrode. In addition, the touch detection function-equipped liquid crystal display having the on-cell structure means a touch detection function-equipped liquid crystal display characterized in that any one of a drive electrode and a detection electrode for touch detection is irrelevant to image display using a pixel.

<Overall Configuration>

First, a description will be given regarding an overall configuration of the display according to the first embodiment with reference to FIG. 1. FIG. 1 is a block diagram illustrating a configuration example of the display according to the first embodiment.

The display 1 is provided with a touch detection function-equipped display device 10, a control unit 11, a gate driver 12, a source driver 13, a drive electrode driver 14, and a touch detection unit 40.

The touch detection function-equipped display device 10 includes a display device 20 and a touch detection device 30. The display device 20 is configured as a display device that uses a liquid crystal display element as a display element in this first embodiment. Accordingly, the display device 20 is referred to as the liquid crystal display device 20 in some cases, hereinafter. The touch detection device 30 is a touch detection device of an electrostatic capacitive system, that is, an electrostatic capacitive touch detection device. Thus, the display 1 is a display that is provided with the input device having a touch detection function. In addition, the touch detection function-equipped display device 10 is a display device in which the liquid crystal display device 20 and the touch detection device 30 are integrated.

Incidentally, the display device 20 may be an organic electroluminescence (EL) display device, for example, instead of the display device using the liquid crystal display element.

The display device 20 performs display operation by sequentially scanning horizontal lines one by one in a display area according to a scan signal Vscan supplied from the gate driver 12. The touch detection device 30 operates on the basis of a principle of electrostatic capacitive touch detection, and outputs a detection signal Vdet, as will be described later.

The control unit 11 is a circuit to supply a control signal to each of the gate driver 12, the source driver 13, the drive electrode driver 14, and the touch detection unit 40 based on a video signal Vdisp supplied from outside, and to perform control such that the gate driver 12, the source driver 13, the drive electrode driver 14, and the touch detection unit 40 operate in synchronization with each other.

The gate driver 12 has a function to sequentially select one horizontal line, which is a target of display driving of the touch detection function-equipped display device 10, based on the control signal supplied from the control unit 11.

The source driver 13 is a circuit to supply a pixel signal Vpix to a subpixel SPix (see FIG. 7 to be described later), which is included in the touch detection function-equipped display device 10, based on a control signal of an image signal Vsig supplied from the control unit 11.

The drive electrode driver 14 is a circuit to supply a drive signal Vcom1 as a drive signal Vcom to a drive electrode COML (see FIG. 6 to be described later) included in the liquid crystal display device 20, and to supply a drive signal Vcom2 as the drive signal Vcom to a drive electrode DRV (see FIG. 5 to be described later) included in the touch detection device 30 based on the control signal supplied from the control unit 11.

The touch detection unit 40 is a circuit to detect presence or absence of touch of an input tool such as a finger and a touch pen with respect to the touch detection device 30, that is, a state in which the input tool is in contact with or close to the touch detection device 30, which will be described later, based on the control signal supplied from the control unit 11 and the detection signal Vdet supplied from the touch detection device 30 of the touch detection function-equipped display device 10. Further, the touch detection unit 40 is a circuit to obtain a coordinate of touch, that is, an input position of touch in a touch detection area in the case of the presence of touch. The touch detection unit 40 is provided with a touch detection signal amplification unit 42, an analog/digital (A/D) conversion unit 43, a signal processor 44, a coordinate extraction unit 45, and a detection timing control unit 46.

The touch detection signal amplification unit 42 amplifies the detection signal Vdet that is supplied from the touch detection device 30. The touch detection signal amplification unit 42 may be provided with a low-pass analog filter to eliminate a high-frequency component, that is, a noise component, which is included in the detection signal Vdet, and to remove and output a touch component.

<Principle of Electrostatic Capacitive Touch Detection>

Figure 2:
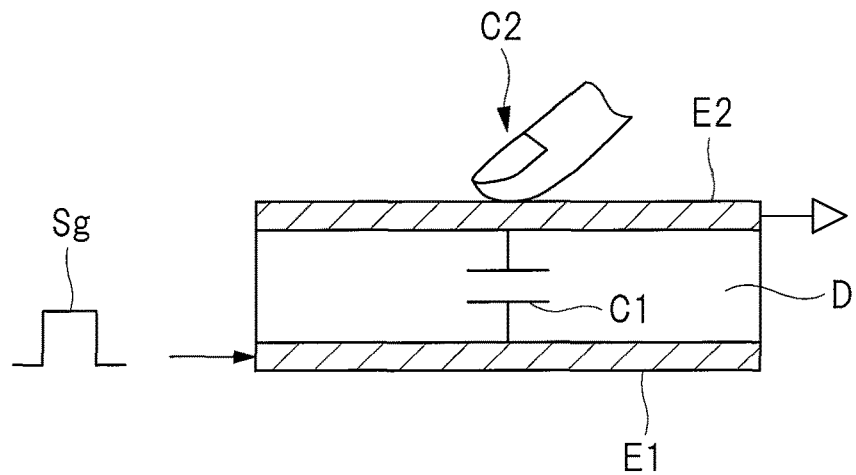
FIG. 2 is an explanatory diagram illustrating a state in which a finger is in contact with or close to a touch detection device.
Figure 3:
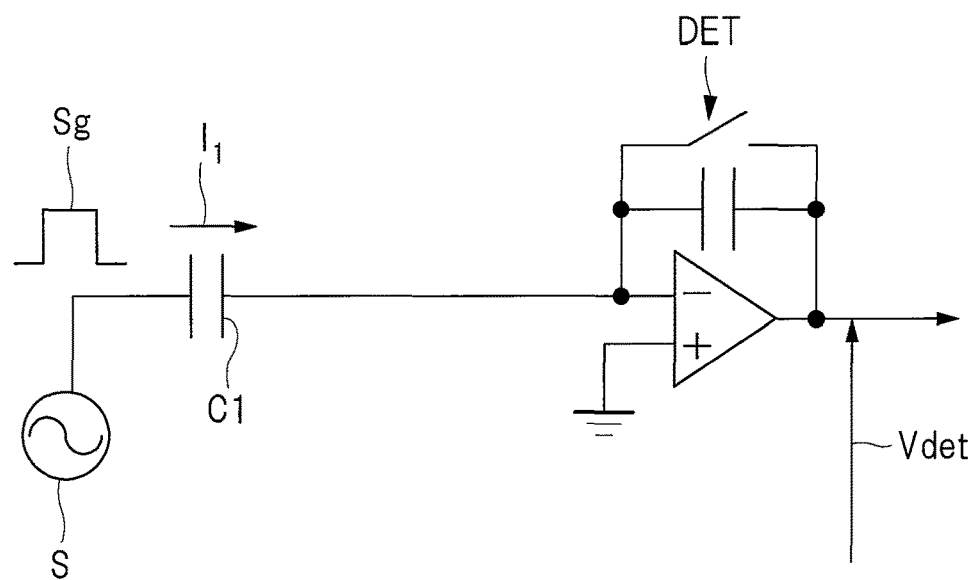
FIG. 3 is an explanatory diagram illustrating an example of an equivalent circuit in the state in which the finger is in contact with or close to the touch detection device.
Figure 4:
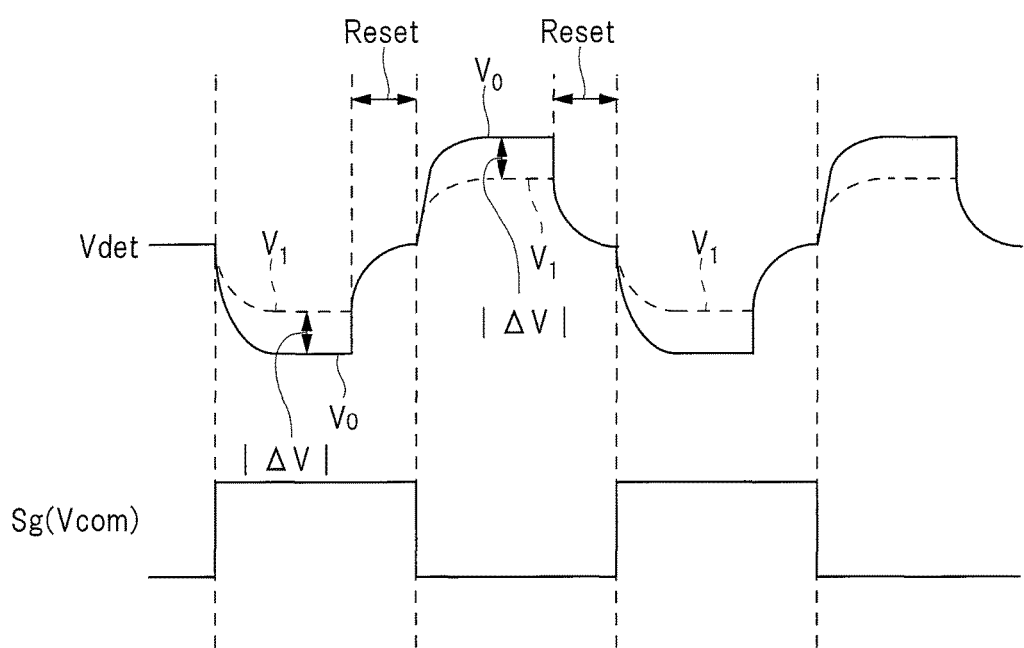
FIG. 4 is a diagram illustrating an example of waveforms of a drive signal and a detection signal.

Next, a description will be given regarding a principle of the touch detection in the display 1 according to the first embodiment with reference to FIGS. 1 to 4. FIG. 2 is an explanatory diagram illustrating a state in which a finger is in contact with or close to the touch detection device. FIG. 3 is an explanatory diagram illustrating an example of an equivalent circuit in the state in which the finger is in contact with or close to the touch detection device. FIG. 4 is a diagram illustrating an example of waveforms of a drive signal and a detection signal.

As illustrated in FIG. 2, the input device, which is called a touch panel or a touch sensor, includes a drive electrode E1 and a detection electrode E2 which are arranged to be opposite to each other with a dielectric body D interposed therebetween in the electrostatic capacitive touch detection. A capacitive element C1 is composed of the drive electrode E1 and the detection electrode E2. As illustrated in FIG. 3, one end of the capacitive element C1 is connected to an AC signal source S which is a drive signal source, and the other end of the capacitive element C1 is connected to a voltage detector DET which is a touch detection unit. The voltage detector DET is configured using an integration circuit, which is included in the touch detection signal amplification unit 42, illustrated in FIG. 1, for example.

When an AC square wave Sg having a frequency of about several kHz to several hundreds kHz, for example, is applied to one end of the capacitive element C1, that is, to the drive electrode E1 from the AC signal source S, the detection signal Vdet, which is an output waveform, is generated via the voltage detector DET connected to the other end of the capacitive element C1, that is, to the detection electrode E2 side. Incidentally, the AC square wave Sg corresponds to the drive signal Vcom illustrated in FIG. 4, for example.

As illustrated in FIG. 3, a current I1 flows in response to a capacitance value of the capacitive element C1 according to charge and discharge with respect to the capacitive element C1 in the state in which the finger is not in contact or close, that is, a non-contact state. The voltage detector DET converts fluctuation of the current $I_1$ in response to the AC square wave Sg into fluctuation of voltage. This fluctuation of voltage is represented by a waveform $V_0$ using a solid line in FIG. 4.

On the other hand, the capacitance value of the capacitive element C1, which is formed of the drive electrode E1 and the detection electrode E2, is decreased by being affected by electrostatic capacitance C2 formed by the finger, in the state in which the finger is in contact or close, that is, a contact state. Thus, the current $I_1$ flowing in the capacitive element C1 illustrated in FIG. 3 fluctuates. The voltage detector DET converts the fluctuation of the current in response to the AC square wave Sg into fluctuation of voltage. This fluctuation of voltage is represented by a waveform $V_1$ using a broken line in FIG. 4. In this case, the waveform $V_1$ has smaller amplitude as compared to the above-described waveform $V_0$. Accordingly, an absolute value $|\Delta V|$ of a voltage difference between the waveform $V_0$ and the waveform $V_1$ varies depending on the influence of the object such as the finger that approaches from the outside. Incidentally, it is preferable that the voltage detector DET be configured to operate with a period Reset in which charge and discharge of the capacitor is reset in accordance with a frequency of the AC square wave Sg through switching inside the circuit in order to accurately detect the absolute value $|\Delta V|$ of the voltage difference between the waveform $V_0$ and the waveform $V_1$.

In the example illustrated in FIG. 1, the touch detection device 30 performs touch detection for each single detection block corresponding to one or a plurality of the drive electrodes DRV (see FIG. 5 or 6 to be described later) according to the drive signal Vcom2 as the drive signal Vcom which is supplied from the drive electrode driver 14. That is, the touch detection device 30 outputs the detection signal Vdet for each single detection block corresponding to the one or each of the plurality of drive electrodes DRV via the voltage detector DET illustrated in FIG. 3, and supplies the output detection signal Vdet to the touch detection signal amplification unit 42 of the touch detection unit 40.

The A/D conversion unit 43 is a circuit that performs sampling of each analog signal to be output from the touch detection signal amplification unit 42 and converts the analog signal into a digital signal at timing synchronized with the drive signal Vcom.

The signal processor 44 is provided with a digital filter that reduces a frequency component other than a frequency with which the sampling of the drive signal Vcom2 is performed, that is, a noise component included in an output signal of the A/D conversion unit 43. The signal processor 44 is a logic circuit that detects the presence or absence of touch with respect to the touch detection device 30 based on the output signal of the A/D conversion unit 43. The signal processor 44 performs to remove only a difference voltage generated by the finger. This difference voltage generated by the finger is the absolute value $|\Delta V|$ of the difference between the waveform $V_0$ and the waveform $V_1$ described above. The signal processor 44 may perform calculation to average the absolute value $|\Delta V|$ per single detection block, and obtain an average value of the absolute value $|\Delta V|$. Accordingly, the signal processor 44 can reduce the influence caused by the noise. The signal processor 44 compares the detected difference voltage generated by the finger with a predetermined threshold voltage, determines as the contact state of an external proximity object that approaches from the outside when the detected difference voltage is equal to or higher than the threshold voltage, and determines as the non-contact state of the external proximity object when the detected difference voltage is lower than the threshold voltage. In this manner, the touch detection in the touch detection unit 40 is performed.

The coordinate extraction unit 45 is a logic circuit that obtains a coordinate of a position at which touch is detected, that is, an input position in the touch panel when the touch is detected in the signal processor 44. The detection timing control unit 46 performs control such that the A/D conversion unit 43, the signal processor 44, and the coordinate extraction unit 45 operate in a synchronized manner. The coordinate extraction unit 45 outputs a touch panel coordinate as a signal output Vout.

<Module>

Figure 5:
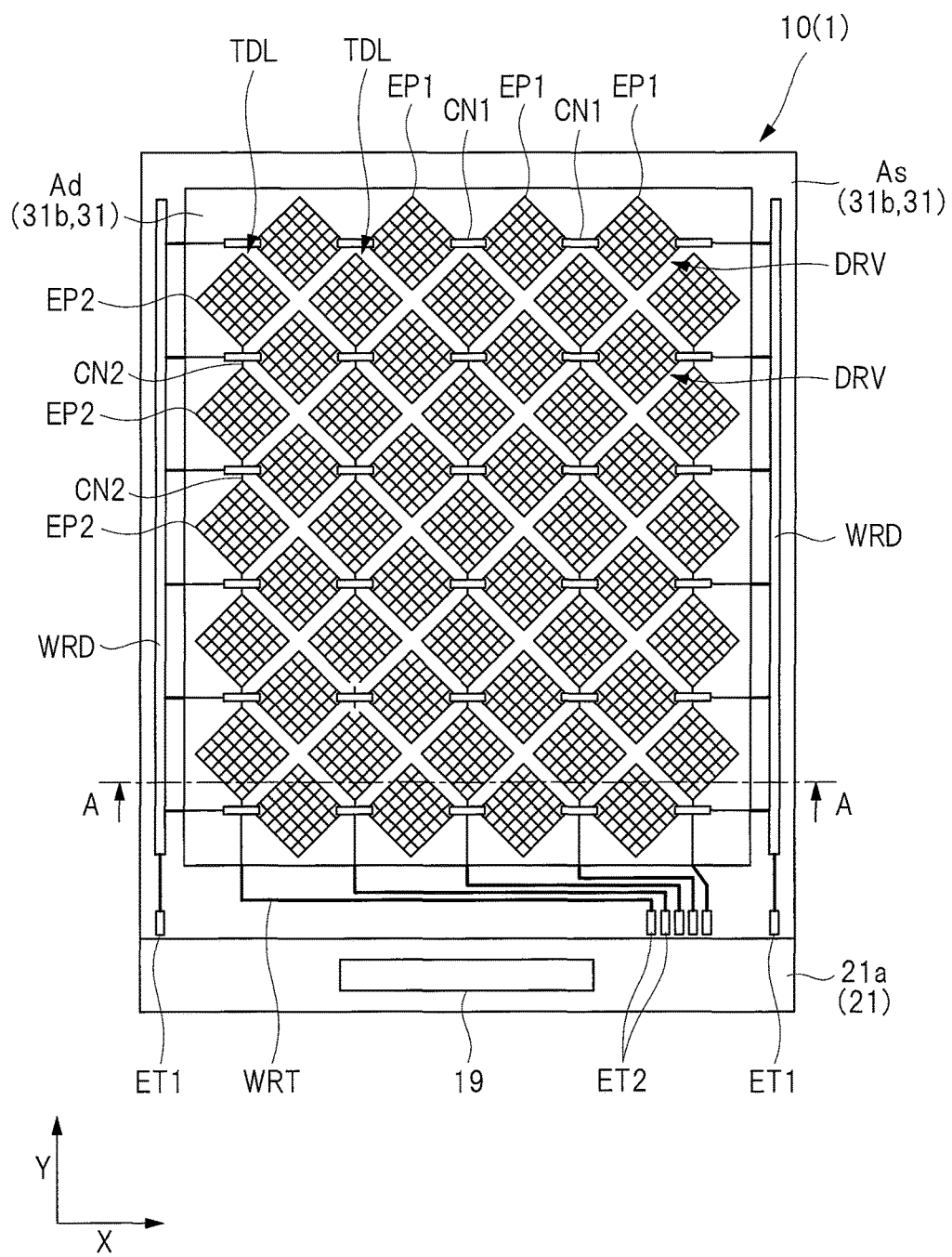
FIG. 5 is a plan view illustrating an example of a module to which the display according to the first embodiment is mounted.

FIG. 5 is a plan view illustrating an example of a module to which the display according to the first embodiment is mounted.

As illustrated in FIG. 5, the touch detection function-equipped display device 10 according to the first embodiment includes a substrate 21, a substrate 31, the plurality of drive electrodes DRV, and a plurality of detection electrodes TDL. The substrate 21 includes an upper surface 21a serving as a main surface, and the substrate 31 includes a lower surface 31a (see FIG. 6 to be described later) serving as one main surface and an upper surface 31b serving as the other main surface on the opposite side of the lower surface. Here, two directions, which intersect with each other, and preferably are orthogonal to each other in the upper surface 31b of the substrate 31, are set as an X-axis direction and a Y-axis direction. At this time, each of the plurality of drive electrodes DRV extends in the X-axis direction, and further, is arranged in the Y-axis direction in a planar view. In addition, each of the plurality of detection electrodes TDL extends in the Y-axis direction, and further, is arranged in the X-axis direction in a planar view.

Incidentally, the expression, "in a planar view" in the specification of the present application means the case of being seen from a direction perpendicular to the upper surface 31b serving as the main surface of the substrate 31.

In the example illustrated in FIG. 5, the touch detection function-equipped display device 10 is provided with two sides, which extend in the X-axis direction and are parallel to each other, and two sides, which extend in the Y-axis direction and are parallel to each other, and has a rectangular shape in a planar view. Electrode terminals ET1 and ET2 are provided on one side of the touch detection function-equipped display device 10 in the Y-axis direction.

The electrode terminal ET1 and the drive electrodes DRV are electrically connected via a routing wiring WRD. The electrode terminal ET1 is electrically connected to a wiring substrate (not illustrated), and the wiring substrate not illustrated is connected to the drive electrode driver 14 (see FIG. 1) which is mounted to the outside of the module. Although not illustrated, the electrode terminal ET1 is electrically connected to an electrode terminal that is formed in the wiring substrate configured using, for example, flexible printed circuits (FPC), via, for example, an anisotropically-conductive film. Accordingly, the drive electrode DRV is connected to the drive electrode driver 14 via the routing wiring WRD, the electrode terminal ET1, and the wiring substrate (not illustrated).

The electrode terminal ET2 and the detection electrode TDL are electrically connected via a routing wiring WRT. The electrode terminal ET2 is electrically connected to a wiring substrate (not illustrated), and the wiring substrate not illustrated is connected to the touch detection unit 40 (see FIG. 1) which is mounted to the outside of the module. Although not illustrated, the electrode terminal ET2 is electrically connected to an electrode terminal that is formed in the wiring substrate composed of, for example, FPC, via, for example, an anisotropically-conductive film. Accordingly, the detection electrode TDL is connected to the touch detection unit 40 via the routing wiring WRT, the electrode terminal ET2, and the wiring substrate (not illustrated).

The touch detection function-equipped display device 10 includes a COG 19. The COG 19 is a chip which is mounted to the substrate 21 and includes the built-in respective circuits, such as the control unit 11, the gate driver 12 and the source driver 13 illustrated in FIG. 1, which are required for a display operation. In addition, the COG 19 may include the built-in drive electrode driver 14.

It is possible to use various types of substrates which are transparent to visible light, for example, a glass substrate, or for example, a film or the like made of resin, as the substrate 21 and the substrate 31. Incidentally, the expression, "transparent to visible light" in the specification of the present application means that the transmittance with respect to the visible light is equal to or higher than, for example, 80□, and the "transmittance with respect to the visible light" means an average value of the transmittance with respect to light having a wavelength of, for example, 380 to 780 nm. In addition, the "transmittance" means a proportion of light that transmits through a surface on the opposite side of a rear surface of the touch detection function-equipped display device 10 in a display area Ad, among light with which the rear surface of the touch detection function-equipped display device 10 (see FIG. 6 to be described later) is irradiated.

<Touch Detection Function-Equipped Display Device>

Figure 6:
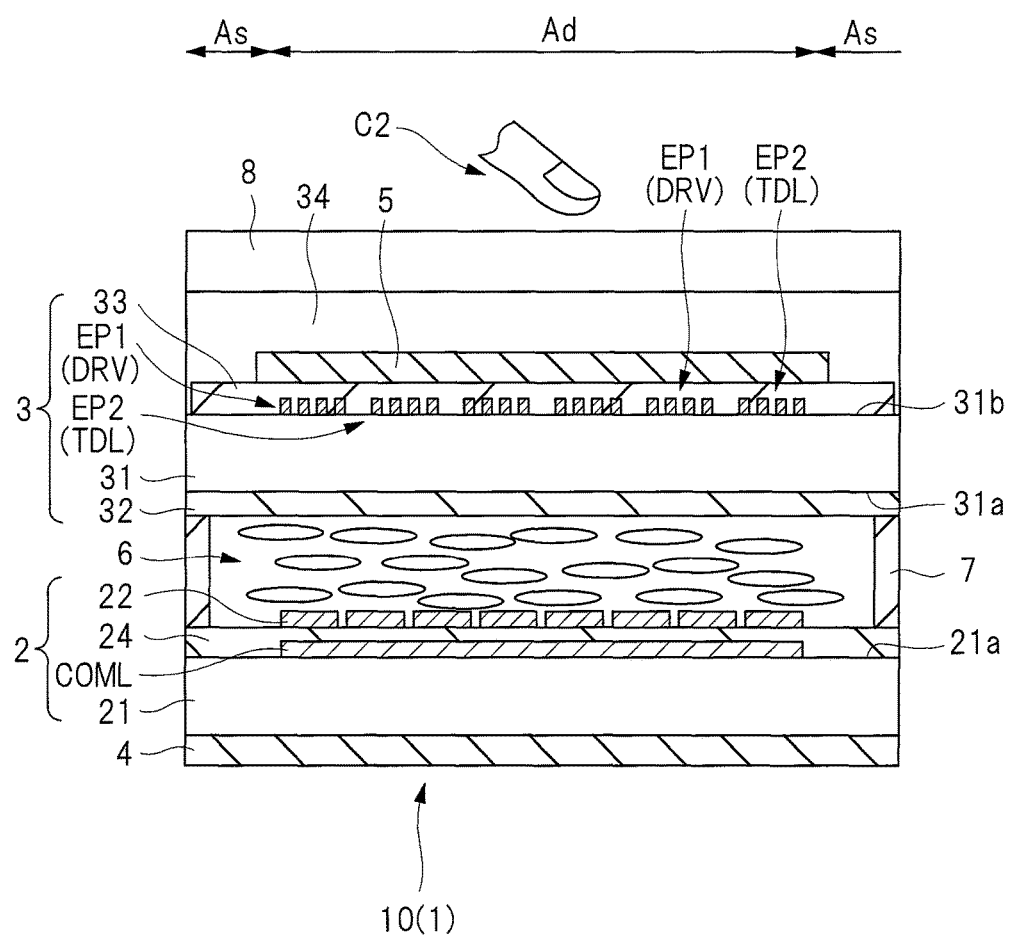
FIG. 6 is a cross-sectional view illustrating a touch detection function-equipped display device of the display according to the first embodiment.
Figure 7:
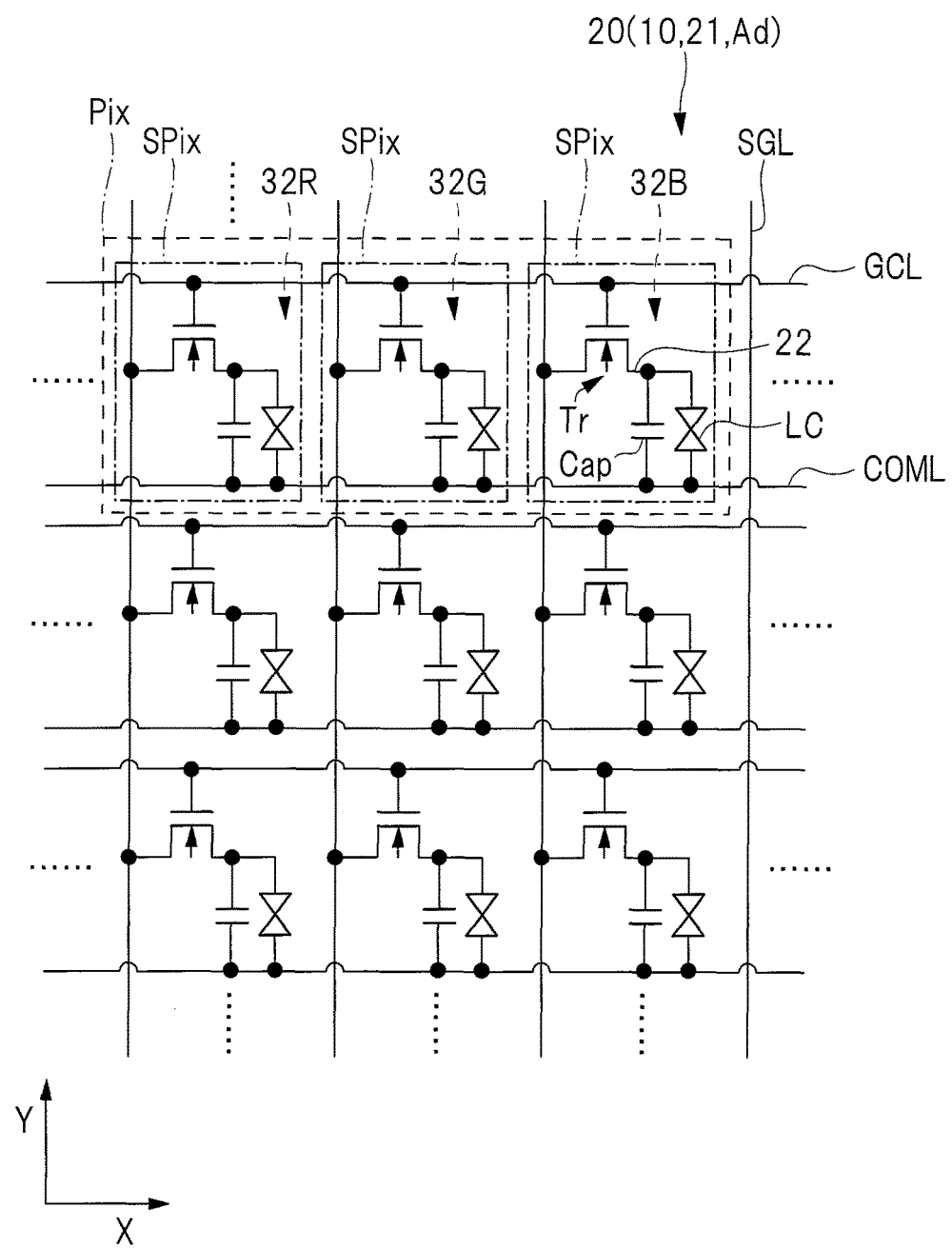
FIG. 7 is a circuit diagram illustrating the touch detection function-equipped display device of the display according to the first embodiment.
Figure 8:
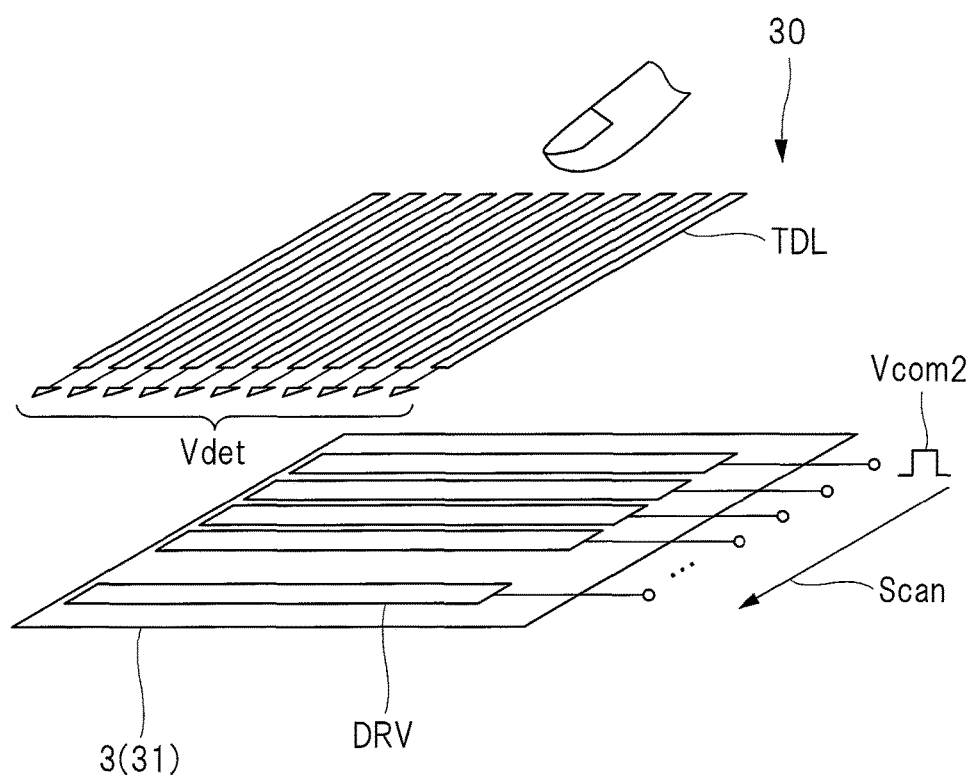
FIG. 8 is a perspective view illustrating a configuration example of a drive electrode and a detection electrode for touch detection in the first embodiment.

Next, a description will be given in detail regarding a configuration example of the touch detection function-equipped display device 10 with reference to FIGS. 5 to 8. FIG. 6 is a cross-sectional view illustrating the touch detection function-equipped display device of the display according to the first embodiment. FIG. 7 is a circuit diagram illustrating the touch detection function-equipped display device of the display according to the first embodiment. FIG. 8 is a perspective view illustrating a configuration example of the drive electrode and the detection electrode for touch detection in the first embodiment. FIG. 6 is the cross-sectional view taken along a line A-A of FIG. 5.

The touch detection function-equipped display device 10 includes an array substrate 2, a counter substrate 3, a polarizing plate 4, a polarizing plate 5, a liquid crystal layer 6, and a sealing portion 7. The counter substrate 3 is arranged to be opposite to the array substrate 2 such that an upper surface, serving as a main surface, of the array substrate 2 and a lower surface, serving as a main surface, of the counter substrate 3 are opposite to each other. The polarizing plate 4 is provided on the opposite side of the counter substrate 3 with the array substrate 2 interposed therebetween. The polarizing plate 5 is provided on the opposite side of the array substrate 2 with the counter substrate 3 interposed therebetween. The liquid crystal layer 6 is provided between the array substrate 2 and the counter substrate 3. That is, the liquid crystal layer 6 is interposed between the upper surface 21a of the substrate 21 and the lower surface 31a of the substrate 31. The sealing portion 7 is provided between an outer peripheral part of the array substrate 2 and an outer peripheral part of the counter substrate 3, and an outer peripheral part of a space between the array substrate 2 and the counter substrate 3 is sealed by the sealing portion 7. Further, the liquid crystal layer 6 is included in the space where the outer peripheral part is sealed by the sealing portion 7.

The array substrate 2 includes the substrate 21. In addition, the counter substrate 3 includes the substrate 31. The substrate 31 includes the lower surface 31a serving as one main surface and the upper surface 31b serving as the other main surface on the opposite side of the lower surface 31a, and is arranged to be opposite to the substrate 21 such that the upper surface 21a serving as the main surface of the substrate 21 and the lower surface 31a serving as the main surface of the substrate 31 are opposite to each other. The substrate 31 has the display area Ad and a surrounding area As serving as areas of the upper surface 31b of the substrate 31. The surrounding area As is an area positioned at the outer peripheral side of the substrate 31 than the display area Ad.

As illustrated in FIG. 7, a plurality of scan lines GCL, a plurality of signal lines SGL, and TFT elements Tr which are a plurality of thin film transistors (TFT) are formed on the substrate 21 in the display area Ad. Incidentally, FIG. 6 does not illustrate the scan line GCL, the signal line SGL, and the TFT element Tr. In addition, the scan line means a gate wiring, and the signal line means a source wiring.

As illustrated in FIG. 7, each of the plurality of scan lines GCL extends in the X-axis direction, and further, is arranged in the Y-axis direction in the display area Ad. Each of the plurality of signal lines SGL extends in the Y-axis direction, and further, is arranged in the X-axis direction in the display area Ad. Accordingly, each of the plurality of signal lines SGL intersects with each of the plurality of scan lines GCL in a planar view. In this manner, in a planar view, the subpixel SPix is arranged at each intersection between the plurality of scan lines GCL and the plurality of signal lines SGL intersecting with each other, and a single pixel Pix is formed of a plurality of the subpixels SPix having different colors. That is, the plurality of subpixels SPix are provided on the upper surface 21a of the substrate 21, and are arranged in the display area Ad to be arranged in a matrix form in the X-axis direction and the Y-axis direction in a planar view.

In a planar view, the TFT element Tr is formed at each intersecting portion at which each of the plurality of scan lines GCL and each of the plurality of signal lines SGL intersect with each other. Accordingly, the plurality of TFT elements Tr are formed on the substrate 21 in the display area Ad, and the plurality of TFT elements Tr are arranged in a matrix form in the X-axis direction and the Y-axis direction. That is, the TFT element Tr is provided in each of the plurality of subpixels SPix. In addition, a liquid crystal element LC is provided in each of the plurality of subpixels SPix in addition to the TFT element Tr.

The TFT element Tr is composed of the thin film transistor serving as, for example, an n-channel metal oxide semiconductor (MOS). A gate electrode of the TFT element Tr is connected to the scan line GCL. One of a source electrode and a drain electrode of the TFT element Tr is connected to the signal line SGL. The other of the source electrode and the drain electrode of the TFT element Tr is connected to one end of the liquid crystal element LC. The liquid crystal element LC has, for example, the one end being connected to the source electrode or the drain electrode of the TFT element Tr and the other end being connected to the drive electrode COML.

As illustrated in FIG. 6, the array substrate 2 includes the substrate 21, the plurality of drive electrodes COML, an insulating film 24, and a plurality of pixel electrodes 22. The plurality of drive electrodes COML are provided on the upper surface 21a serving as one main surface of the substrate 21 in the display area Ad in a planar view. The insulating film 24 is formed on the upper surface 21a of the substrate 21 including each surface of the plurality of drive electrodes COML. The plurality of pixel electrodes 22 are formed on the insulating film 24 in the display area Ad. Accordingly, the insulating film 24 electrically insulates the drive electrode COML from the pixel electrode 22.

As illustrated in FIG. 7, each of the plurality of pixel electrodes 22 is formed inside each of the plurality of subpixels SPix arranged in the matrix form in the X-axis direction and the Y-axis direction in the display area Ad in a planar view. Accordingly, the plurality of pixel electrodes 22 are arranged in a matrix form in the X-axis direction and the Y-axis direction.

In the example illustrated in FIG. 6, each of the plurality of drive electrodes COML is formed between the substrate 21 and the pixel electrode 22. In addition, each of the plurality of drive electrodes COML is provided to overlap with the plurality of pixel electrodes 22 in a planar view, as schematically illustrated in FIG. 7. Further, an image is displayed in the display area Ad when a voltage is applied between each of the plurality of pixel electrodes 22 and each of the plurality of drive electrodes COML, and when an electric field is formed in the liquid crystal element LC which is provided between each of the plurality of pixel electrodes 22 and each of the plurality of drive electrodes COML, that is, in each of the plurality of subpixels SPix. At this time, capacitance Cap is formed between the drive electrode COML and the pixel electrode 22, and the capacitance Cap functions as a retention capacitance.

The liquid crystal display device 20 is formed of the liquid crystal element LC, the plurality of pixel electrodes 22, the drive electrode COML, the plurality of scan lines GCL, and the plurality of signal lines SGL. The liquid crystal display device 20 controls the image display in the display area Ad by controlling the voltage that is applied between each of the plurality of pixel electrodes 22 and each of the plurality of drive electrodes COML. The liquid crystal display device 20 is provided between the substrate 21 and the substrate 31.

Incidentally, each of the plurality of drive electrodes COML may be formed on the opposite side of the substrate 21 with the pixel electrode 22 interposed therebetween. In addition, in the example illustrated in FIG. 6, the arrangement of the drive electrode COML and the pixel electrode 22 is configured as arrangement in a fringe field switching (FFS) mode, as a horizontal electric field mode, in which the drive electrode COML and the pixel electrode 22 overlap with each other in a planar view. However, the arrangement of the drive electrode COML and the pixel electrode 22 may be configured as arrangement in an in plane switching (IPS) mode, as a horizontal electric field mode, in which the drive electrode COML and the pixel electrode 22 do not overlap with each other in a planar view. Alternatively, the arrangement of the drive electrode COML and the pixel electrode 22 may be configured as arrangement in a twisted nematic (TN) mode or a vertical alignment (VA) mode as a vertical electric field mode.

The liquid crystal layer 6 modulates the light passing therethrough according to a state of the electric field, and is formed using a liquid crystal layer that corresponds to the horizontal electric field mode, for example, the FFS mode or the IPS mode described above, or the like. That is, a liquid crystal display device according to the horizontal electric field mode such as the FFS mode or the IPS mode is used as the liquid crystal display device 20. Alternatively, a liquid crystal display device according to the vertical electric field mode such as the TN mode or the VA mode, as described above, may be used. Incidentally, an alignment film may be provided, respectively, between the liquid crystal layer 6 and the array substrate 2, and between the liquid crystal layer 6 and the counter substrate 3 illustrated in FIG. 6.

As illustrated in FIG. 7, the plurality of subpixels SPix arranged in the X-axis direction, that is, the plurality of subpixels SPix that belong to the same row of the liquid crystal display device 20 are connected to each other via the scan line GCL. The scan line GCL is connected to the gate driver 12 (see FIG. 1), and the scan signal Vscan (see FIG. 1) is supplied thereto from the gate driver 12. In addition, the plurality of subpixels SPix arranged in the Y-axis direction, that is, the plurality of subpixels SPix that belong to the same column of the liquid crystal display device 20 are connected to each other via the signal line SGL. The signal line SGL is connected to the source driver 13 (see FIG. 1), and the pixel signal Vpix (see FIG. 1) is supplied thereto from the source driver 13. Further, the plurality of subpixels SPix arranged in the X-axis direction, that is, the plurality of subpixels SPix that belong to the same row of the liquid crystal display device 20 are connected to each other via the drive electrode COML.

The drive electrode COML is connected to the drive electrode driver 14 (see FIG. 1), and the drive signal Vcom1 (see FIG. 1) as the drive signal Vcom is supplied thereto from the drive electrode driver 14. That is, it is configured such that the plurality of subpixels SPix that belong to the same row share the single drive electrode COML in the example illustrated in FIG. 7. Each of the plurality of drive electrodes COML extends in the X-axis direction, and further, is arranged in the Y-axis direction in the display area Ad. Since each of the plurality of scan lines GCL extends in the X-axis direction, and further, is arranged in the Y-axis direction in the display area Ad as described above, each extending direction of the plurality of drive electrodes COML is parallel to each extending direction of the plurality of scan lines GCL. However, each extending direction of the plurality of drive electrodes COML is not limited thereto, and, for example, each extending direction of the plurality of drive electrodes COML may be parallel to each extending direction of the plurality of signal lines SGL.

The gate driver 12 illustrated in FIG. 1 sequentially selects one row, that is, one horizontal line of the subpixels SPix, formed in the matrix form in the liquid crystal display device 20, as a target of display driving by applying the scan signal Vscan to the gate electrode of the TFT element Tr of each of the subpixels SPix via the scan line GCL illustrated in FIG. 7. The source driver 13 illustrated in FIG. 1 supplies the pixel signal Vpix to each of the plurality of subpixels SPix configuring one horizontal line to be sequentially selected by the gate driver 12 via the signal line SGL illustrated in FIG. 7. Further, the display operation is performed according to the supplied pixel signal Vpix, in the plurality of subpixels SPix configuring one horizontal line.

The drive electrode driver 14 illustrated in FIG. 1 applies the drive signal Vcom1 as the drive signal Vcom, and drives the drive electrode COML for each single detection block corresponding to the one or plurality of drive electrodes COML.

The subpixels SPix are sequentially selected for each single horizontal line in the liquid crystal display device 20 as the gate driver 12 is driven to sequentially scan the scan lines GCL in a time division manner. In addition, the display operation is performed for each single horizontal line in the liquid crystal display device 20 as the source driver 13 supplies the pixel signal Vpix with respect to the subpixels SPix belonging to the single horizontal line.

The drive electrode COML in the display according to the first embodiment is a drive electrode for the display operation that operates as a drive electrode of the liquid crystal display device 20. Meanwhile, the display according to the first embodiment includes the drive electrode DRV serving as the drive electrode for touch detection that operates as a drive electrode of the touch detection device 30.

As illustrated in FIG. 8, the touch detection device 30 includes the plurality of drive electrodes DRV provided on the upper surface 31b of the substrate 31 (see FIG. 6) and the plurality of detection electrodes TDL provided on the upper surface 31b of the substrate 31. Each of the plurality of detection electrodes TDL is provided along a direction intersecting with a direction in which each of the plurality of drive electrodes DRV is provided, in a planar view. In other words, the plurality of detection electrodes TDL are arranged to be spaced apart from each other so as to intersect with the plurality of drive electrodes DRV in a planar view. Further, each of the plurality of drive electrodes DRV is provided to overlap with each of the plurality of detection electrodes TDL in a planar view. Further, each of the plurality of detection electrodes TDL is connected to the touch detection signal amplification unit 42 of the touch detection unit 40 (see FIG. 1).

Electrostatic capacitance is generated between each of the plurality of drive electrodes DRV and each of the plurality of detection electrodes TDL. Further, the input position is detected based on the electrostatic capacitance between each of the plurality of drive electrodes DRV and each of the plurality of detection electrodes TDL. That is, a detection unit to detect the input position, that is, the input device is formed of the detection electrode TDL and the drive electrode DRV.

With such a configuration, a single detection block corresponding to the one or plurality of drive electrodes DRV is sequentially selected in a scan direction Scan by the drive electrode driver 14 at the time of performing a touch detection operation in the touch detection device 30. Further, the drive signal Vcom2 for measurement of the electrostatic capacitance between the drive electrode DRV and the detection electrode TDL is input to the drive electrode DRV in the selected detection block, and the detection signal Vdet for detection of the input position is output from the detection electrode TDL. In this manner, the touch detection device 30 is configured such that the touch detection is performed for each single detection block. That is, the single detection block corresponds to the drive electrode E1 in the above-described principle of the touch detection, and the detection electrode TDL corresponds to the detection electrode E2.

As illustrated in FIG. 8, the plurality of drive electrodes DRV and the plurality of detection electrodes TDL, which intersect with each other in a planar view, form an electrostatic capacitive touch sensor arranged in a matrix form. Accordingly, it is possible to detect a position that the finger or the like is in contact with or close to by scanning the entire touch detection plane of the touch detection device 30. That is, the input position is detected in the mutual capacitance system based on the electrostatic capacitance between each of the plurality of drive electrodes DRV and each of the plurality of detection electrodes TDL when a signal for touch detection is input to each of the plurality of drive electrodes DRV. In other words, the input position is detected using a detection value of the drive electrode DRV or the detection electrode TDL based on the signal serving as the drive signal for touch detection.

As illustrated in FIGS. 5 and 6, the counter substrate 3 includes the substrate 31, a color filter 32, the drive electrode DRV, the detection electrode TDL, and a protective film 33.

The substrate 31 includes the lower surface 31a serving as the main surface and the upper surface 31b serving as the main surface on the opposite side of the lower surface 31a, as described above. The color filter 32 is formed on the lower surface 31a of the substrate 31.

The drive electrode DRV and the detection electrode TDL are formed on the upper surface 31b of the substrate 31. The protective film 33 is formed on the upper surface 31b of the substrate 31 so as to cover the drive electrode DRV and the detection electrode TDL. Incidentally, shapes of the drive electrode DRV and the detection electrode TDL will be described later.

Color filters, which are colored with three colors of, for example, red (R), green (G) and blue (B), are arranged in the X-axis direction as the color filter 32. Accordingly, the plurality of subpixels SPix, which correspond to each of three color areas 32R, 32G and 32B of the three colors of R, G and B, are formed, and the single pixel Pix is formed of the plurality of subpixels SPix corresponding to each of one set of the color areas 32R, 32G and 32B, as illustrated in FIG. 7. The pixels Pix are arranged in a matrix form along the extending direction (the X-axis direction) of the scan line GCL and the extending direction (the Y-axis direction) of the signal line SGL. In addition, a region in which the pixels Pix are arranged in the matrix form is the above-described display area Ad, for example. Incidentally, a dummy area provided with a dummy pixel may be provided around the display area Ad.

The combination of colors of the color filter 32 may be a combination of a plurality of colors including colors other than R, G and B. In addition, the color filter 32 is not necessarily provided. Alternatively, the single pixel Pix may include the subpixel SPix in which the color filter 32 is not provided, that is, the white subpixel SPix. In addition, the color filter may be provided in the array substrate 2 using a color filter on array (COA) technique.

As illustrated in FIG. 6, the polarizing plate 5 is provided on the protective film 33. Resin 34 is provided on the polarizing plate 5, and a cover plate 8 is provided on the resin 34. The cover plate 8 is bonded to the polarizing plate 5 by the resin 34.

<Touch Detection Function of Self-Capacitance System>

In the examples illustrated in FIGS. 5, 6 and 8, the description has been given regarding an example in which the touch panel of the mutual capacitance system provided with the drive electrode DRV and the detection electrode TDL is applied as the touch panel. However, it is also possible to apply a touch panel of the self-capacitance system provided only with a detection electrode TDS (see FIG. 9) as the touch panel.

Figure 9:
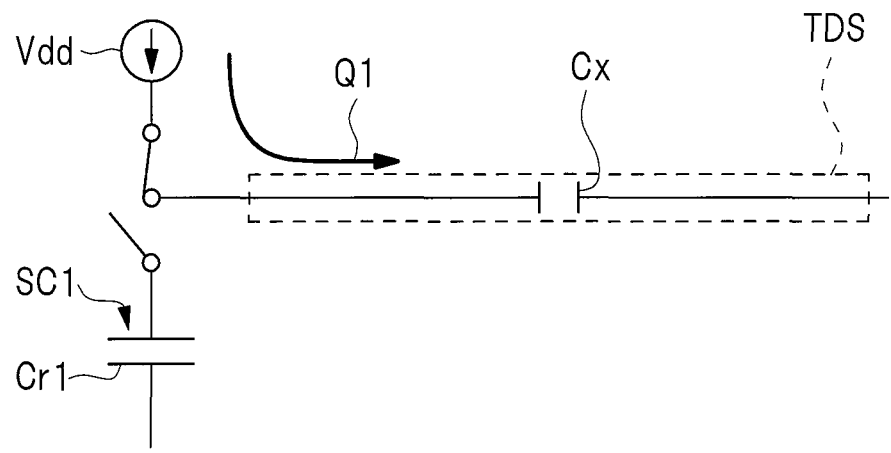
FIG. 9 is an explanatory diagram illustrating an electrically connected state of a detection electrode in a self-capacitance system.
Figure 10:
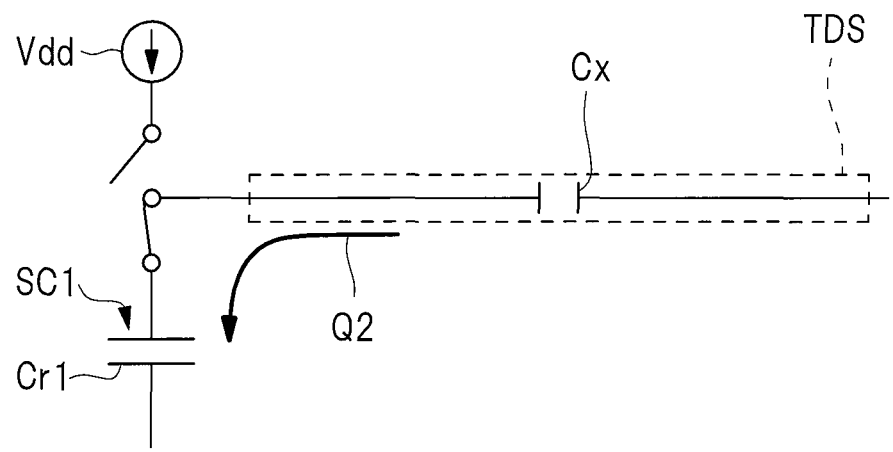
FIG. 10 is an explanatory diagram illustrating the electrically connected state of the detection electrode in the self-capacitance system.

FIGS. 9 and 10 are explanatory diagrams illustrating an electrically connected state of a detection electrode in the self-capacitance system.

As illustrated in FIG. 9, when the detection electrode TDS having electrostatic capacitance Cx is disconnected from a detection circuit SC1 (corresponding to the touch detection unit 40 illustrated in FIG. 1) having electrostatic capacitance Cr1 and is electrically connected to a power supply Vdd, and a charge amount Q1 is accumulated in the detection electrode TDS having the electrostatic capacitance Cx in the touch panel of the self-capacitance system. Next, as illustrated in FIG. 10, when the detection electrode TDS having the electrostatic capacitance Cx is disconnected from the power supply Vdd, and is electrically connected to the detection circuit SC1 having the electrostatic capacitance Cr1, a charge amount Q2 flowing out to the detection circuit SC1 is detected.

Here, the electrostatic capacitance Cx of the detection electrode TDS is changed due to capacitance generated by the finger in a case where the finger is in contact with or close to the detection electrode TDS, and the charge amount Q2 flowing out to the detection circuit SC1 is also changed when the detection electrode TDS is connected to the detection circuit SC1. Accordingly, it is possible to determine whether the finger is in contact with or close to the detection electrode TDS by measuring the flowing-out charge amount Q2 using the detection circuit SC1 and detecting a change in the electrostatic capacitance Cx of the detection electrode TDS.

Here, it is possible to use each of the plurality of drive electrodes DRV (see FIG. 5) as the detection electrode TDS. That is, the input position is detected, based on each electrostatic capacitance of the plurality of drive electrodes DRV when the signal for touch detection is input to each of the plurality of drive electrodes DRV in the self-capacitance system. In other words, the input position is detected, using the detection value of the drive electrode DRV based on the signal serving as the drive signal for touch detection.

<Shapes and Arrangement of Drive Electrode and Detection Electrode for Touch Detection>

Figure 11:
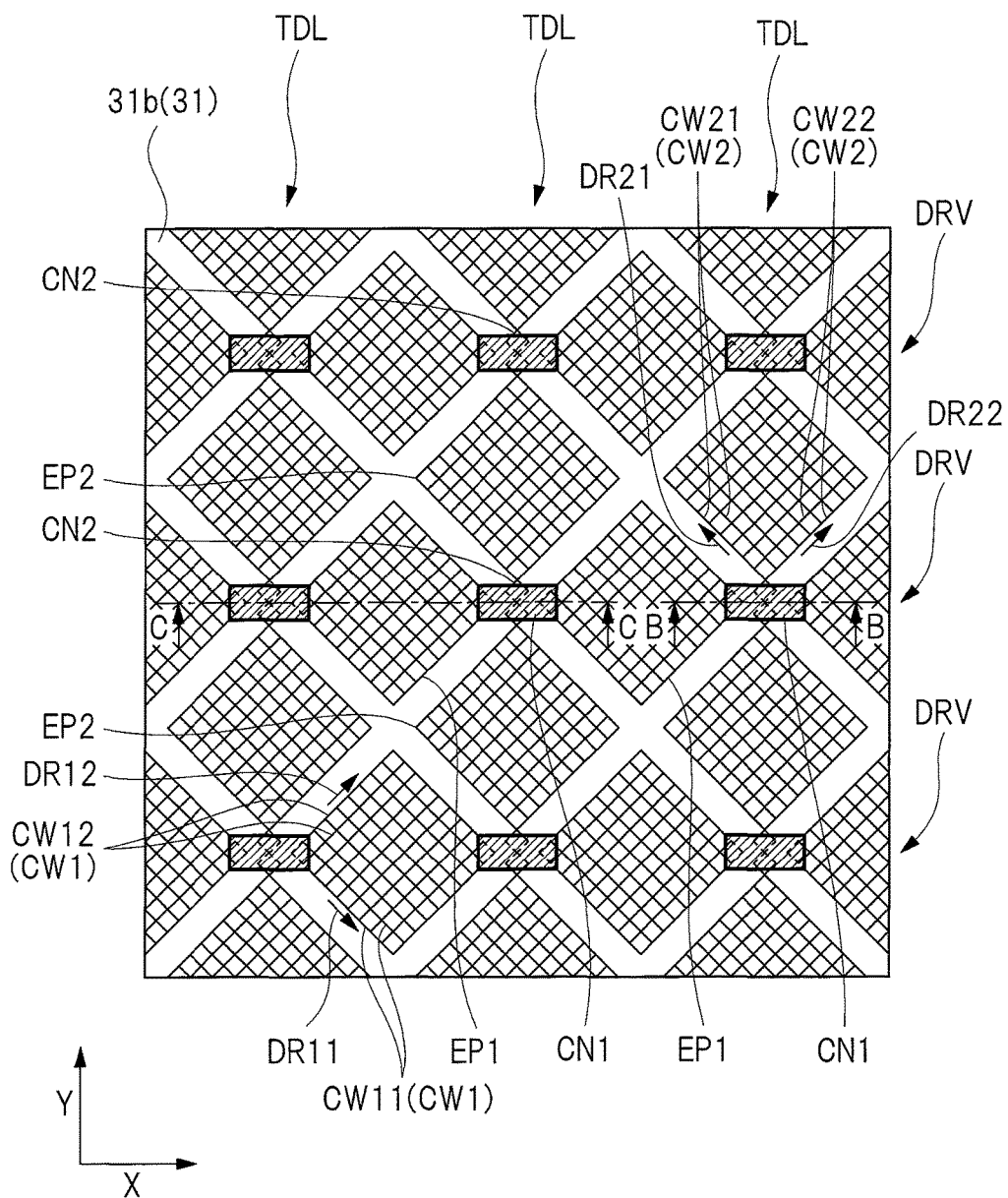
FIG. 11 is a plan view illustrating the drive electrode and the detection electrode for touch detection in the first embodiment.
Figure 12:
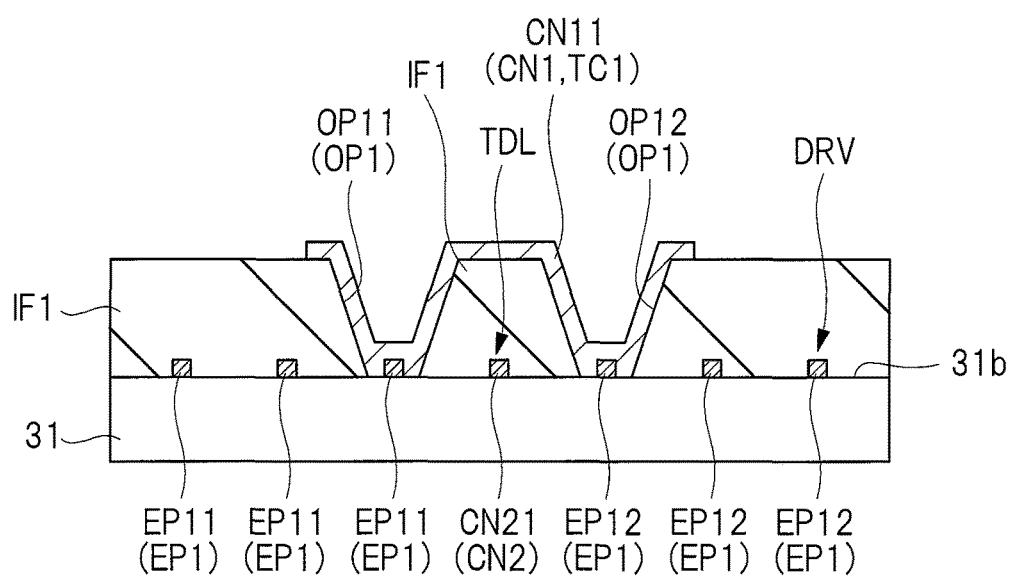
FIG. 12 is a cross-sectional view illustrating the drive electrode and the detection electrode for touch detection in the first embodiment.

Next, a description will be given regarding the shapes and arrangement of the drive electrode and the detection electrode for touch detection. FIG. 11 is a plan view illustrating the drive electrode and the detection electrode for touch detection in the first embodiment. FIG. 12 is a cross-sectional view illustrating the drive electrode and the detection electrode for touch detection in the first embodiment. FIG. 12 is the cross-sectional view taken along a line B-B of FIG. 11.

As the description has been given with reference to FIGS. 5 and 6 described above, the counter substrate 3 in the first embodiment includes the substrate 31, and the plurality of drive electrodes DRV and the plurality of detection electrodes TDL which are provided on the upper surface 31b of the substrate 31 in the display area Ad. Each of the plurality of drive electrodes DRV is the drive electrode of the touch detection device 30, and each of the plurality of detection electrodes TDL is the detection electrode of the touch detection device 30.

As illustrated in FIG. 5, each of the plurality of drive electrodes DRV is provided along the X-axis direction and is arranged with an interval in the Y-axis direction in the display area Ad in a planar view. Each of the plurality of detection electrodes TDL is provided along the Y-axis direction and is arranged with an interval in the X-axis direction in the display area Ad in a planar view. Further, the plurality of drive electrodes DRV intersect with the plurality of detection electrodes TDL in a planar view.

As illustrated in FIGS. 5 and 11, each of the plurality of drive electrodes DRV includes a plurality of electrode portions EP1 and a plurality of connection portions CN1. The plurality of electrode portions EP1 included in each of the plurality of drive electrodes DRV are formed on the upper surface 31b of the substrate 31. The plurality of electrode portions EP1 are arranged with an interval in the X-axis direction in a planar view. Each of the plurality of connection portions CN1 electrically connects the two electrode portions EP1, which are adjacent to each other in the X-axis direction, among the plurality of electrode portions EP1.

As illustrated in FIG. 11, each of the plurality of electrode portions EP1 has a mesh shape formed of a plurality of conductive lines CW11 each of which extends in a direction DR11 and a plurality of conductive lines CW12 each of which extends in a direction DR12 intersecting with direction DR11 in a planar view. In addition, each of the plurality of conductive lines CW11 and the plurality of conductive lines CW12 is a conductive line CW1 containing metal or alloy as the main component. Thus, the electrode portion EP1 has a light shielding property.

Incidentally, the expression, "containing metal or alloy as the main component" means that the content of metal or alloy exceeds 50 wt % (% by weight).

As illustrated in FIGS. 5 and 11, each of the plurality of detection electrodes TDL includes a plurality of the electrode portions EP2 and a plurality of connection portions CN2. The plurality of electrode portions EP2 and the plurality of connection portions CN2, included in each of the plurality of detection electrodes TDL, are formed on the upper surface 31b of the substrate 31. The plurality of electrode portions EP2 are arranged with an interval in the Y-axis direction in a planar view. Each of the plurality of connection portions CN2 electrically connects the two electrode portions EP2, which are adjacent to each other in the Y-axis direction, among the plurality of electrode portions EP2. Incidentally, a description will be given, hereinafter, by exemplifying a case where the connection portion CN2 is formed to be integrated with the electrode portions EP2 on both sides thereof, but the connection portion CN2 may be formed separately from the electrode portions EP2 on both sides thereof. Alternatively, it may be configured such that the connection portion CN2 is not provided, the two electrode portions EP2, which are adjacent to each other in the Y-axis direction, are directly connected to each other, and the connection portion CN1 is arranged to step over part of the electrode portions EP2.

As illustrated in FIG. 11, each of the plurality of electrode portions EP2 has a mesh shape formed of a plurality of conductive lines CW21 each of which extends in a direction DR21 and a plurality of conductive lines CW22 each of which extends in a direction DR22 intersecting with direction DR21 in a planar view. In addition, each of the plurality of conductive lines CW21 and the plurality of conductive lines CW22 is a conductive line CW2 containing metal or alloy as the main component. Thus, the electrode portion EP2 has a light shielding property.

Incidentally, each of the plurality of connection portions CN2 may have a mesh shape formed of a plurality of conductive lines each of which extends in a certain direction and a plurality of conductive lines each of which extends in a direction intersecting with the certain direction in a planar view.

As illustrated in FIGS. 11 and 12, an insulating film IF1 is formed on the upper surface 31b of the substrate 31. The insulating film IF1 covers a connection portion CN21, which serves as any one of the plurality of connection portions CN2 included in each of the plurality of detection electrodes TDL. In addition, the insulating film IF1 covers not only the connection portion CN21, but also electrode portions EP11 and EP12 serving as the two electrode portions EP1, which are arranged on both sides of the connection portion CN21 interposed therebetween and are adjacent to each other in the X-axis direction, among the plurality of electrode portions EP1 included in each of the plurality of drive electrodes DRV. Opening portions OP11 and OP12, which are two opening portions OP1 passing through the insulating film IF1 and reaching each of the two electrode portions EP1, are formed on the insulating film IF1. The opening portion OP11 passes through the insulating film IF1 and reaches the electrode portion EP11, and the opening portion OP12 passes through the insulating film IF1 and reaches the electrode portion EP12.

The connection portion CN11, which serves as any one of the plurality of connection portions CN1 included in each of the plurality of drive electrodes DRV, is formed inside the opening portions OP11 and OP12 and on the insulating film IF1 which is positioned on the connection portion CN21.

The connection portion CN11 overlaps with the connection portion CN21 in a planar view. Meanwhile, preferably, none of the plurality of electrode portions EP1 included in each of the plurality of drive electrodes DRV overlaps with any one of the plurality of electrode portions EP2 included in each of the plurality of detection electrodes TDL in a planar view. Accordingly, the plurality of electrode portions EP1 and the plurality of electrode portions EP2 can be formed on the upper surface 31b of the substrate 31, that is, on the same plane.

The connection portion CN11 steps over the connection portion CN21 via the insulating film IF1 in the first embodiment. In addition, the connection portion CN11 is electrically connected to the electrode portion EP11 exposed at a bottom portion of the opening portion OP11, and is electrically connected to the electrode portion EP12 exposed at a bottom portion of the opening portion OP12. Accordingly, the electrode portion EP11 exposed at the bottom portion of the opening portion OP11 and the electrode portion EP12 exposed at the bottom portion of the opening portion OP12 are electrically connected to each other via the connection portion CN11 stepping over the connection portion CN21.

<Shapes and Arrangement of Drive Electrode and Detection Electrode for Touch Detection in First Comparative Example>

Figure 13:
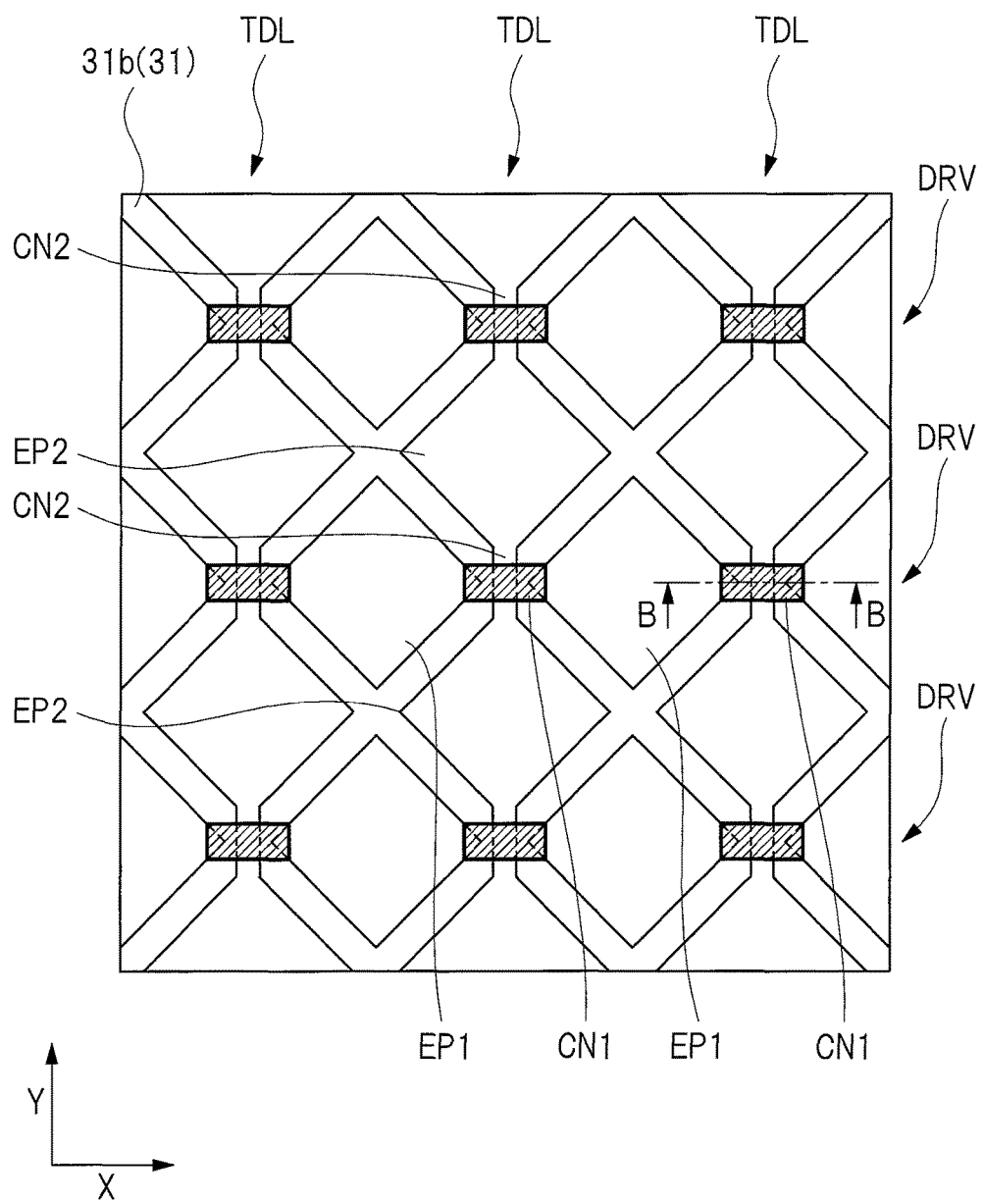
FIG. 13 is a plan view illustrating a drive electrode and a detection electrode for touch detection in a first comparative example.
Figure 14:
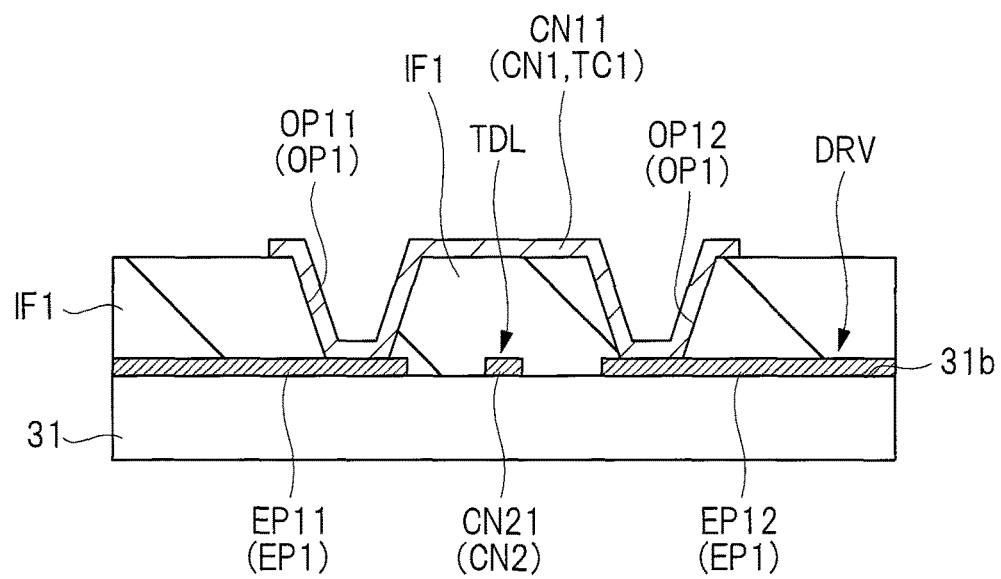
FIG. 14 is a cross-sectional view illustrating the drive electrode and the detection electrode for touch detection in the first comparative example.

Here, a description will be given regarding shapes and arrangement of a drive electrode and a detection electrode for touch detection in the first comparative example. FIG. 13 is a plan view illustrating the drive electrode and the detection electrode for touch detection in the first comparative example. FIG. 14 is a cross-sectional view illustrating the drive electrode and the detection electrode for touch detection in the first comparative example. FIG. 14 is the cross-sectional view taken along a line B-B of FIG. 13.

As with the first embodiment, the counter substrate 3 includes the substrate 31, the plurality of drive electrodes DRV and the plurality of detection electrodes TDL, which are provided on the upper surface 31b of the substrate 31 in the display area Ad (see FIG. 5), and the protective film 33 also in the first comparative example. In addition, as with the first embodiment, each of the plurality of drive electrodes DRV includes the plurality of electrode portions EP1 and the plurality of connection portions CN1, and each of the plurality of detection electrodes TDL includes the plurality of electrode portions EP2 and the plurality of connection portions CN2 also in the first comparative example.

Meanwhile, each of the plurality of electrode portions EP1 is composed of a transparent conductive film formed in an integrated manner, and is not formed using a plurality of conductive lines each of which contains metal or alloy as the main component in the first comparative example, which is different from the first embodiment. In addition, each of the plurality of electrode portions EP2 composed of a transparent conductive film formed in an integrated manner, and is not formed using a plurality of conductive lines each of which contains metal or alloy as the main component in the first comparative example, which is different from the first embodiment.

The transparent conductive film is composed of a conductive material having a light transmitting property with respect to the visible light such as ITO, indium zinc oxide (IZO), or indium gallium oxide (IGO). Meanwhile, electrical resistivity of the transparent conductive film, which is composed of the conductive material having the light transmitting property with respect to the visible light such as the ITO, is about, for example, $10^{-2}$ to $10^{-3}$ Ω/cm, and is larger than electrical resistivity of a light-shield conductive film, which is composed of a conductive material having a light shielding property with respect to the visible light such as metal or alloy, by about 100 to 1000 times, for example. Thus, it is difficult to reduce sheet resistance of the transparent conductive film, which is composed of the conductive material having the light transmitting property such as the ITO, only to about 100 to 200 Ω/square, for example while it is possible to reduce sheet resistance of the light-shield conductive film, which is composed of the conductive material having the light shielding property such as metal or alloy, to be equal to or smaller than about 10 Ω/square, for example.

Incidentally, the expression, "having the light transmitting property, means that the transmittance with respect to the visible light is equal to or higher than 80%, for example, and the "conductive material" means that the electrical resistivity thereof is equal to or smaller than $10^{-3}$ Ω/cm in the specification of the present application. In addition, the "transmittance with respect to the visible light" means an average value of the transmittance with respect to light having a wavelength of, for example, 380 to 780 nm, and the "transmittance of the transparent conductive film" means a proportion of light that transmits even through a rear surface of the transparent conductive film among light with which a surface of the transparent conductive film is irradiated. In addition, the expression, "having the light shielding property" means that the transmittance with respect to the visible light is equal to or lower than, for example, 5%.

It is difficult to easily reduce each resistance of the drive electrode DRV and the detection electrode TDL in the first comparative example described as above. In particular, it is difficult to reduce each resistance of the drive electrode DRV and the detection electrode TDL in the case of widening the display area so as to have a large screen of the display. Thus, it is difficult to narrow a width dimension of the drive electrode DRV in the arrangement direction of the drive electrode DRV, or it is difficult to narrow a width dimension of the detection electrode TDL in the arrangement direction of the detection electrode TDL. Accordingly, it is difficult to improve the visibility of the drive electrode DRV or the detection electrode TDL, or it is difficult to improve the accuracy of touch detection in the arrangement direction of the drive electrode DRV or in the arrangement direction of the detection electrode TDL.

<Main Characteristic and Effect of Present Embodiment>

Meanwhile, each of the plurality of electrode portions EP1 has a mesh shape formed of the plurality of conductive lines CW11 each of which extends in the direction DR11 and the plurality of conductive lines CW12 each of which extends in the direction DR12 intersecting with direction DR11 in a planar view, in the first embodiment. In addition, each of the plurality of electrode portions EP2 has a mesh shape formed of the plurality of conductive lines CW21 each of which extends in the direction DR21 and the plurality of conductive lines CW22 each of which extends in the direction DR22 intersecting with direction DR21 in a planar view. Further, each of the plurality of conductive lines CW11 and the plurality of conductive lines CW12 contains metal or alloy as the main component, and each of the plurality of conductive lines CW21 and the plurality of conductive lines CW22 contains metal or alloy as the main component.

As described above, it is possible to reduce the sheet resistance of the light-shield conductive film, which is composed of the conductive material having the light shielding property such as metal or alloy, to be equal to or smaller than about 10 Ω/square, for example, while it is possible to reduce the sheet resistance of the transparent conductive film, which is composed of the conductive material having the light transmitting property such as the ITO, only to about 100 to 200 Ω/square, for example.

Thus, it is possible to easily reduce each resistance of the drive electrode DRV and the detection electrode TDL in the first embodiment as compared to the first comparative example. In particular, the effect of easily reducing each resistance of the drive electrode DRV and the detection electrode TDL becomes remarkable in the case of widening the display area to acquire the large screen of the display. Thus, it is possible to narrow the width dimension of the drive electrode DRV in the arrangement direction of the drive electrode DRV, and it is possible to narrow the width dimension of the detection electrode TDL in the arrangement direction of the detection electrode TDL. Accordingly, it is possible to improve the visibility in the arrangement direction of the drive electrode DRV or the arrangement direction of the detection electrode TDL, thereby making it possible to improve the accuracy of touch detection.

In addition, when each of the plurality of electrode portions EP1 and the plurality of electrode portions EP2 has a mesh shape, it is possible to improve the visibility of an image to be displayed in the display area by improving the apparent transmittance.

In addition, the plurality of drive electrodes DRV and the plurality of detection electrodes TDL are arranged between the polarizing plate 5 and the subpixel SPix (see FIG. 7) in the first embodiment. Further, although all the plurality of drive electrodes DRV and the plurality of detection electrodes TDL are irrelevant to the image display using the pixels, the touch detection device 30 (see FIG. 8) configured of the plurality of drive electrodes DRV and the plurality of detection electrodes TDL is arranged on the inner side than the polarizing plate 5. A cell structure in this case is referred to as, for example, an on-cell structure.

A case is considered where the touch detection device 30 is arranged at an outer side than the polarizing plate 5. A cell structure in this case is referred to a, for example, an externally mounted structure. However, when the touch detection device 30 is arranged on the outer side than the polarizing plate 5, all of the plurality of drive electrodes DRV and the plurality of detection electrodes TDL are arranged on the opposite side of the subpixels SPix (see FIG. 7) with the polarizing plate 5 interposed therebetween. Thus, when each of the plurality of drive electrodes DRV and the plurality of detection electrodes TDL has a mesh shape formed of the plurality of conductive lines containing metal or alloy as the main component, the plurality of drive electrodes DRV and the plurality of detection electrodes TDL are easily visible, and the visibility of the image to be displayed in the display area decreases.

In addition, when the plurality of drive electrodes DRV and the plurality of detection electrodes TDL are arranged on the opposite side of the subpixels SPix (see FIG. 7) with the polarizing plate 5 interposed therebetween, it is difficult to easily synchronize the display operation of the display device 20 with the touch detection operation using the plurality of drive electrodes DRV and the plurality of detection electrodes TDL. Thus, the touch detection device 30 is likely to be affected by signal noise from the display device 20.

Further, when the plurality of drive electrodes DRV and the plurality of detection electrodes TDL are arranged on the opposite side of the subpixels SPix (see FIG. 7) with the polarizing plate 5 interposed therebetween, it is difficult to enhance alignment accuracy between the plurality of drive electrodes DRV and the plurality of detection electrodes TDL, and the color filter 32. Thus, there is a risk that moire is generated in a case where each of the plurality of drive electrodes DRV and the plurality of detection electrodes TDL has a mesh shape formed of the plurality of conductive lines containing metal or alloy as the main component.

Meanwhile, the plurality of drive electrodes DRV and the plurality of detection electrodes TDL are arranged between the polarizing plate 5 and the subpixel SPix (see FIG. 7) in the first embodiment. Thus, the reflectance of the conductive line is halved and the visibility of the image to be displayed in the display area is improved even in a case where each of the plurality of drive electrodes DRV and the plurality of detection electrodes TDL has a mesh shape formed of the plurality of conductive lines containing metal or alloy as the main component.

In addition, when the plurality of drive electrodes DRV and the plurality of detection electrodes TDL are arranged between the polarizing plate 5 and the subpixel SPix (see FIG. 7), it is possible to easily synchronize the display operation of the display device 20 with the touch detection operation using the plurality of drive electrodes DRV and the plurality of detection electrodes TDL. Thus, the touch detection device 30 is hardly affected by the signal noise from the display device 20.

Further, when the plurality of drive electrodes DRV and the plurality of detection electrodes TDL are arranged between the polarizing plate 5 and the subpixel SPix (see FIG. 7), it is possible to enhance the alignment accuracy between the plurality of drive electrodes DRV and the plurality of detection electrodes TDL, and the color filter 32. Thus, it is possible to suppress the generation of moire even in a case where each of the plurality of drive electrodes DRV and the plurality of detection electrodes TDL has a mesh shape formed of the plurality of conductive lines containing metal or alloy as the main component.

In the first embodiment, any one of the connection portions CN11 among the plurality of connection portions CN1 included in each of the plurality of drive electrodes DRV steps over any one of the connection portions CN21 among the plurality of connection portions CN2 included in each of the plurality of detection electrodes TDL via the insulating film IF1. In addition, each of the plurality of connection portions CN1 included in each of the plurality of drive electrodes DRV is composed of a transparent conductive film TC1, and each of the plurality of connection portions CN2 included in each of the plurality of detection electrodes TDL composed of using a light-shielding film SF1 (see FIG. 15 to be described later) containing metal or alloy as the main component.

Accordingly, the connection portion CN1 composed of the transparent conductive film TC1 steps over the connection portion CN2 composed of the light-shielding film SF1. That is, the electrode portions EP1 and EP2, and the connection portion CN2, which are composed of the light-shielding film SF1, are formed, and then, the connection portion CN1 composed of the transparent conductive film is formed.

Although the transparent conductive film TC1 is composed of the transparent conductive material such as the ITO as described above, the transparent conductive material such as the ITO is also a metal oxide material, has hardness greater than hardness of metal or alloy, and has chemical stability stronger than chemical stability, such as corrosion resistance, of metal or alloy. Thus, it is possible to chemically and mechanically protect the electrode portion EP1 by covering the electrode portion EP1, composed of the light-shielding film SF1 containing metal or alloy as the main component, with the connection portion CN1 composed of the transparent conductive film. That is, the connection portion CN1 formed inside the opening portion OP1 is a protective film that chemically and mechanically protects the electrode portion EP1 exposed at the bottom portion of the opening portion OP1. Thus, it is possible to omit the formation of the protective film 33, as compared to the second modification example of the first embodiment which will be described later with reference to FIGS. 23 and 24 to be described later.

In addition, the insulating film IF1 is composed of an organic film, for example, a photosensitive resist or the like, and thus, it is possible to prevent or suppress damage of the surface of the connection portion CN2 composed of the light-shielding film SF1 containing metal or alloy as the main component.

Incidentally, the electrode terminal ET1 composed of the light-shielding film containing metal or alloy as the main component is also covered by the transparent conductive film, for example, the ITO or the like, also in the electrode terminal ET1 that is connected to the electrode terminal formed in the wiring substrate composed of, for example, the FPC in the first embodiment. Thus, it is possible to chemically and mechanically protect the electrode terminal ET1, thereby making it possible to improve the reliability of the electrode terminal ET1.

<Blackening of Surfaces of Drive Electrode and Detection Electrode>

Figure 15:
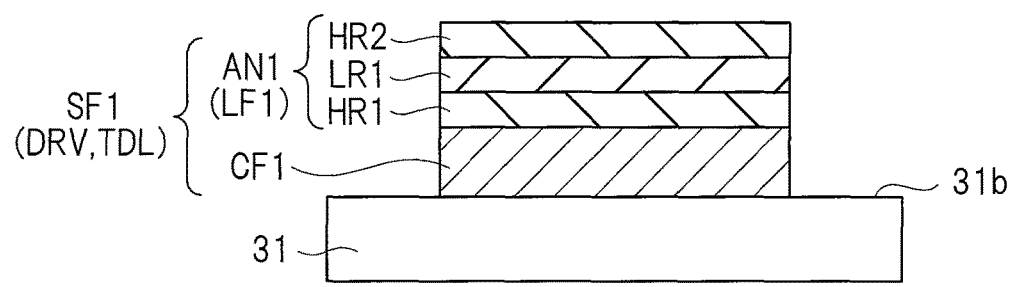
FIG. 15 is a cross-sectional view of a light-shielding film included in the drive electrode or the detection electrode.

Next, a description will be given regarding blackening of surfaces of the drive electrode DRV and the detection electrode TDL. FIG. 15 is a cross-sectional view of the light-shielding film included in the drive electrode or the detection electrode.

In the first embodiment, the plurality of electrode portions EP1 included in each of the plurality of drive electrodes DRV, and the plurality of electrode portions EP2 and the plurality of connection portions CN2 included in each of the plurality of detection electrodes TDL are composed of the light-shielding film SF1 containing metal or alloy as the main component.

Preferably, the light-shielding film SF1 includes a conductive film CF1 and an antireflection film AN1, as illustrated in FIG. 15. The conductive film CF1 is composed of a metal film or an alloy film which is formed on the upper surface 31b of the substrate 31. The antireflection film AN1 is formed on the conductive film CF1, and prevents light from being reflected by an upper surface of the conductive film CF1. Accordingly, it is possible to prevent light from being reflected by each surface of the plurality of drive electrodes DRV and the plurality of detection electrodes TDL, thereby making it possible to enhance the visibility of the image to be displayed in the display area.

It is possible to use a conductive film, which includes a metal layer or an alloy layer made of one or more types of metal selected from a group including molybdenum (Mo), aluminum (Al), silver (Ag), titanium (Ti), copper (Cu), chromium (Cr), and tungsten (W), the conductive film composed of a film with a single layer or a plurality of layers, as the conductive film CF1.

Preferably, the antireflection film AN1 is composed of a stacked film LF1 in which a high refractive index film HR1, a low refractive index film LR1, and a high refractive index film HR2 are stacked in this order. Each refractive index of the high refractive index films HR1 and HR2 is higher than a refractive index of the low refractive index film LR1. Accordingly, for example, the light incident to the antireflection film AN1 is reflected by each interface of the stacked film LF1 and hardly reaches the upper surface of the conductive film CF1, or, for example, the light reflected by the upper surface of the conductive film CF1 is reflected by each interface of the stacked film LF1 and hardly transmits through the antireflection film AN1, and thus, it is possible to prevent the light from being reflected by the upper surface of the conductive film CF1.

Incidentally, each of the plurality of connection portions CN1 (see FIG. 12) included in each of the plurality of drive electrodes DRV is preferably composed of the transparent conductive film TC1, but may be composed of the light-shielding film SF1 (see FIG. 15) as with the electrode portion EP1 (see FIG. 12) (which is also the same in each modification example and a second embodiment described later).

<Method of Manufacturing Drive Electrode and Detection Electrode>

Figure 16:
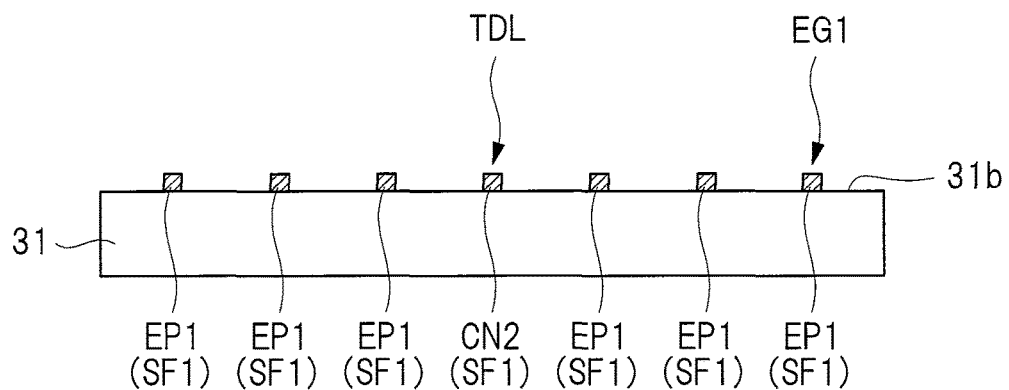
FIG. 16 is a cross-sectional view during a manufacturing process of the drive electrode and the detection electrode in the first embodiment.
Figure 17:
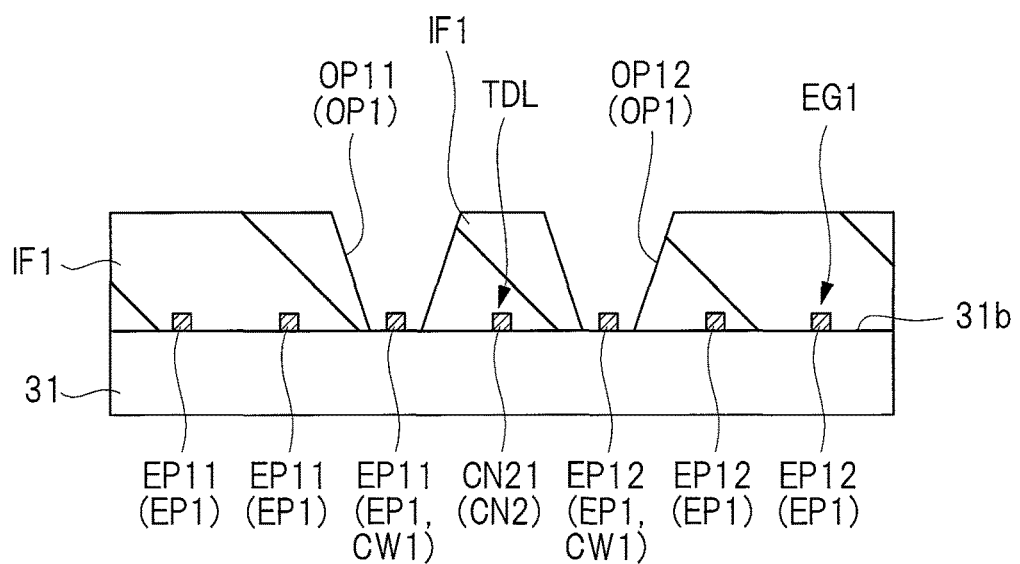
FIG. 17 is a cross-sectional view during a manufacturing process of the drive electrode and the detection electrode in the first embodiment.

Next, a description will be given regarding a method of manufacturing the drive electrode and the detection electrode. FIGS. 16 and 17 are cross-sectional views during a manufacturing process of the drive electrode and the detection electrode in the first embodiment.

First, the substrate 31 is prepared as illustrated in FIG. 16. The substrate 31 includes the lower surface 31a (see FIG. 6) serving as one main surface and the upper surface 31b serving as the other main surface on the opposite side of the lower surface. In addition, the substrate 31 has the display area Ad and the surrounding area As (see FIG. 5) as the areas of the upper surface 31b of the substrate 31. The surrounding area As is the area on the outer peripheral side of the substrate 31 than the display area Ad.

Incidentally, it is possible to use various types of substrate as the substrate 31, for example, the transparent glass substrate, the film made of, for example, resin, or the like, as described above.

Next, the plurality of electrode portions EP1 and the plurality of electrode portions EP2 (see FIG. 11) are formed as illustrated in FIG. 16. In this process, the plurality of electrode portions EP1 included in each of the plurality of drive electrodes DRV (see FIG. 11), and the plurality of electrode portions EP2 (see FIG. 11) and the plurality of connection portions CN2 included in each of the plurality of detection electrodes TDL (see FIG. 11) are formed on the upper surface 31b of the substrate 31 in the display area Ad (see FIG. 5). Incidentally, the routing wirings WRD and WRT (see FIG. 5) may be formed in the surrounding area As.

In the process of forming the plurality of electrode portions EP1 and the plurality of electrode portions EP2 (see FIG. 11), first, the light-shielding film SF1 containing metal or alloy as the main component is deposited on the entire upper surface 31b of the substrate 31. In the process of depositing the light-shielding film SF1, it is possible to deposit the light-shielding film SF1 including, for example, the conductive film CF1 (see FIG. 15) composed of the metal film or the alloy film through, for example, a sputtering method or a chemical vapor deposition (CVD) method. Preferably, it is possible to deposit the conductive film, which includes a metal layer or an alloy layer made of one or more types of metal selected from the group including molybdenum (Mo), aluminum (Al), silver (Ag), titanium (Ti), copper (Cu), chromium (Cr), and tungsten (W), the conductive film composed of the film with the single layer or the plurality of layers, as the conductive film CF1.

Incidentally, it is also possible to form the antireflection film AN1 on the conductive film CF1 as described with reference to FIG. 15 described above.

Next, the light-shielding film SF1 is patterned. In the process of patterning the light-shielding film SF1, it is possible to pattern the light-shielding film SF1 using, for example, photolithography and etching.

Accordingly, the plurality of electrode portions EP1 composed of the light-shielding film SF1 are formed, and a plurality of electrode portion groups EG1 including the plurality of electrode portions EP1 are formed. The plurality of electrode portion groups EG1 are arranged with an interval in the Y-axis direction, in a planar view. The plurality of electrode portions EP1, which are included in each of the plurality of electrode portion groups EG1, are arranged with an interval in the X-axis direction in a planar view.

In addition, the plurality of electrode portions EP2 (see FIG. 11) composed of the light-shielding film SF1 and the plurality of connection portions CN2 composed of the light-shielding film SF1 are formed, and the plurality of detection electrodes TDL including the plurality of electrode portions EP2 and the plurality of connection portions CN2 are formed. The plurality of detection electrodes TDL are provided along the Y-axis direction, and further, arranged with an interval in the X-axis direction in a planar view. The plurality of electrode portions EP2, included in each of the plurality of detection electrodes TDL, are arranged with an interval in the Y-axis direction in a planar view, and each of the plurality of connection portions CN2, included in each of the plurality of detection electrodes TDL, electrically connects the two electrode portions EP2 which are adjacent to each other in the Y-axis direction. In addition, each of the plurality of connection portions CN2 is composed of the light-shielding film SF1 containing metal or alloy as the main component, as described above.

That is, it is possible to form the plurality of electrode portions EP1, the plurality of electrode portions EP2, and the plurality of connection portions CN2 through the same process in the first embodiment.

Next, the insulating film IF1 is formed as illustrated in FIG. 17. In the process of forming the insulating film IF1, the insulating film IF1, which covers the plurality of electrode portions EP1, the plurality of electrode portions EP2, and the plurality of connection portions CN2, is formed by coating the upper surface 31b of the substrate 31 with a raw material liquid for formation of the insulating film in the display area Ad (see FIG. 5). At this time, the insulating film IF1 covers the connection portion CN21, which serves as any one of the plurality of connection portions CN2. In addition, the insulating film IF1 covers the electrode portions EP11 and EP12 serving as the two electrode portions EP1, which are arranged on both sides of the connection portion CN21 interposed therebetween and are adjacent to each other in the X-axis direction, among the plurality of electrode portions EP1.

It is possible to use, for example, the photosensitive resist as the insulating film IF1, and accordingly, it is possible to easily form the opening portion OP1 using, for example, photolithography as will be described later.

Next, the opening portion OP1 is formed as illustrated in FIG. 17. In the process of forming the opening portion OP1, the insulating film IF1, which is made of, for example, the photosensitive resist is patterned using, for example, the photolithography. Accordingly, it is possible to form the opening portions OP11 and OP12 as the two opening portions OP1 that pass through the insulating film IF1 and reach the electrode portions EP11 and EP12, respectively, serving as the two electrode portions EP1.

Next, the connection portion CN1 is formed as illustrated in FIG. 12.

In the process of forming the connection portion CN1, first, the transparent conductive film TC1 is formed on the upper surface 31b of the substrate 31. To be specific, the transparent conductive film TC1 is formed inside each of the two opening portions OP11 and OP12 and on the insulating film IF1. That is, the transparent conductive film TC1 is formed on the electrode portion EP11 exposed at the bottom portion of the opening portion OP11, and on the electrode portion EP12 exposed at the bottom portion of the opening portion OP12. For example, it is possible to form the transparent conductive film TC1, composed of the transparent conductive material such as ITO, IZO or IGO, through, for example, the sputtering method.

Next, the transparent conductive film TC1 is patterned, and the plurality of connection portions CN1 composed of the transparent conductive film TC1 is formed In the process of forming the connection portion CN1. Each of the plurality of connection portions CN1 is composed of the transparent conductive film TC1. At this time, the plurality of connection portions CN1 are formed such that the connection portion CN11, which serves as any one of the connection portions CN1, steps over the connection portion CN21, which serves as any one of the connection portions CN2, via the insulating film IF1. In addition, the plurality of connection portions CN1 are formed such that the connection portion CN11 electrically connects the two electrode portions EP11 and EP12 exposed at the two opening portions OP11 and OP12, respectively. Further, the plurality of drive electrodes DRV including the plurality of electrode portions EP1 and the plurality of connection portions CN1 are formed.

Meanwhile, the substrate 21, which includes the upper surface 21a serving as the main surface, is prepared as illustrated in FIG. 6. In addition, the plurality of subpixels SPix (see FIG. 7) are provided on the upper surface 21a of the substrate 21. Further, the substrate 21 and the substrate 31 are oppositely arranged such that the upper surface 21a of the substrate 21 and the lower surface 31a of the substrate 31 are opposite to each other, as illustrated in FIG. 6. Thereafter, the liquid crystal layer 6 is included in the space between the array substrate 2 including the substrate 21 and the counter substrate 3 including the substrate 31, and accordingly, the display can be manufactured.

<First Modification Example of Drive Electrode and Detection Electrode for Touch Detection>

Next, a description will be given regarding a first modification example of the drive electrode and the detection electrode for touch detection.

Figure 18:
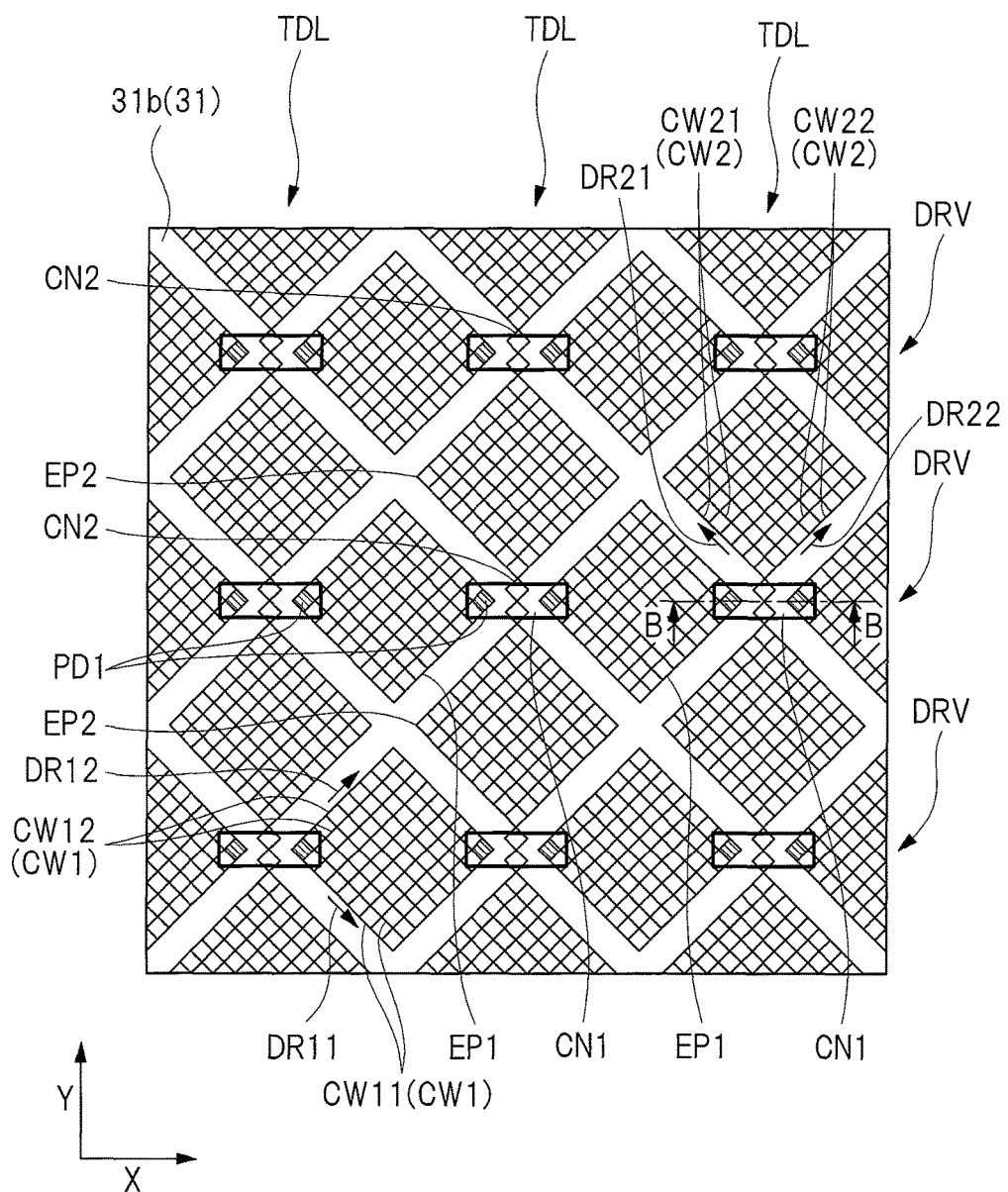
FIG. 18 is a plan view illustrating a drive electrode and a detection electrode for touch detection in a first modification example of the first embodiment.
Figure 19:
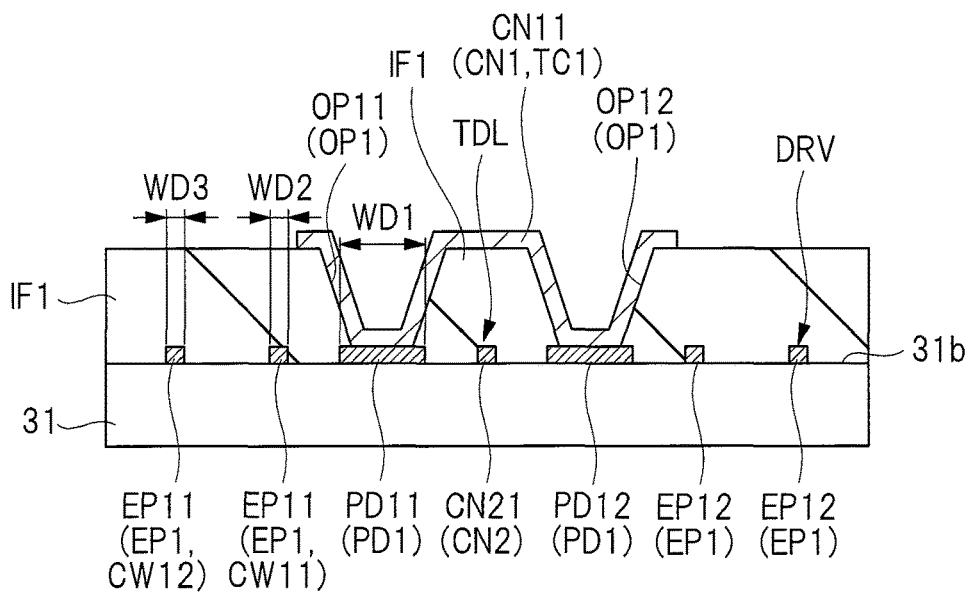
FIG. 19 is a cross-sectional view illustrating the drive electrode and the detection electrode for touch detection in the first modification example of the first embodiment.
Figure 20:
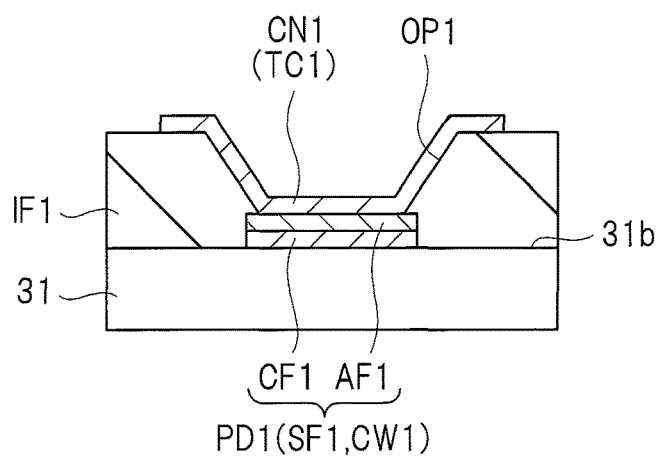
FIG. 20 is a cross-sectional view illustrating the drive electrode and the detection electrode for touch detection in the first modification example of the first embodiment.

FIG. 18 is a plan view illustrating a drive electrode and a detection electrode for touch detection in the first modification example of the first embodiment. FIGS. 19 and 20 are cross-sectional views illustrating the drive electrode and the detection electrode for touch detection in the first modification example of the first embodiment. FIG. 19 is the cross-sectional view taken along a line B-B of FIG. 18. FIG. 20 illustrates a peripheral part of the opening portion OP1 in the cross-section illustrated in FIG. 19 in an enlarged manner.

Each of the plurality of drive electrodes DRV includes a plurality of terminal portions (pedestal portions) PD1 in the first modification example. Each of the plurality of terminal portions PD1 is formed on the upper surface 31b of the substrate 31, and is electrically connected to each of the plurality of electrode portions EP1. To be specific, a terminal portion PD11 serving as the terminal portion PD1, is electrically connected to the electrode portion EP11, and a terminal portion PD12 serving as the terminal portion PD1 is electrically connected to the electrode portion EP12. That is, each of the plurality of connection portions CN1 electrically connects the two terminal portions PD1 each of which is electrically connected to each of the two electrode portions EP1.

As illustrated in FIG. 18, each of the plurality of electrode portions EP1 has a mesh shape that is formed of the plurality of conductive lines CW11 and the plurality of conductive lines CW12 intersecting with each other. In addition, a width WD1 of the terminal portion PD1 in the X-axis direction is wider than a width WD2 of the conductive line CW11 in the X-axis direction and a width WD3 of the conductive line CW12 in the X-axis direction, as illustrated in FIG. 19.

Figure 21:
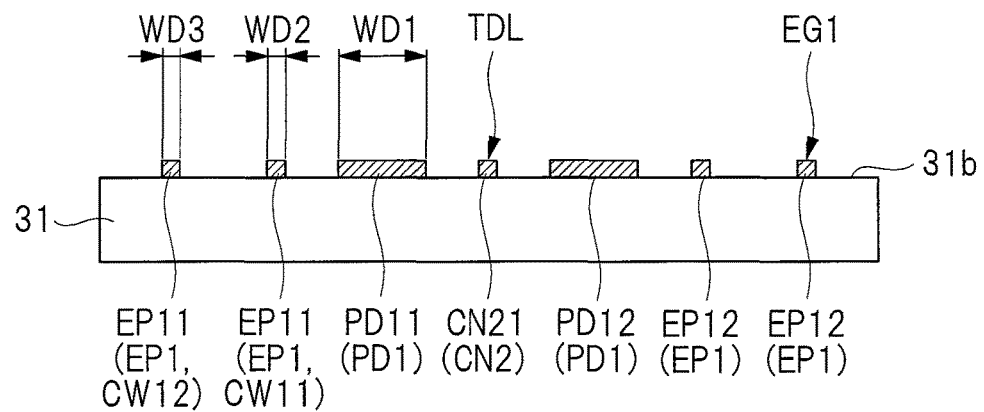
FIG. 21 is a cross-sectional view during a manufacturing process of the drive electrode and the detection electrode in the first modification example of the first embodiment.
Figure 22:
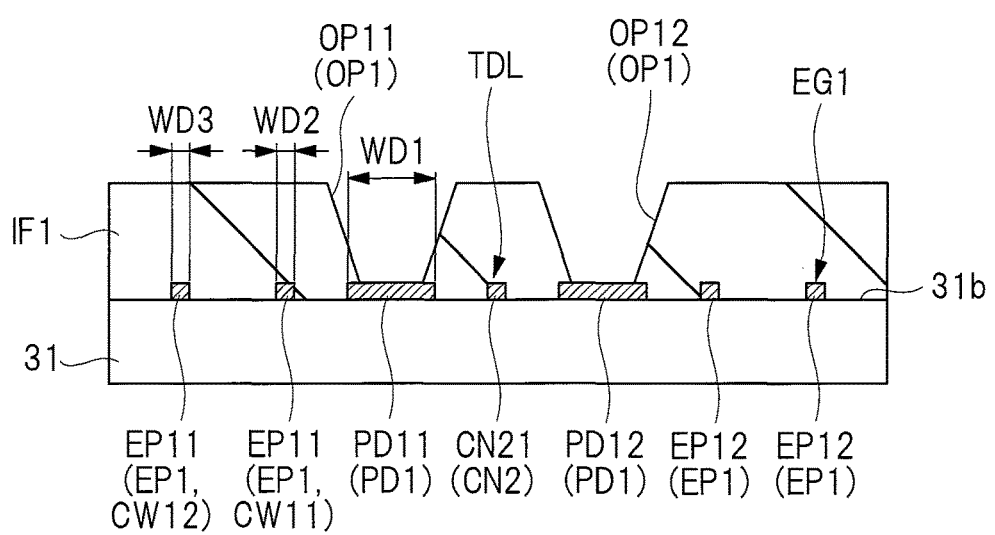
FIG. 22 is a cross-sectional view during a manufacturing process of the drive electrode and the detection electrode in the first modification example of the first embodiment.

FIGS. 21 and 22 are cross-sectional views during a manufacturing process of the drive electrode and the detection electrode in the first modification example of the first embodiment.

In the first modification example, the plurality of electrode portions EP1 are formed, and the plurality of electrode portion groups EG1 including the plurality of electrode portions EP1 are formed, as illustrated in FIG. 21, by performing the same process as the process that has been described with reference to FIG. 16. In addition, the plurality of electrode portions EP2 (see FIG. 18) and the plurality of connection portions CN2 are formed, and the plurality of detection electrodes TDL including the plurality of electrode portions EP2 and the plurality of connection portions CN2 are formed.

On the other hand, the plurality of terminal portions PD1 are formed in addition to the plurality of electrode portions EP1, the plurality of electrode portions EP2 (see FIG. 18), and the plurality of connection portions CN2 in the first modification example, which is different from the first embodiment. That is, the plurality of terminal portions PD1, each of which is electrically connected to each of the plurality of electrode portions EP1 included in each of the plurality of drive electrodes DRV, are formed on the upper surface 31b of the substrate 31. To be specific, the terminal portion PD11 serving as the terminal portion PD1 is electrically connected to the electrode portion EP11, and the terminal portion PD12 serving as the terminal portion PD1 is electrically connected to the electrode portion EP12.

Each of the plurality of electrode portions EP1 included in each of the plurality of drive electrodes DRV has a mesh shape that is formed of the plurality of conductive lines CW11 and the plurality of conductive lines CW12 intersecting with each other. Thus, the width WD1 of the terminal portion PD1 in the X-axis direction is wider than the width WD2 of the conductive line CW11 in the X-axis direction and the width WD3 of the conductive line CW12 in the X-axis direction.

Next, the insulating film IF1 is formed, and the opening portion OP1 is formed, as illustrated in FIG. 22, by performing the same process as the process that has been described with reference to FIG. 17. In the process of forming the opening portion OP1, the insulating film IF1, which is made of, for example, the photosensitive resist is patterned using, for example, the photolithography. Accordingly, it is possible to form the opening portions OP11 and OP12 serving as the two opening portions OP1 that pass through the insulating film IF1 and reach, respectively, the terminal portions PD11 and PD12 serving as the two terminal portions PD1.

Thereafter, the plurality of connection portions CN1 are formed, as illustrated in FIG. 19, by performing the same process as that of the first embodiment. In this process, the plurality of connection portions CN1 are formed such that the connection portion CN11 steps over the connection portion CN21 via the insulating film IF1. In addition, the plurality of connection portions CN1 are formed in this process such that the connection portion CN11 electrically connects the electrode portions EP11 and EP12 serving as the two electrode portions EP1, which are arranged on both sides of the connection portion CN21 interposed therebetween and are adjacent to each other in the X-axis direction, among the plurality of electrode portions EP1. Further, the plurality of drive electrodes DRV including the plurality of electrode portions EP1 and the plurality of connection portions CN1 are formed.

For example, a case is considered where a side surface of the conductive line CW1 included in the electrode portion EP1 is exposed inside the opening portion OP1, as illustrated in FIG. 17, in the process of patterning the insulating film IF1 made of the photosensitive resist using the photolithography. In this case, there is a risk that corrosion of the conductive line CW1 is generated at the time of developing the insulating film IF1 after pattern exposure using developing solution, as electrochemical reaction with the developing solution occurs on a lower surface of the conductive line CW1.

Meanwhile, it is possible to form the opening portion OP1 such that the opening portion OP1 is enclosed in a region in which the terminal portion PD1 is formed, in a planar view, by increasing the plane area of the terminal portion PD1, thereby making it possible to prevent a side surface of the terminal portion PD1 from being exposed at the bottom portion of the opening portion OP1 in the first modification example. Thus, it is possible to prevent or suppress the generation of corrosion of the terminal portion PD1 at the time of developing the insulating film IF1 after pattern exposure using the developing solution in the process of patterning the insulating film IF1 made of, for example, the photosensitive resist using the photolithography.

A case is considered where the light-shielding film SF1 includes the conductive film CF1 and the stacked film LF1 formed on the conductive film CF1, the reflection of light on the upper surface of the conductive film CF1 is prevented or suppressed using the interference of light reflected by each layer boundary of the stacked film LF1, and the surface of the light-shielding film SF1 is blackened as described with reference to FIG. 15 described above. In this case, a condition of interference that is required for the blackening is not satisfied where the connection portion CN1, composed of the transparent conductive film TC1, is stacked on the electrode portion EP1 composed of the light-shielding film SF1, and thus there is a risk that a color tone is deviated from black, or the reflectance of light on the upper surface of the light-shielding film SF1 increases.

Accordingly, it is preferable that the light-shielding film SF1 include the conductive film CF1 and an absorbing film AF1, which is formed on the conductive film CF1 and made of resin having a black color, as illustrated in FIG. 20, for example, in the first embodiment including the first modification example and the following respective modification examples. Accordingly, even in a case where the connection portion CN1 composed of the transparent conductive film TC1 is stacked on the electrode portion EP1 composed of the light-shielding film SF1, it is possible to prevent or suppress the deviation of the color tone from black, and the increase of the reflectance of light on the upper surface of the light-shielding film SF1.

<Second Modification Example of Drive Electrode and Detection Electrode for Touch Detection>

Next, a description will be given regarding the second modification example of the drive electrode and the detection electrode for touch detection.

Figure 23:
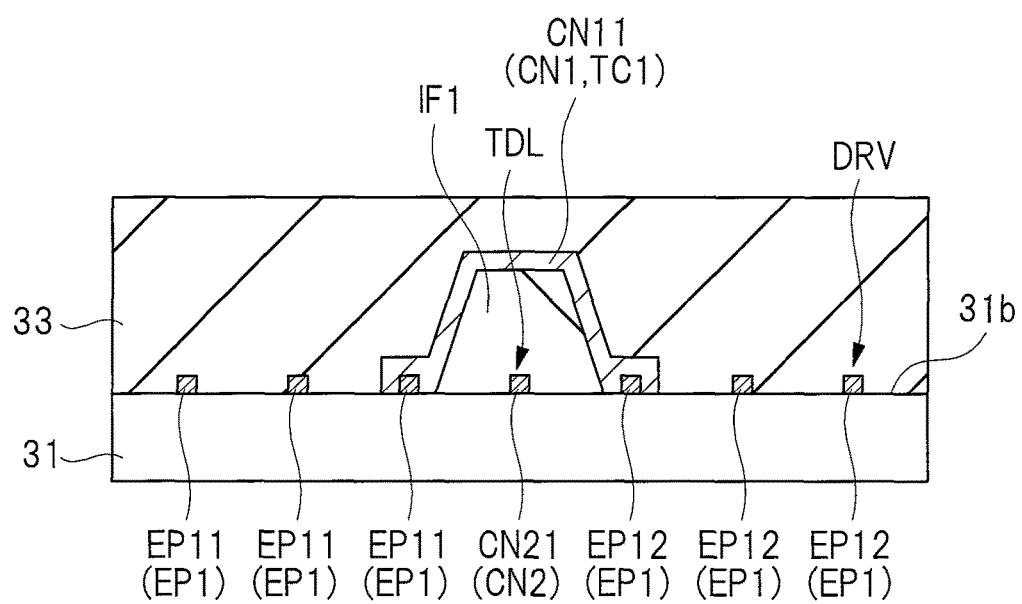
FIG. 23 is a cross-sectional view illustrating a drive electrode and a detection electrode for touch detection in a second modification example of the first embodiment.
Figure 24:
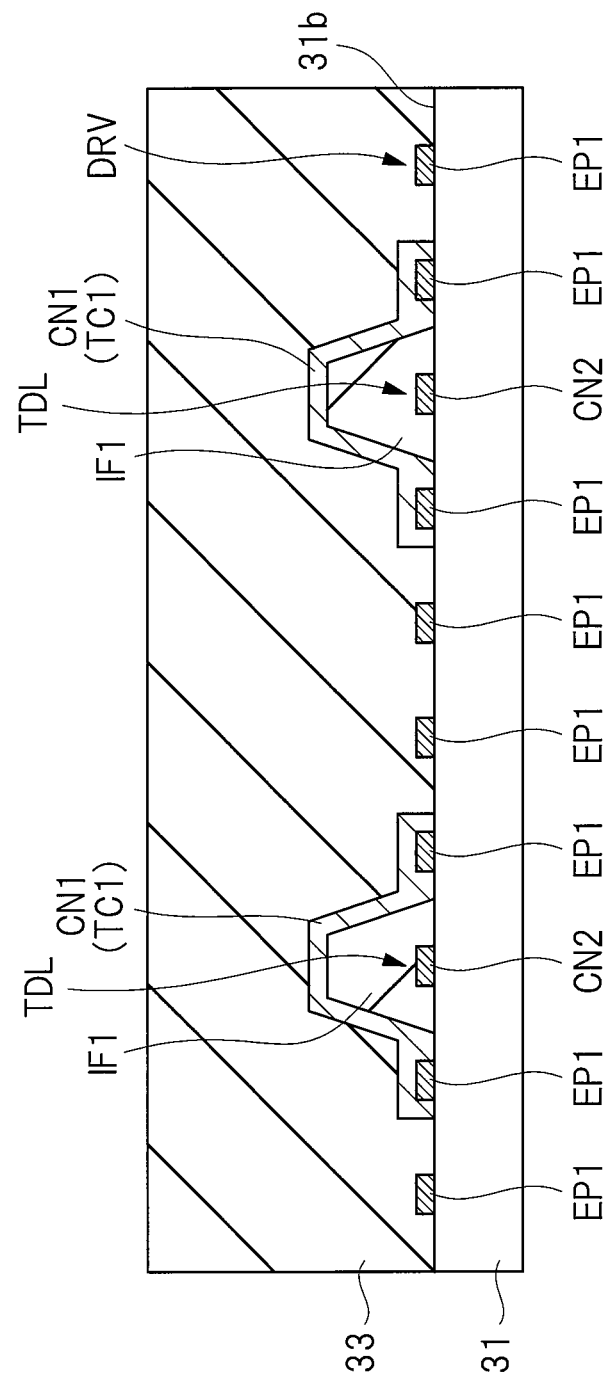
FIG. 24 is a cross-sectional view illustrating the drive electrode and the detection electrode for touch detection in the second modification example of the first embodiment.

FIGS. 23 and 24 are cross-sectional views illustrating a drive electrode and a detection electrode for touch detection in the second modification example of the first embodiment. Incidentally, a plan view illustrating the drive electrode and the detection electrode for touch detection in the second modification example is the same as the plan view illustrating the drive electrode and the detection electrode for touch detection in the first embodiment, which has been described with reference to FIG. 11 described above, and FIG. 23 is the cross-sectional view taken along the line B-B of FIG. 11, and illustrates a cross-section corresponding to one of the connection portions CN1. In addition, FIG. 24 is the cross-sectional view taken along a line C-C of FIG. 11, and illustrates a cross-section corresponding to two of the connection portions CN1.

In the second modification example, the insulating film IF1 to cover the connection portion CN2 is formed through a method of ejecting a raw material liquid for formation of an insulating film as droplets, such as an ink jet method or an electric field jet method. Thus, the insulating film IF1 to cover the electrode portion EP1 is not necessarily formed. Further, the plurality of connection portions CN1 are formed such that the connection portion CN11, which serves as any one of the connection portions CN1, steps over the connection portion CN21, which serves as any one of the connection portions CN2, via the insulating film IF1. In addition, the plurality of connection portions CN1 are formed such that the connection portion CN11 electrically connects the electrode portions EP11 and EP12 serving as the two electrode portions EP1, which are arranged on both sides of any one of the connection portions CN2 interposed therebetween and are adjacent to each other in the X-axis direction, among the plurality of electrode portions EP1.

Since part of the electrode portions EP1 or part of the electrode portions EP2 are covered by neither the insulating film IF1 nor the transparent conductive film TC1 in the second modification example, the protective film 33, which covers the electrode portions EP1 and EP2 (see FIG. 11), the connection portions CN1 and CN2, and the insulating film IF1, is formed on the upper surface 31b of the substrate 31.

Figure 25:
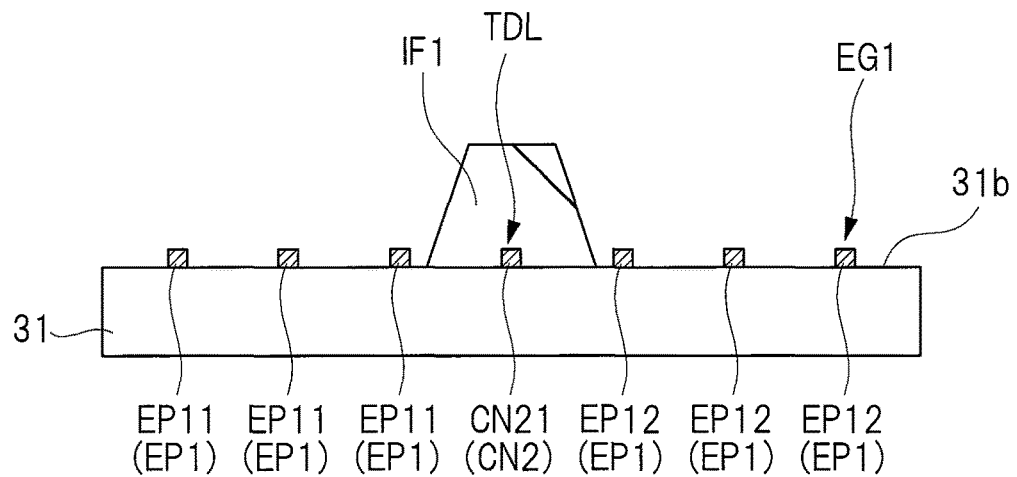
FIG. 25 is a cross-sectional view during a manufacturing process of the drive electrode and the detection electrode in the second modification example of the first embodiment.
Figure 26:
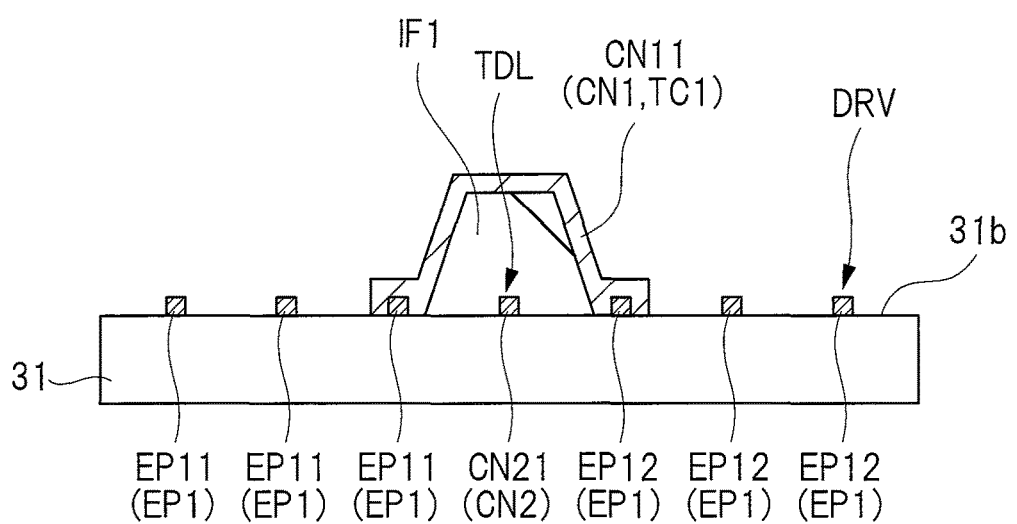
FIG. 26 is a cross-sectional view during a manufacturing process of the drive electrode and the detection electrode in the second modification example of the first embodiment.

FIGS. 25 and 26 are cross-sectional views during a manufacturing process of the drive electrode and the detection electrode in the second modification example of the first embodiment.

In the second modification example, the plurality of electrode portions EP1, the plurality of electrode portions EP2, and the plurality of connection portions CN2 are formed, and the plurality of detection electrodes TDL including the plurality of electrode portions EP2 and the plurality of connection portions CN2 are formed by performing the same process as the process that has been described with reference to FIG. 16. Thereafter, the insulating film IF1 is formed as illustrated in FIG. 25. In the process of forming the insulating film IF1, the upper surface 31b of the substrate 31 in the display area Ad is coated with the raw material liquid for formation of the insulating film by ejecting the liquid as droplets through the ink-jet method or the electric field jet method, and accordingly, a plurality of the insulating films IF1 that cover the connection portion CN21 serving as any one of the plurality of connection portions CN2, are formed. At this time, the electrode portions EP11 and EP12, serving as the two electrode portions EP1, which are arranged on both sides of the connection portion CN21 interposed therebetween and are adjacent to each other in the X-axis direction, among the plurality of electrode portions EP1, are not covered by the insulating film IF1, but exposed from the insulating film IF1.

It is possible to form a resin film, which is made of a UV curable resin or a thermosetting resin such as an acrylic resin, an epoxy resin, or a polyimide resin, as the insulating film IF1. Accordingly, it is possible to use a raw material liquid containing the above-described UV curable resin or thermosetting resin as the raw material liquid for formation of the insulating film.

For example, when the raw material liquid is applied through the ink-jet method, the droplets of the raw material liquid are ejected toward the upper surface 31b of the substrate 31 from a nozzle provided in a nozzle head (not illustrated), which is provided so as to be relatively movable with respect to the substrate 31, by relatively moving the nozzle head in a certain direction with respect to the substrate 31. Accordingly, a coating film is formed by coating the display area Ad with the raw material liquid.

Thereafter, the applied coating film is cured to form the insulating film IF1. In a case where a raw material liquid containing the UV curable resin is used as the raw material liquid, the applied coating film is irradiated with light of UV, that is, UV light to cure the coating film. Alternatively, in a case where a raw material liquid containing the thermosetting resin is used as the raw material liquid, the applied coating film is subjected to heat treatment to cure the coating film. Accordingly, the insulating film IF1, which includes a plurality of dots which are formed as the droplets ejected from the nozzle land on the upper surface 31b of the substrate 31, is formed, and the plurality of insulating films IF1 that covers each of the plurality of connection portions CN2 are formed in the display area Ad.

In a case where the raw material liquid is applied through the method of ejecting the raw material liquid for formation of the insulating film as the droplets, it is unnecessary to perform photolithography and etching in order for patterning, and thus, it is possible to form the insulating film IF1 having a desired pattern without increasing the number of manufacturing processes. In addition, it is unnecessary to prepare a photomask in order for patterning in a case where the raw material liquid is applied through the method of ejecting the raw material liquid for formation of the insulating film as the droplets, and thus, it is possible to reduce a manufacturing cost. In addition, it is possible to efficiently use the raw material liquid in a case where the raw material liquid is applied through the method of ejecting the raw material liquid for formation of the insulating film as the droplets, and thus, it is possible to reduce the manufacturing cost. Further, it is possible to deposit the film under atmospheric pressure, and it is unnecessary to prepare a film deposition device provided with a vacuum chamber in a case where the raw material liquid is applied through the method of ejecting the raw material liquid for formation of the insulating film as the droplets, and thus, it is possible to downsize the film deposition device.

Next, the transparent conductive film TC1 is formed on the upper surface 31b of the substrate 31, the transparent conductive film TC1 is patterned, and the plurality of connection portions CN1, composed of the transparent conductive film TC1, are formed, as illustrated in FIG. 23, by performing the same process as the process that has been described with reference to FIG. 12.

At this time, the transparent conductive film TC1 is formed on each of the plurality of electrode portions EP1 in a process of forming the transparent conductive film TC1. In addition, the plurality of connection portions CN1 are formed such that the connection portion CN11 steps over the connection portion CN21 via the insulating film IF1 in a process of forming the plurality of connection portions CN1. In addition, the plurality of connection portions CN1 are formed such that the connection portion CN11 electrically connects the electrode portions EP11 and EP12 serving as the two electrode portions EP1, which are arranged on both sides of the connection portion CN21 interposed therebetween and are adjacent to each other in the X-axis direction, among the plurality of electrode portions EP1. Further, the plurality of drive electrodes DRV including the plurality of electrode portions EP1 and the plurality of connection portions CN1 are formed.

Thereafter, the protective film 33, which covers the electrode portions EP1 and EP2 (see FIG. 11), the connection portions CN1 and CN2, and the insulating film IF1, is formed on the upper surface 31b of the substrate 31 in the second modification example, as illustrated in FIG. 23, which is different from the first embodiment.

As described above with reference to FIG. 17, for example, a case is considered where the side surface of the conductive line CW1 included in the electrode portion EP1 is exposed inside the opening portion OP1 in the process of patterning the insulating film IF1 made of the photosensitive resist using the photolithography. In this case, there is a risk that the corrosion of the conductive line CW1 is generated at the time of developing the insulating film IF1 after pattern exposure using the developing solution, as the electrochemical reaction with the developing solution occurs mainly on the lower surface of the conductive line CW1. Thus, there is a need to form the terminal portion PD1 (see FIG. 18) in some cases depending on the material of the light-shielding film SF1 (see FIG. 15), as described in the first modification example of the first embodiment.

On the other hand, it is unnecessary to develop the insulating film IF1 using the developing solution since the insulating film IF1 is formed through the ink-jet method or the electric field jet method in the second modification example. Thus, it is possible to prevent the generation of corrosion of the conductive line CW1, caused by the developing solution, in the process of forming the insulating film IF1. Thus, it is unnecessary to form the terminal portion PD1 regardless of the material of the light-shielding film SF1 (see FIG. 15).

<Third Modification Example of Drive Electrode and Detection Electrode for Touch Detection>

Next, a description will be given regarding the third modification example of the drive electrode and the detection electrode for touch detection.

Figure 27:
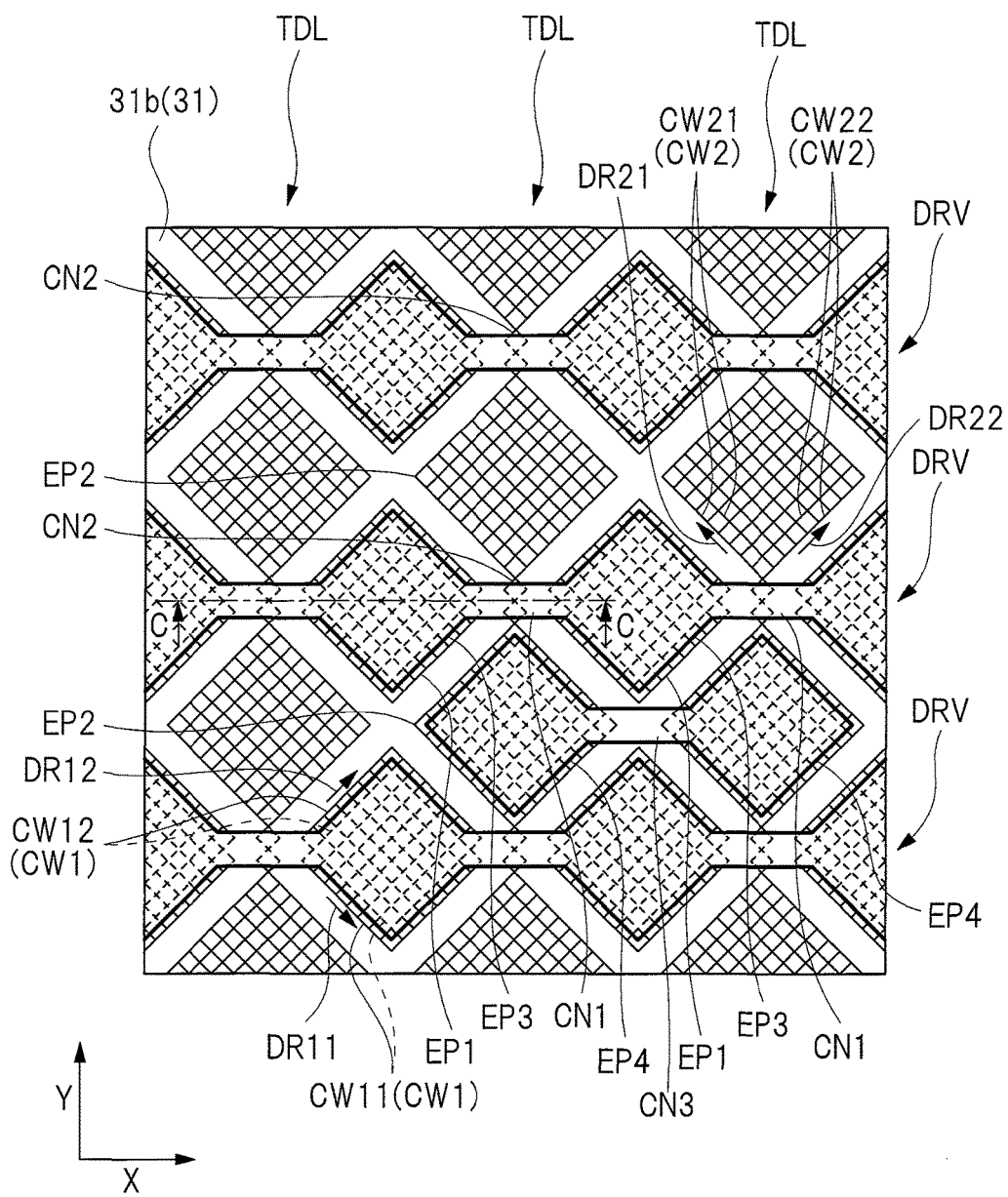
FIG. 27 is a plan view illustrating a drive electrode and a detection electrode for touch detection in a third modification example of the first embodiment.
Figure 28:
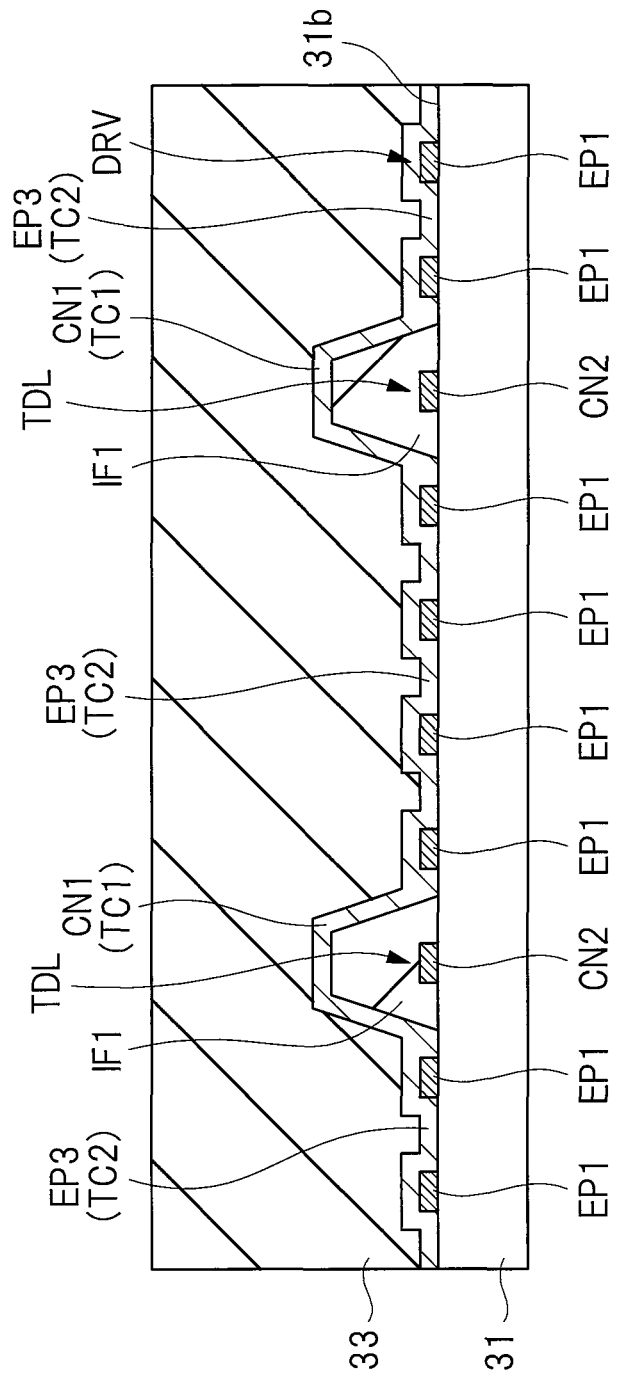
FIG. 28 is a cross-sectional view illustrating the drive electrode and the detection electrode for touch detection in the third modification example of the first embodiment.
Figure 29:
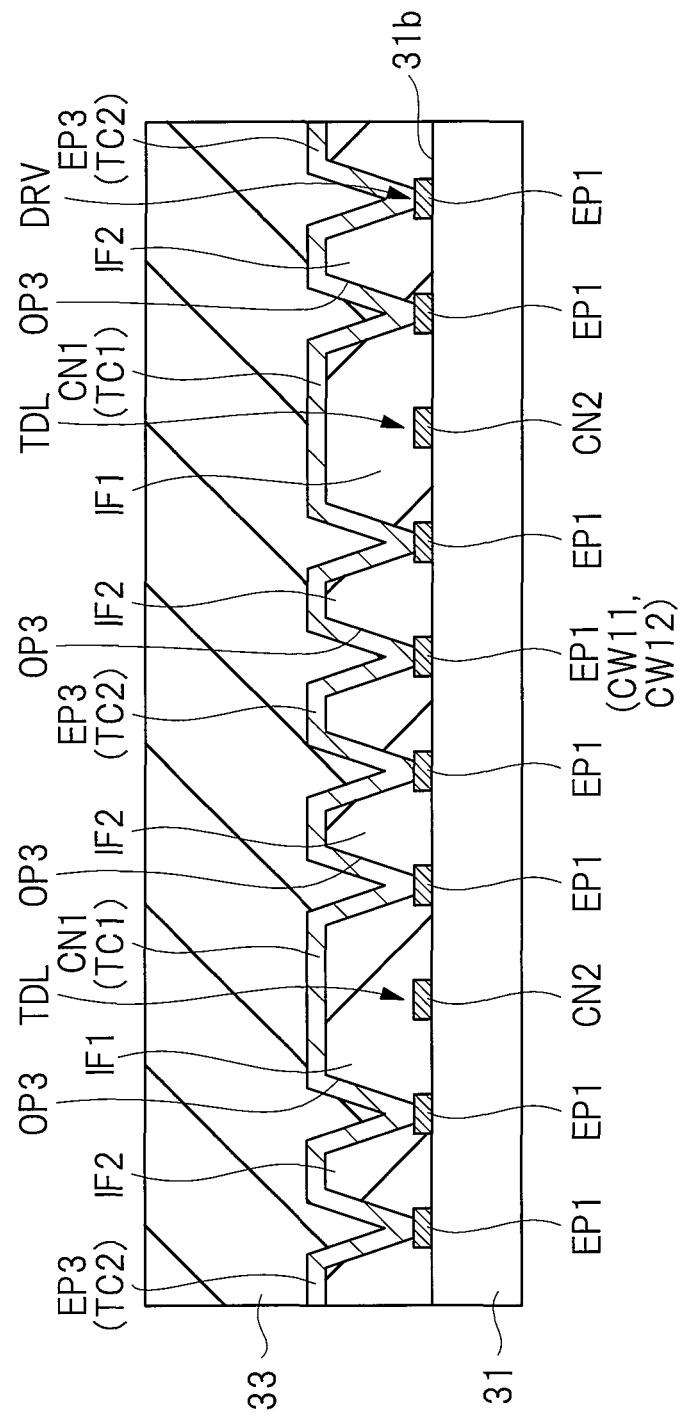
FIG. 29 is a cross-sectional view illustrating the drive electrode and the detection electrode for touch detection in the third modification example of the first embodiment.

FIG. 27 is a plan view illustrating a drive electrode and a detection electrode for touch detection in the third modification example of the first embodiment. FIGS. 28 and 29 are cross-sectional views illustrating the drive electrode and the detection electrode for touch detection in the third modification example of the first embodiment. FIGS. 28 and 29 are the cross-sectional views taken along a line C-C of FIG. 27.

In the third modification example, an electrode portion EP3, which covers any one of the plurality of electrode portions EP1 included in each of the plurality of drive electrodes DRV, is formed on the upper surface 31$b$ of the substrate 31, as illustrated in FIG. 28. The electrode portion EP3 is electrically connected to the connection portion CN1, and further, is electrically connected to the electrode portion EP1. In addition, the electrode portion EP3 is formed on any one of the electrode portions EP1. The electrode portion EP3 is composed of a transparent conductive film TC2. The electrode portion EP3 may be formed to be integrated with the connection portion CN1.

Accordingly, it is possible to improve the conductivity of the drive electrode DRV, to increase the capacitance between the drive electrode DRV and the detection electrode TDL in the mutual capacitance system, and to increase the capacitance of the drive electrode DRV or the detection electrode TDL in the self-capacitance system. Thus, it is possible to improve the detection sensitivity of touch detection in the touch detection device.

Incidentally, two electrode portions EP4, which cover the respective electrode portions EP2 adjacent to each other in the X-axis direction, may be formed on the upper surface 31$b$ of the substrate 31 (see FIG. 28), as illustrated in FIG. 27, and the two electrode portions EP4 may be electrically connected with each other via a connection portion CN3. The two electrode portions EP4 and the connection portion CN3 may be formed in an integrated manner, and may be composed of the transparent conductive film, as with the connection portion CN1. Accordingly, the two detection electrodes TDL, which are adjacent to each other in the X-axis direction, are electrically connected to each other, and thus, it is possible to improve the detection sensitivity of touch detection in the touch detection device although the positional accuracy of the touch detection decreases in the X-axis direction.

In addition, an insulating film IF2, which is formed to be integrated with the insulating film IF1 to cover the connection portion CN2, may cover the electrode portion EP1, as illustrated in FIG. 29. In addition, it may be configured such that an opening portion OP3, which passes through the insulating film IF2 and reaches the conductive line CW11 or CW12 included in the electrode portion EP1, is formed in the insulating film IF2, and the electrode portion EP3 is formed inside the opening portion OP3 and on the insulating film IF2. Further, the two electrode portions EP3, which are adjacent to each other in the X-axis direction, may be electrically connected with each other via the connection portion CN1, as with the example illustrated in FIG. 27. In addition, the two electrode portions EP3, which are adjacent to each other in the X-axis direction, and the connection portion CN1, which electrically connects these two electrode portions EP3 with each other, may be formed in an integrated manner. In this case, also, it is possible to improve the conductivity of the drive electrode DRV, thereby making it possible to improve the detection sensitivity of touch detection in the touch detection device.

<Fourth Modification Example of Drive Electrode and Detection Electrode for Touch Detection>

Next, a description will be given regarding the fourth modification example of the drive electrode and the detection electrode for touch detection.

Figure 30:
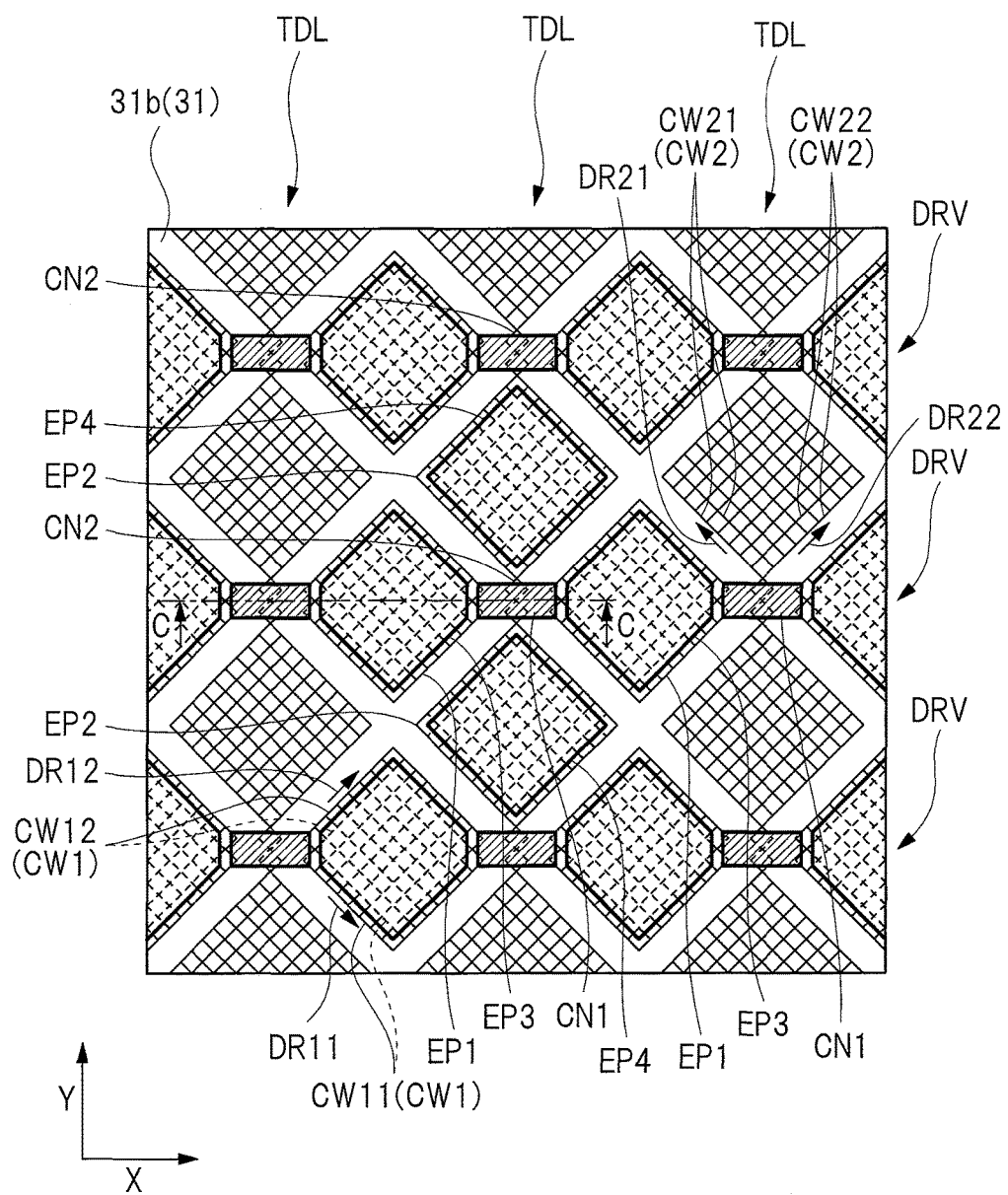
FIG. 30 is a plan view illustrating a drive electrode and a detection electrode for touch detection in a fourth modification example of the first embodiment.
Figure 31:
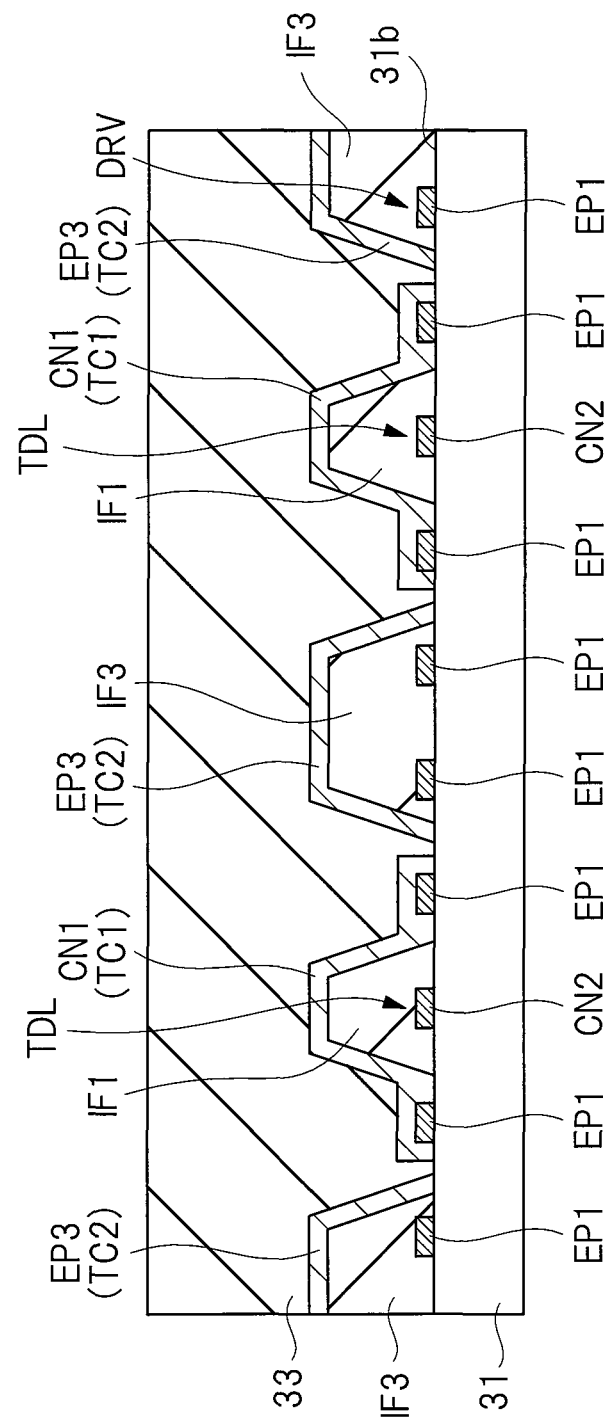
FIG. 31 is a cross-sectional view illustrating the drive electrode and the detection electrode for touch detection in the fourth modification example of the first embodiment.

FIG. 30 is a plan view illustrating a drive electrode and a detection electrode for touch detection in the fourth modification example of the first embodiment. FIG. 31 is a cross-sectional view illustrating the drive electrode and the detection electrode for touch detection in the fourth modification example of the first embodiment. FIG. 31 is the cross-sectional view taken along a line C-C of FIG. 30.

In the fourth modification example, an insulating film IF3, which covers any one of the plurality of electrode portions EP1 included in each of the plurality of drive electrodes DRV, is formed on the upper surface 31$b$ of the substrate 31, as illustrated in FIG. 31. In addition, the electrode portion EP3 is formed on any one of the electrode portions EP1 via the insulating film IF3. The electrode portion EP3 is composed of a transparent conductive film TC2.

In the fourth modification example, the electrode portion EP3 is in an electrically floating state, that is, in a floating state, and is electrically connected to none of the electrode portions EP1 and EP2 (see FIG. 30), and of the connection portions CN1 and CN2, which is different from the third modification example of the first embodiment.

Accordingly, it is possible to adjust distribution of the electric field around the electrode portion EP1, to increase the capacitance between the drive electrode DRV and the detection electrode TDL in the mutual capacitance system, and to increase the capacitance of the drive electrode DRV or the detection electrode TDL in the self-capacitance system. Thus, it is possible to improve the detection sensitivity of touch detection in the touch detection device.

Incidentally, an insulating film (not illustrated), which covers the electrode portion EP2, is formed on the upper surface 31$b$ of the substrate 31 as illustrated in FIG. 30, and an electrode portion EP4 in the electrically floating state may be formed on this insulating film not illustrated. In this case, it is possible to adjust the distribution of the electric field around the electrode portion EP2.

In addition, when the signal for touch detection is input to any one of the electrode portions EP1, a signal for active shield having the same potential or the same phase as that of the signal for touch detection may be input to the electrode portion EP3 formed on any one of the electrode portions EP1 via the insulating film IF3 in the fourth modification example, as with the third modification example of the second embodiment that will be described later. Accordingly, it is possible to reduce the influence of the noise from the liquid crystal display device at the time of touch detection, thereby making it possible to improve the detection sensitivity of touch detection in the touch detection device.

Second Embodiment

The example has been described in the first embodiment in which the connection portion CN1 composed of the transparent conductive film steps over the connection portion CN2 composed of the light-shielding film containing metal or alloy as the main component. On the other hand, a description will be given in a second embodiment regarding an example in which the connection portion CN2, composed of the light-shielding film containing metal or alloy as the main component, steps over the connection portion CN1 composed of the transparent conductive film.

Each part of a display according to the second embodiment, other than the drive electrode DRV and the detection electrode TDL, is the same as each part of the display according to the first embodiment, other than the drive electrode DRV and the detection electrode TDL, and thus, the description thereof will be omitted.

<Shapes and Arrangement of Drive Electrode and Detection Electrode for Touch Detection>

Figure 32:
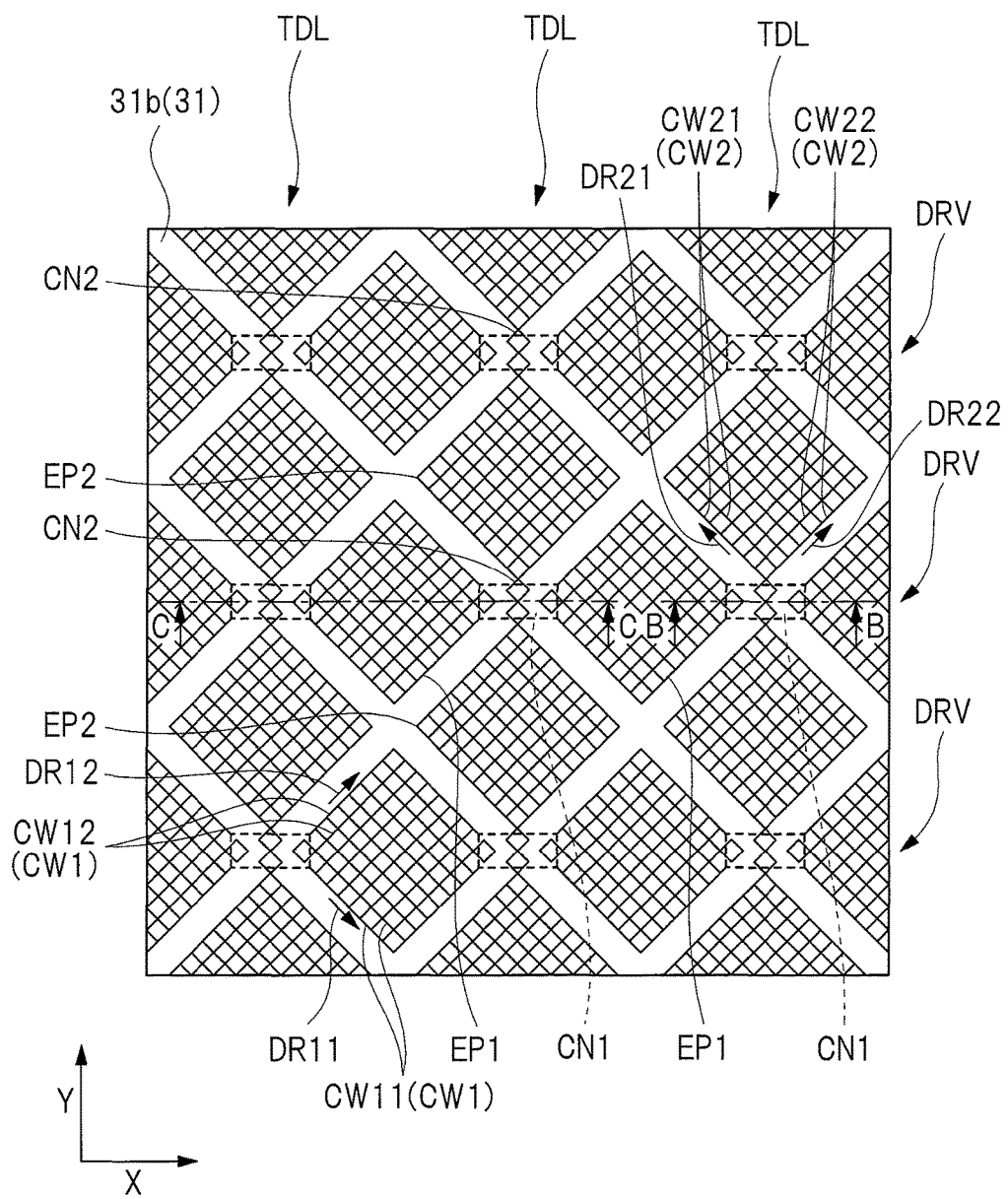
FIG. 32 is a plan view illustrating a drive electrode and a detection electrode for touch detection in a second embodiment.
Figure 33:
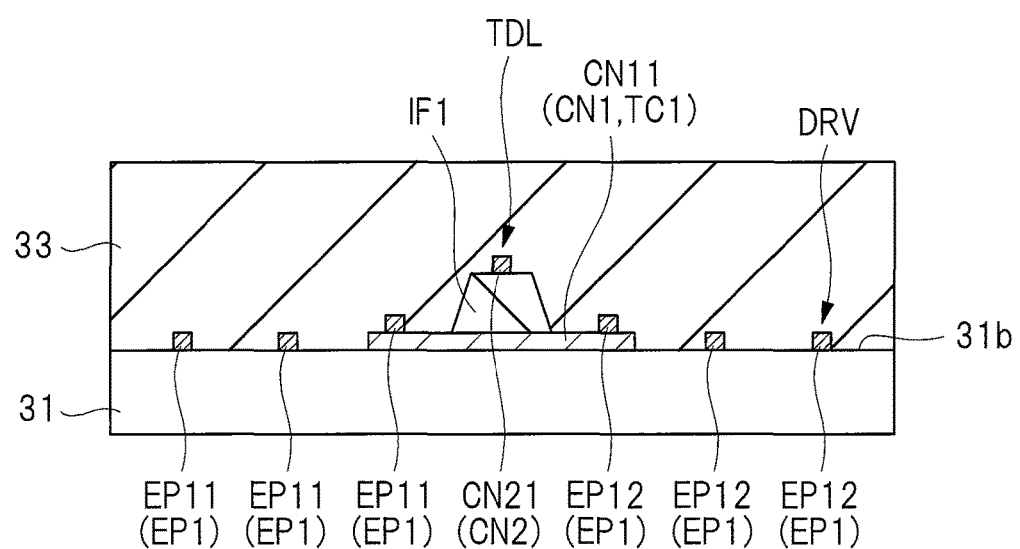
FIG. 33 is a cross-sectional view illustrating the drive electrode and the detection electrode for touch detection in the second embodiment.
Figure 34:
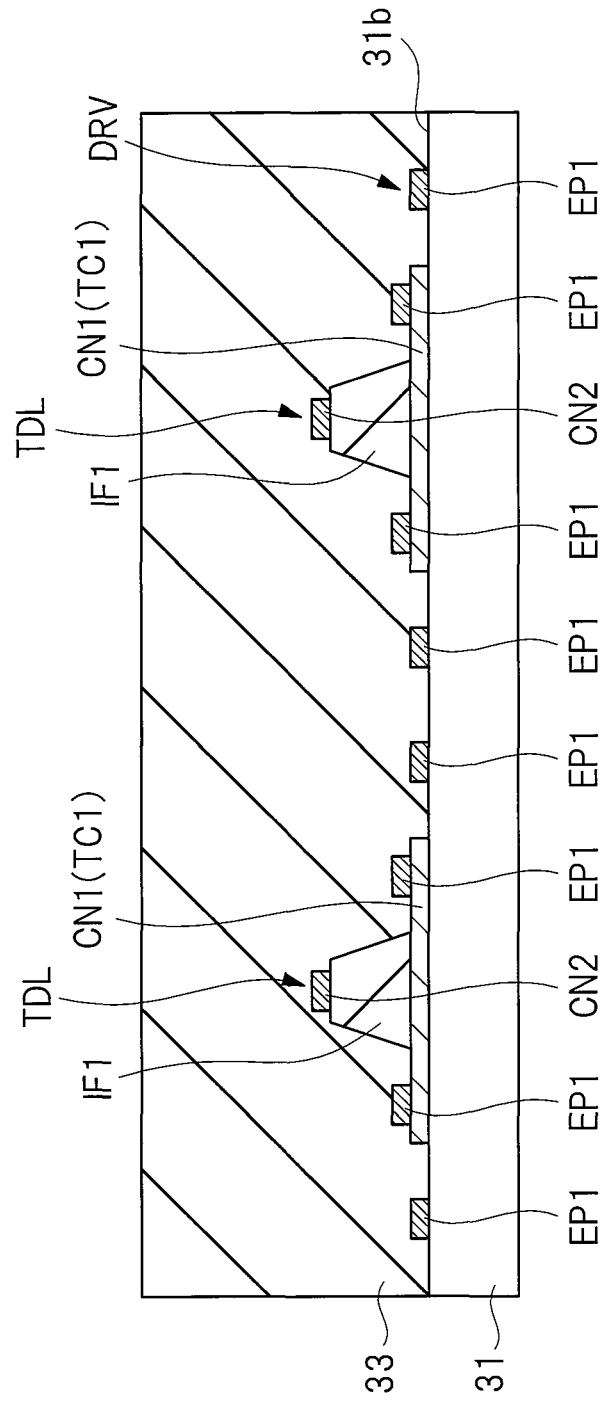
FIG. 34 is a cross-sectional view illustrating the drive electrode and the detection electrode for touch detection in the second embodiment.

FIG. 32 is a plan view illustrating a drive electrode and a detection electrode for touch detection in a second embodiment. FIGS. 33 and 34 are cross-sectional views illustrating the drive electrode and the detection electrode for touch detection in the second embodiment. FIG. 33 is the cross-sectional view taken along a line B-B of FIG. 32, and illustrates a cross-section corresponding to one of the connection portions CN1. In addition, FIG. 34 is the cross-sectional view taken along a line C-C of FIG. 32, and illustrates a cross-section corresponding to two of the connection portions CN1.

As with the first embodiment, the counter substrate 3 includes the substrate 31, and the plurality of drive electrodes DRV and the plurality of detection electrodes TDL, which are provided on the upper surface 31b of the substrate 31 in the display area Ad, also in the second embodiment. In addition, as with the first embodiment, each of the plurality of drive electrodes DRV includes the plurality of electrode portions EP1 and the plurality of connection portions CN1, and each of the plurality of detection electrodes TDL includes the plurality of electrode portions EP2 and the plurality of connection portions CN2, also in the second embodiment.

Meanwhile, the plurality of connection portions CN1 included in each of the plurality of drive electrodes DRV are formed on the upper surface 31b of the substrate 31 without passing through the insulating film IF1 and the connection portion CN2 in the second embodiment, which is different from the first embodiment. The plurality of connection portions CN1 are arranged with an interval in the X-axis direction. Accordingly, the insulating film IF1 is formed on the connection portion CN1 in the second embodiment, which is different from the first embodiment. In other words, the insulating film IF1 is formed on the upper surface 31b of the substrate 31 so as to cover the connection portion CN11, which serves as any one of the plurality of connection portions CN1. The insulating film IF1 is formed through, for example, the ink-jet method or the electric field jet method, as with the second modification example of the first embodiment.

As illustrated in FIGS. 32 and 33, the connection portion CN21, which serves as any one of the plurality of connection portions CN2 included in each of the plurality of detection electrodes TDL, is formed on the connection portion CN11, which serves as any one of the plurality of connection portions CN1 included in each of the plurality of drive electrodes DRV, via the insulating film IF1.

As with the first embodiment, the plurality of electrode portions EP1 included in each of the plurality of drive electrodes DRV, and the plurality of electrode portions EP2 and the plurality of connection portions CN2 included in each of the plurality of detection electrodes TDL are formed on the upper surface 31b of the substrate 31, also in the second embodiment. Accordingly, the electrode portions EP11 and EP12, serving as the two electrode portions EP1, which are arranged on both sides of the connection portion CN21 interposed therebetween and are adjacent to each other in the X-axis direction, among the plurality of electrode portions EP1 included in each of the plurality of drive electrodes DRV, are formed on the upper surface 31b of the substrate 31.

As illustrated in FIG. 32, each of the plurality of electrode portions EP1 has a mesh shape formed of the plurality of conductive lines CW11 each of which extends in the direction DR11 and the plurality of conductive lines CW12 each of which extends in the direction DR12 intersecting with direction DR11 in a planar view. In addition, each of the plurality of conductive lines CW11 and the plurality of conductive lines CW12 contains metal or alloy as the main component.

Part of the electrode portion EP11 are formed on the connection portion CN11, and part of the electrode portions EP12 are formed on the connection portion CN11. In this manner, the electrode portions EP11 and EP12 are electrically connected with each other via the connection portion CN11. That is, each of the plurality of connection portions CN1 included in each of the plurality of drive electrodes DRV electrically connects the two electrode portions EP1, which are adjacent to each other in the X-axis direction, among the plurality of electrode portions EP1 included in each of the plurality of drive electrodes DRV.

Incidentally, each of the plurality of connection portions CN2 included in each of the plurality of detection electrodes TDL electrically connects the two electrode portions EP2, which are adjacent to each other in the Y-axis direction, among the plurality of electrode portions EP2 included in each of the plurality of detection electrodes TDL.

Since part of the electrode portions EP1 or part of the electrode portions EP2 are covered by neither the insulating film IF1 nor the transparent conductive film in the second embodiment, the protective film 33, which covers the electrode portions EP1 and EP2, the connection portions CN1 and CN2, and the insulating film IF1, is formed on the upper surface 31b of the substrate 31, as with the second modification example of the first embodiment.

<Main Characteristic and Effect of Present Embodiment>

The display according to the second embodiment has the same effect as that of the display according to the first embodiment since each of the plurality of electrode portions EP1 and the plurality of electrode portions EP2 contains metal or alloy as the main component, and further, has a mesh shape, as with the display according to the first embodiment.

In addition, the display according to the second embodiment has the same effect as that of the display according to the first embodiment since the input device having the on-cell structure is provided and the input device having the externally mounted structure is not provided, as with the display according to the first embodiment.

Meanwhile, any one of the connection portions CN21 among the plurality of connection portions CN2 included in each of the plurality of detection electrodes TDL steps over any one of the connection portions CN11 among the plurality of connection portions CN1 included in each of the plurality of drive electrodes DRV via the insulating film IF1 in the second embodiment, which is different from the first embodiment. In addition, each of the plurality of connection portions CN1 included in each of the plurality of drive electrodes DRV is composed of the transparent conductive film TC1, and each of the plurality of connection portions CN2 included in each of the plurality of detection electrodes TDL is composed of the light-shielding film SF1 containing metal or alloy as the main component (see FIG. 15).

Accordingly, the connection portion CN2 composed of the light-shielding film SF1 steps over the connection portion CN1 composed of the transparent conductive film TC1 in the second embodiment, which is different from the first embodiment. That is, the connection portion CN1 composed of the transparent conductive film TC1 is formed, and then, the electrode portions EP1 and EP2, and the connection portion CN2, which are composed of the light-shielding film SF1, are formed.

In this case, the electrode portions EP1 and EP2, and the connection portion CN2, which are composed of the light-shielding film SF1 (see FIG. 15), are formed after the insulating film IF1 is formed, which will be described with reference to FIGS. 36 and 37 to be described later. Thus, it is possible to prevent generation of corrosion of the light-shielding film SF1, caused by developing solution, in the process of forming the insulating film IF1. Thus, it is unnecessary to form the terminal portion PD1 (see FIG. 18) regardless of the material of the light-shielding film SF1.

<Blackening of Surfaces of Drive Electrode and Detection Electrode>

A case is considered where the light-shielding film SF1 includes the conductive film CF1 and the antireflection film AN1, which is composed of the stacked film LF1 formed on the conductive film CF1, the reflection of light on the upper surface of the conductive film CF1 is prevented or suppressed using the interference of light reflected by each layer boundary of the stacked film LF1, and the surface of the light-shielding film SF1 is blackened, as described with reference to FIG. 15 described above. In this case, when the protective film 33 is formed in the second modification example of the first embodiment, which has been described with reference to FIG. 23 described above, the transparent conductive film TC1 and the protective film 33 are stacked on the light-shielding film SF1. Then, a condition of interference that is required for the blackening is not satisfied where the transparent conductive film TC1 and the protective film 33 are stacked on the light-shielding film SF1, and thus there is a risk that the color tone is deviated from black, or the reflectance of light on the upper surface of the conductive film CF1 increases.

Alternatively, even when the protective film 33 is not formed, the condition of interference that is required for the blackening is not satisfied where the connection portion CN1, composed of the transparent conductive film, is stacked on the electrode portion EP1 composed of the light-shielding film SF1, and thus there is a risk that the color tone is deviated from black, or the reflectance of light on the upper surface of the conductive film CF1 increases.

On the other hand, the connection portion CN1, composed of the transparent conductive film TC1, is not stacked on the light-shielding film SF1 as the electrode portions EP1 and EP2, and the connection portion CN2, which are composed of the light-shielding film SF1, are formed after forming the connection portion CN1 composed of the transparent conductive film TC1 in the second embodiment, which is different from the first embodiment. Thus, it is possible to prevent or suppress the deviation of the color tone from black, and to further prevent or suppress the increase of the reflectance of light on the upper surface of the conductive film CF1, even in a case where the light-shielding film SF1 includes the conductive film CF1 and the stacked film LF1 formed on the conductive film CF1.

A portion, which is greatly affected when the color tone is deviated from black, between the connection portion CN1 composed of the transparent conductive film TC1 and the protective film 33 is the connection portion CN1 composed of the transparent conductive film TC1. Thus, although the protective film 33 is stacked on the light-shielding film SF1 in the second embodiment, it is possible to prevent or suppress the deviation of the color tone from black, and to prevent or suppress the increase of the reflectance of light on the upper surface of the conductive film CF1 as compared to the second modification example of the first embodiment.

<Method of Manufacturing Drive Electrode and Detection Electrode>

Figure 35:
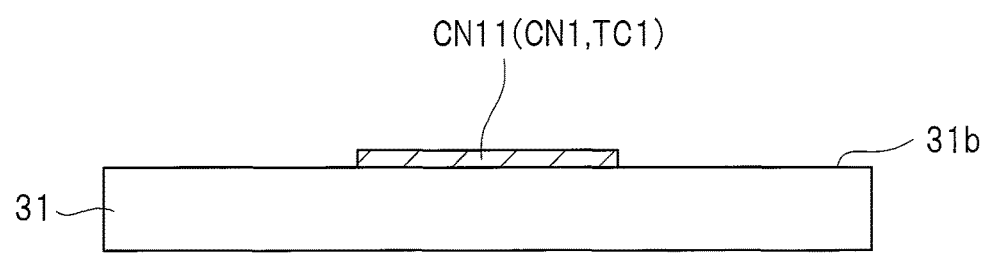
FIG. 35 is a cross-sectional view during a manufacturing process of the drive electrode and the detection electrode in the second embodiment.

Next, a description will be given regarding a method of manufacturing the drive electrode and the detection electrode. FIGS. 35 to 37 are cross-sectional views during a manufacturing process of the drive electrode and the detection electrode in the second embodiment.

In the second embodiment, the substrate 31 is prepared by performing the same process as the process that has been described with reference to FIG. 16, and the connection portion CN1 is formed, as illustrated in FIG. 35.

In the process of forming the connection portion CN1, first, the transparent conductive film TC1 is formed on the upper surface 31b of the substrate 31 in the display area Ad (see FIG. 5) by performing the same process as the process that has been described with reference to FIG. 12.

Next, in the process of forming the connection portion CN1, the transparent conductive film TC1 is patterned, and the plurality of connection portions CN1 included in each of the plurality of drive electrodes DRV are formed on the upper surface 31b of the substrate 31. Each of the plurality of connection portions CN1 is composed of the transparent conductive film TC1. The plurality of connection portions CN1 are arranged with an interval in the X-axis direction. Incidentally, the connection portion CN11, which serves as any one of the plurality of connection portions CN1, is illustrated in FIG. 35.

Figure 36:
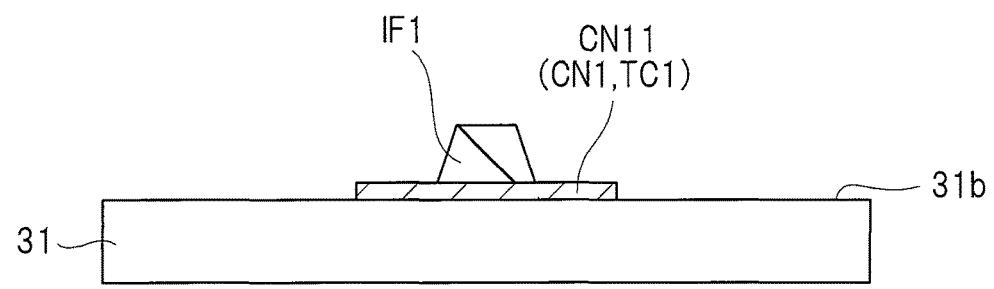
FIG. 36 is a cross-sectional view during a manufacturing process of the drive electrode and the detection electrode in the second embodiment.

Next, the insulating film IF1 is formed, as illustrated in FIG. 36, by performing the same process as the process that has been described with reference to FIG. 25. In the process of the insulating film IF1, the upper surface 31b of the substrate 31 in the display area Ad is coated with the raw material liquid for formation of the insulating film by ejecting the liquid as droplets through the ink-jet method or the electric field jet method, and accordingly, the plurality of insulating films IF1 that cover the connection portion CN11 are formed. It is possible to form a resin film, which is made of a UV curable resin or a thermosetting resin such as an acrylic resin, an epoxy resin, or a polyimide resin, as the insulating film IF1.

Figure 37:
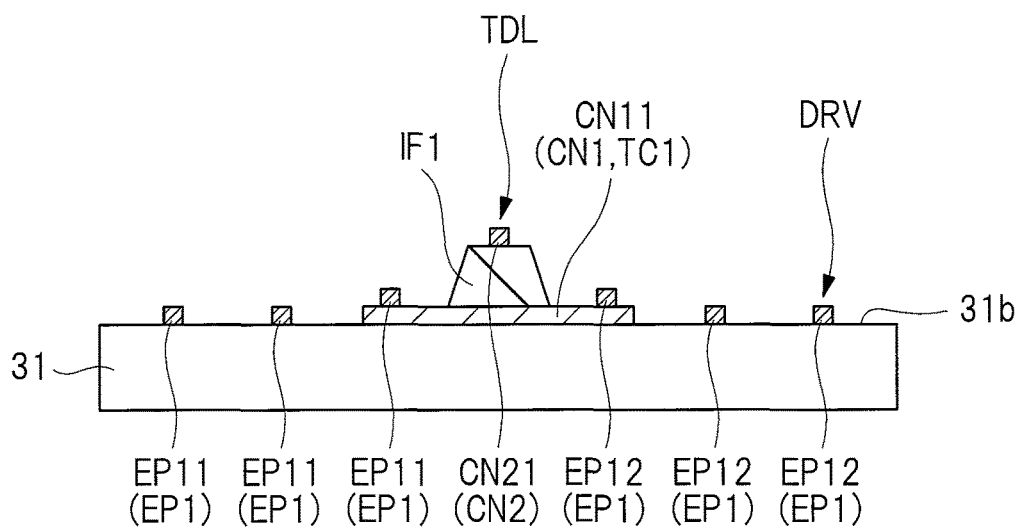
FIG. 37 is a cross-sectional view during a manufacturing process of the drive electrode and the detection electrode in the second embodiment.

Next, the plurality of electrode portions EP1 and the plurality of electrode portions EP2 are formed, as illustrated in FIG. 37, by performing the same process as the process that has been described with reference to FIG. 16. In the process of forming the plurality of electrode portions EP1 and the plurality of electrode portions EP2, the plurality of electrode portions EP1, the plurality of electrode portions EP2 (see FIG. 32), and the plurality of connection portions CN2 are formed on the upper surface 31b of the substrate 31 in the display area Ad (see FIG. 5). Further, the plurality of drive electrodes DRV including the plurality of electrode portions EP1 and the plurality of connection portions CN1 are formed, and the plurality of detection electrodes TDL including the plurality of electrode portions EP2 and the plurality of connection portions CN2 are formed. That is, the plurality of electrode portions EP1 included in each of the plurality of drive electrodes DRV, and the plurality of electrode portions EP2 and the plurality of connection portions CN2 included in each of the plurality of detection electrodes TDL are formed in this process. Each of the connection portions CN2 is composed of the light-shielding film SF1 containing metal or alloy as the main component.

In this process, the plurality of electrode portions EP1, which are arranged with an interval in the X-axis direction in a planar view, are formed on the upper surface 31b of the substrate 31. In addition, the plurality of electrode portions EP2, which are arranged with an interval in the Y-axis direction in a planar view, are formed on the upper surface 31b of the substrate 31, and each of the plurality of connection portions CN2, which electrically connects the two electrode portions EP2 adjacent to each other in the Y-axis direction, is formed.

At this time, the plurality of electrode portions EP1 are formed such the respective two electrode portions EP1 adjacent to each other in the X-axis direction are electrically connected with each other via each of the plurality of connection portions CN1. In addition, the plurality of connection portions CN2 are formed such that the connection portion CN21, which serves as any one of the plurality of connection portions CN2, steps over the connection portion CN11, which serves as any one of the plurality of connection portions CN1, via the insulating film IF1. In addition, the plurality of connection portions CN2 are formed such that the connection portion CN21 electrically connects the two electrode portions EP2, which are arranged on both sides of the connection portion CN11 interposed therebetween and are adjacent to each other in the Y-axis direction, among the plurality of electrode portions EP2.

Thereafter, the protective film 33, which covers the electrode portions EP1 and EP2 (see FIG. 32), the connection portions CN1 and CN2, and the insulating film IF1, is formed on the upper surface 31b of the substrate 31, as illustrated in FIG. 33, in the second embodiment, which is different from the first embodiment.

Figure 38:
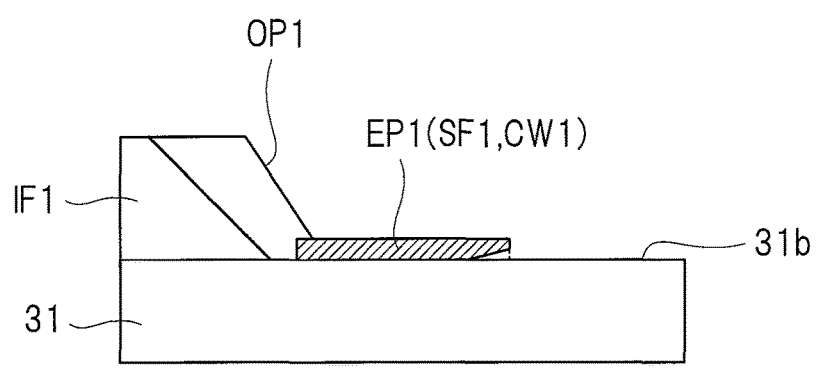
FIG. 38 is a cross-sectional view during a manufacturing process of a drive electrode and a detection electrode in a second comparative example.

FIG. 38 is a cross-sectional view during a manufacturing process of a drive electrode and a detection electrode in the second comparative example. FIG. 38 illustrates a peripheral part of the conductive line CW1 (see FIG. 32) in an enlarged manner.

In the second comparative example, the electrode portions EP1 and EP2 (see FIG. 32) and the connection portion CN2 (see FIG. 32), which are composed of the light-shielding film SF1 containing metal or alloy as the main component, are formed, the insulating film IF1 made of, for example, the photosensitive resist is formed, and then, the opening portion OP1 is formed by patterning the insulating film IF1 using the photolithography. In this case, when the opening portion OP1 is not enclosed in the region in which the terminal portion PD1 (see FIG. 18) is formed, the side surface of the conductive line CW1, which is included in the electrode portion EP1 and composed of the light-shielding film SF1, is exposed from the insulating film IF1 at the time of developing the insulating film IF1 after pattern exposure using the developing solution. Thus, there is a risk that the corrosion of the conductive line CW1 is generated, as the electrochemical reaction with the developing solution occurs mainly on the lower surface of the conductive line CW1.

Alternatively, it is necessary to allow the opening portion OP1 to be enclosed in the region in which the terminal portion PD1 is formed, in a planar view, by forming the terminal portion PD1 and increasing the plane area of the terminal portion PD1, in order to prevent the side surface of the conductive line CW1 from being exposed from the insulating film IF1, as with the first modification example of the first embodiment.

When the terminal portion PD1 is formed, the visibility of the image to be displayed in the display area is degraded, as the terminal portion PD1 is visible or the transmittance in the display area decreases.

Meanwhile, the insulating film IF1 is formed by performing the process that has been described with reference to FIG. 36, and then, the electrode portions EP1 and EP2 (see FIG. 32) and the connection portion CN2, which are composed of the light-shielding film containing metal or alloy as the main component, are formed by performing the process that has been described with reference to FIG. 37 in the second embodiment. Thus, it is possible to prevent the generation of corrosion of the light-shielding film, caused by the developing solution, in the process of forming the insulating film IF1. In addition, it is unnecessary to form the terminal portion PD1 (see FIG. 18) regardless of the material of the light-shielding film SF1, and thus, it is possible to prevent or suppress the terminal portion PD1 from being visible, and to prevent or suppress the decrease of transmittance in the display area Ad (see FIG. 5), thereby making it possible to improve the visibility of the image to be displayed in the display area.

<First Modification Example of Drive Electrode and Detection Electrode for Touch Detection>

Next, a description will be given regarding the first modification example of the drive electrode and the detection electrode for touch detection.

Figure 39:
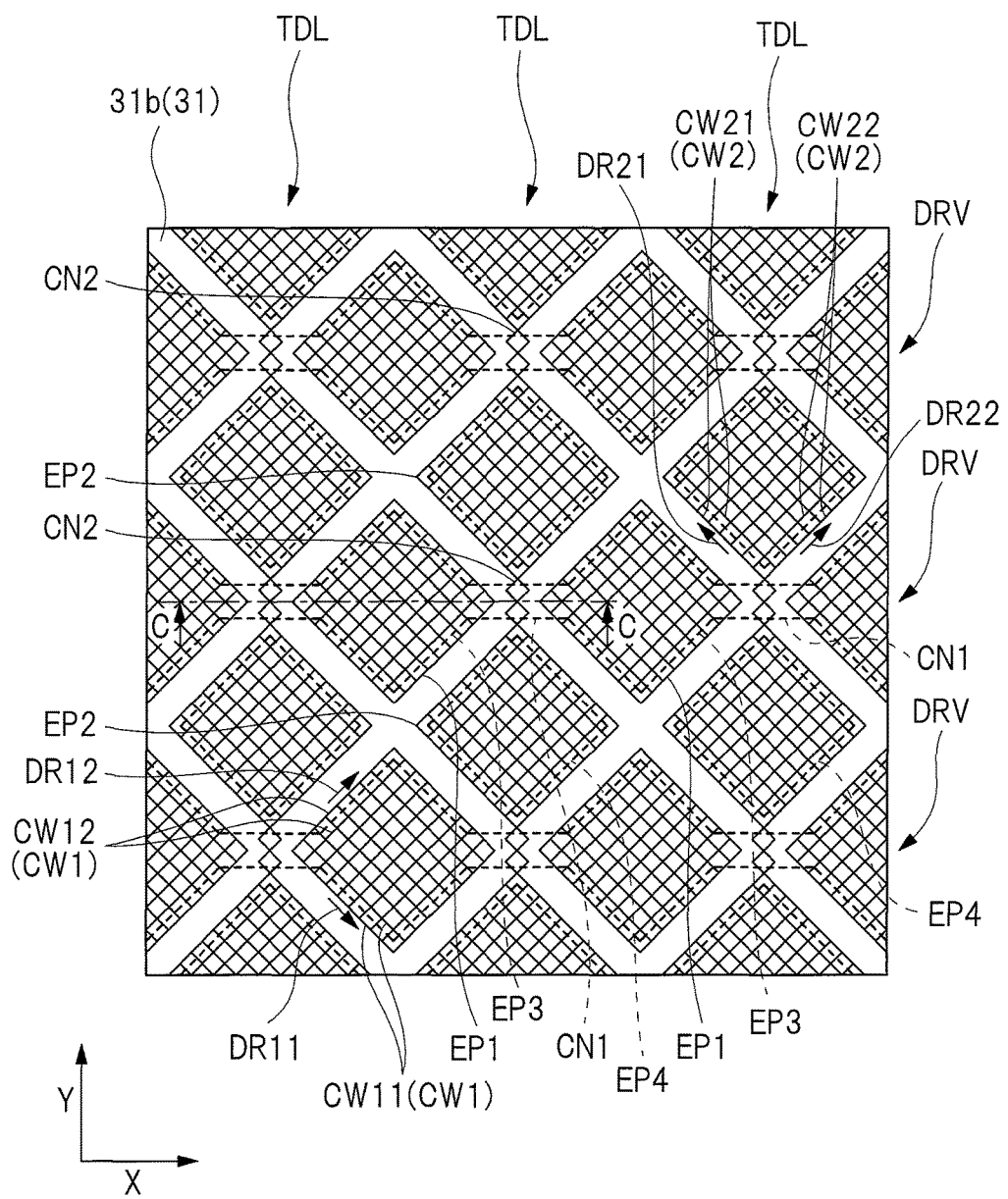
FIG. 39 is a plan view illustrating a drive electrode and a detection electrode for touch detection in a first modification example of the second embodiment.
Figure 40:
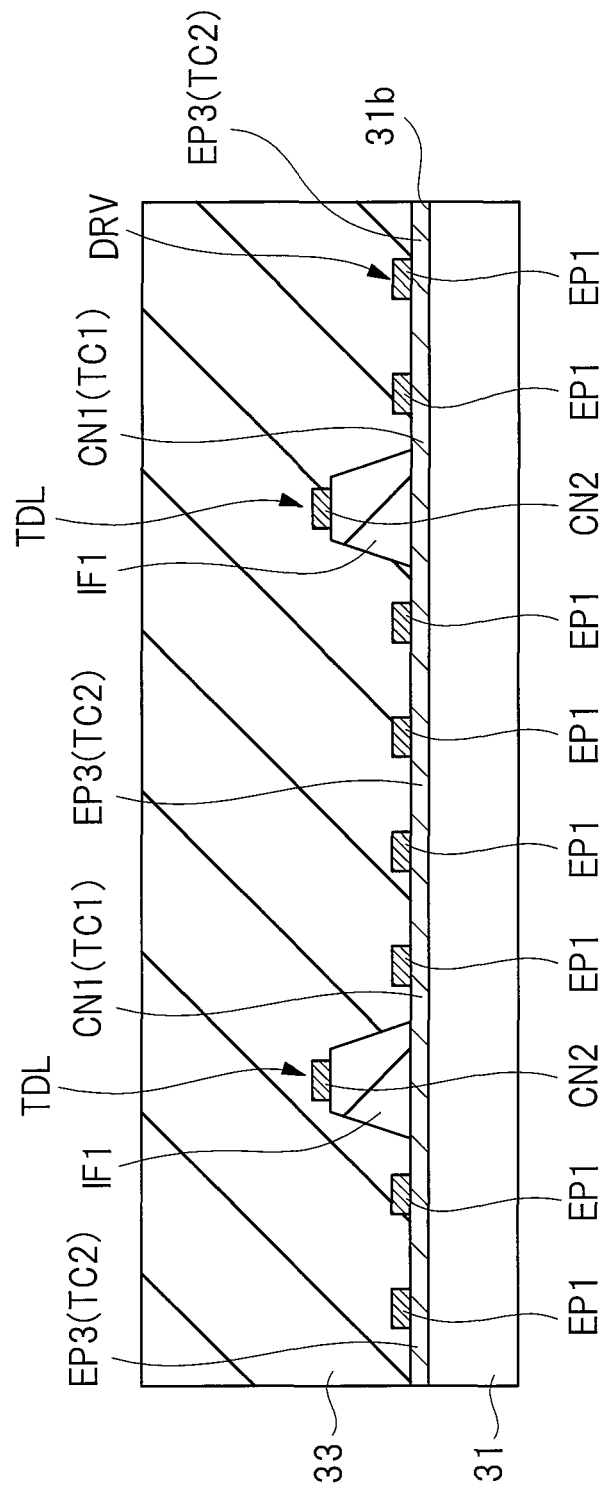
FIG. 40 is a cross-sectional view illustrating the drive electrode and the detection electrode for touch detection in the first modification example of the second embodiment.

FIG. 39 is a plan view illustrating a drive electrode and a detection electrode for touch detection in the first modification example of the second embodiment. FIG. 40 is a cross-sectional view illustrating the drive electrode and the detection electrode for touch detection in the first modification example of the second embodiment. FIG. 40 is the cross-sectional view taken along a line C-C of FIG. 39.

In the first modification example, the electrode portion EP3 is formed between the electrode portion EP1 and the upper surface 31b of the substrate 31, as illustrated in FIG. 40. The electrode portion EP3 is electrically connected to the connection portion CN1, and further, is electrically connected to the electrode portion EP1. The electrode portion EP3 is composed of a transparent conductive film TC2. The electrode portion EP3 may be formed to be integrated with the connection portion CN1.

Accordingly, it is possible to improve the conductivity of the drive electrode DRV, to increase the capacitance between the drive electrode DRV and the detection electrode TDL in the mutual capacitance system, and to increase the capacitance of the drive electrode DRV or the detection electrode TDL in the self-capacitance system. Thus, it is possible to improve the detection sensitivity of touch detection in the touch detection device.

Incidentally, an electrode portion EP4 may be formed also between the electrode portion EP2 and the upper surface 31b of the substrate 31, as illustrated in FIG. 39. The electrode portion EP4 may be composed of the transparent conductive film, as with the connection portion CN1. Accordingly, it is possible to adjust the distribution of the electric field around the electrode portion EP2, to increase the capacitance between the drive electrode DRV and the detection electrode TDL in the mutual capacitance system, and to increase the capacitance of the drive electrode DRV or the detection electrode TDL in the self-capacitance system. Thus, it is possible to improve the detection sensitivity of touch detection in the touch detection device.

<Second Modification Example of Drive Electrode and Detection Electrode for Touch Detection>

Next, a description will be given regarding the second modification example of the drive electrode and the detection electrode for touch detection.

Figure 41:
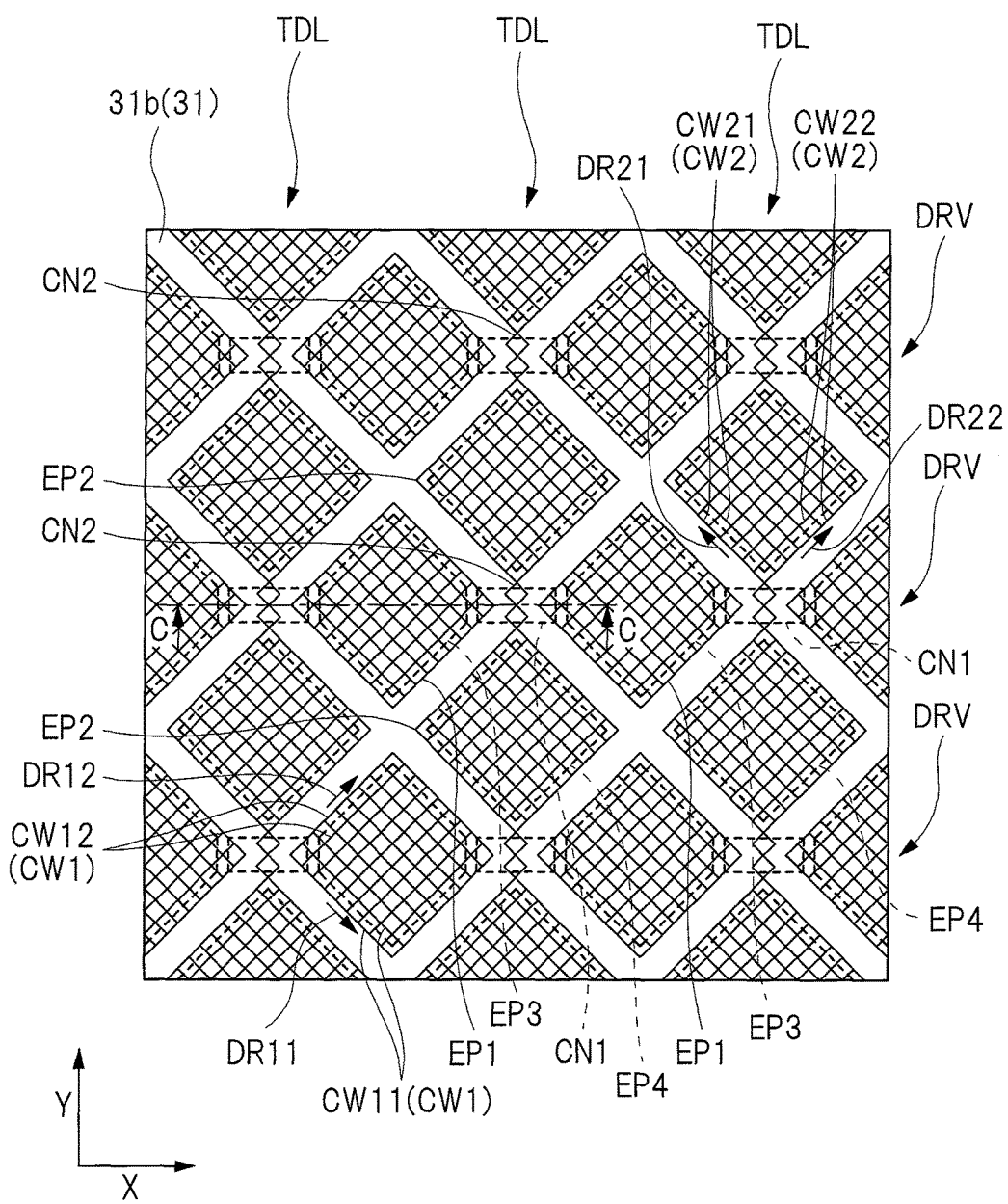
FIG. 41 is a plan view illustrating a drive electrode and a detection electrode for touch detection in a second modification example of the second embodiment.
Figure 42:
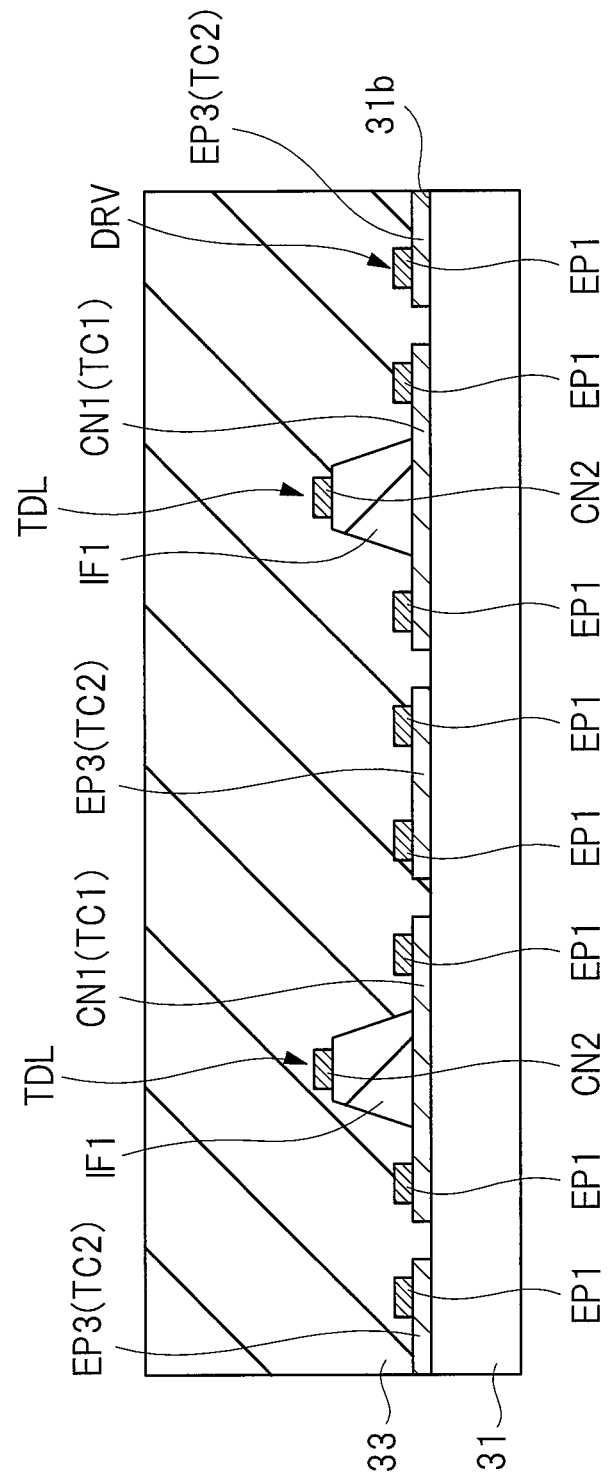
FIG. 42 is a cross-sectional view illustrating the drive electrode and the detection electrode for touch detection in the second modification example of the second embodiment.

FIG. 41 is a plan view illustrating a drive electrode and a detection electrode for touch detection in the second modification example of the second embodiment. FIG. 42 is a cross-sectional view illustrating the drive electrode and the detection electrode for touch detection in the second modification example of the second embodiment. FIG. 42 is the cross-sectional view taken along a line C-C of FIG. 41.

In the second modification example, the electrode portion EP3 is formed not to be integrated with the connection portion CN1, but is formed to be spaced apart from the connection portion CN1, as illustrated in FIGS. 41 and 42. The other points can be configured, as with the first modification example of the second embodiment that has been described with reference to FIGS. 39 and 40.

However, the electrode portion EP3 is electrically connected to the electrode portion EP1, and the electrode portion EP1 is electrically connected to the connection portion CN1. Thus, the second modification example is the same as the first modification example of the second embodiment in that the electrode portion EP3 is electrically connected to the connection portion CN1 and is electrically connected to the electrode portion EP1.

The second modification example also has the same effect as the first modification example of the second embodiment, thereby making it possible to improve the detection sensitivity of touch detection in the touch detection device.

<Third Modification Example of Drive Electrode and Detection Electrode for Touch Detection>

Next, a description will be given regarding the third modification example of the drive electrode and the detection electrode for touch detection.

Figure 43:
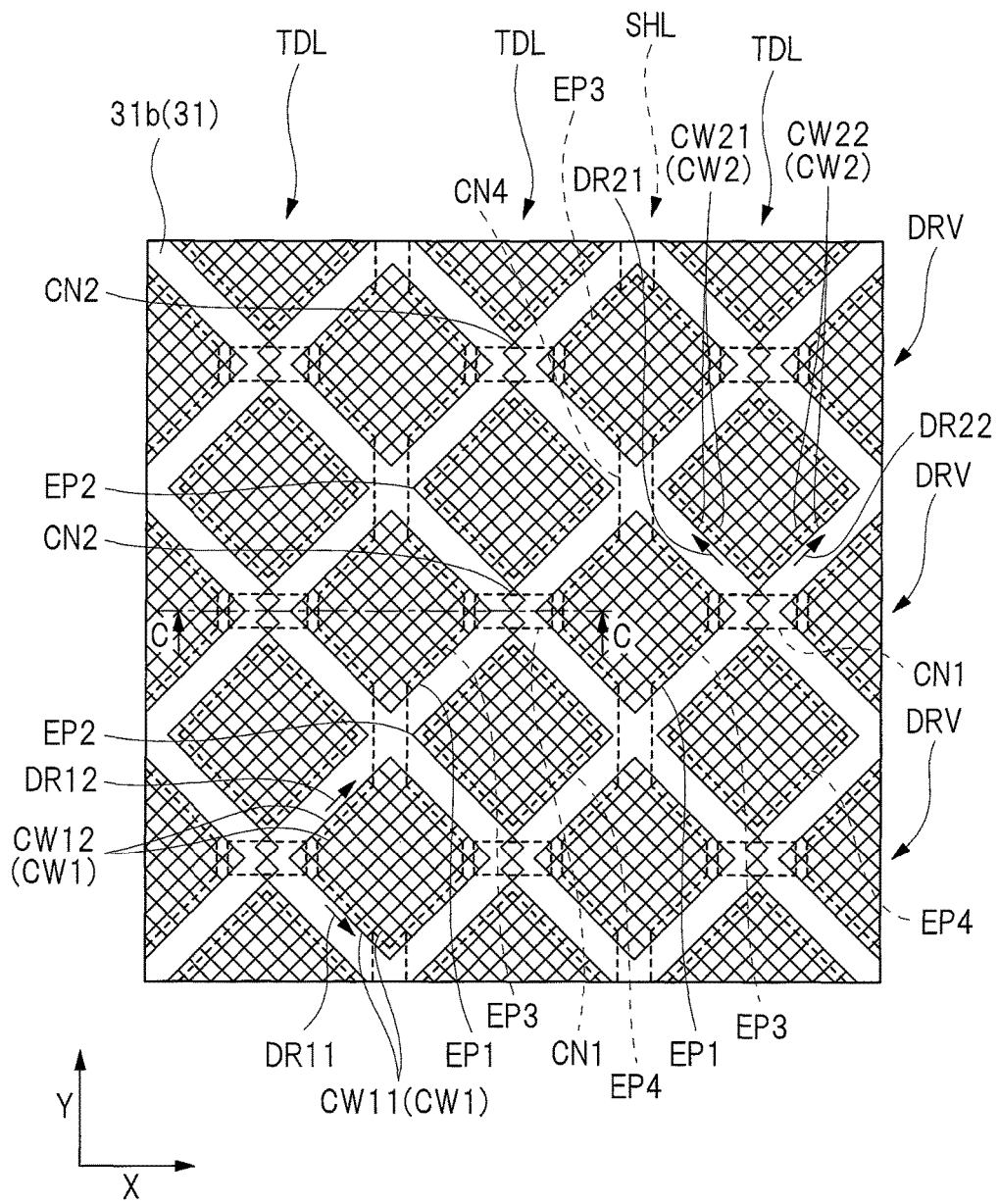
FIG. 43 is a plan view illustrating a drive electrode and a detection electrode for touch detection in a third modification example of the second embodiment.
Figure 44:
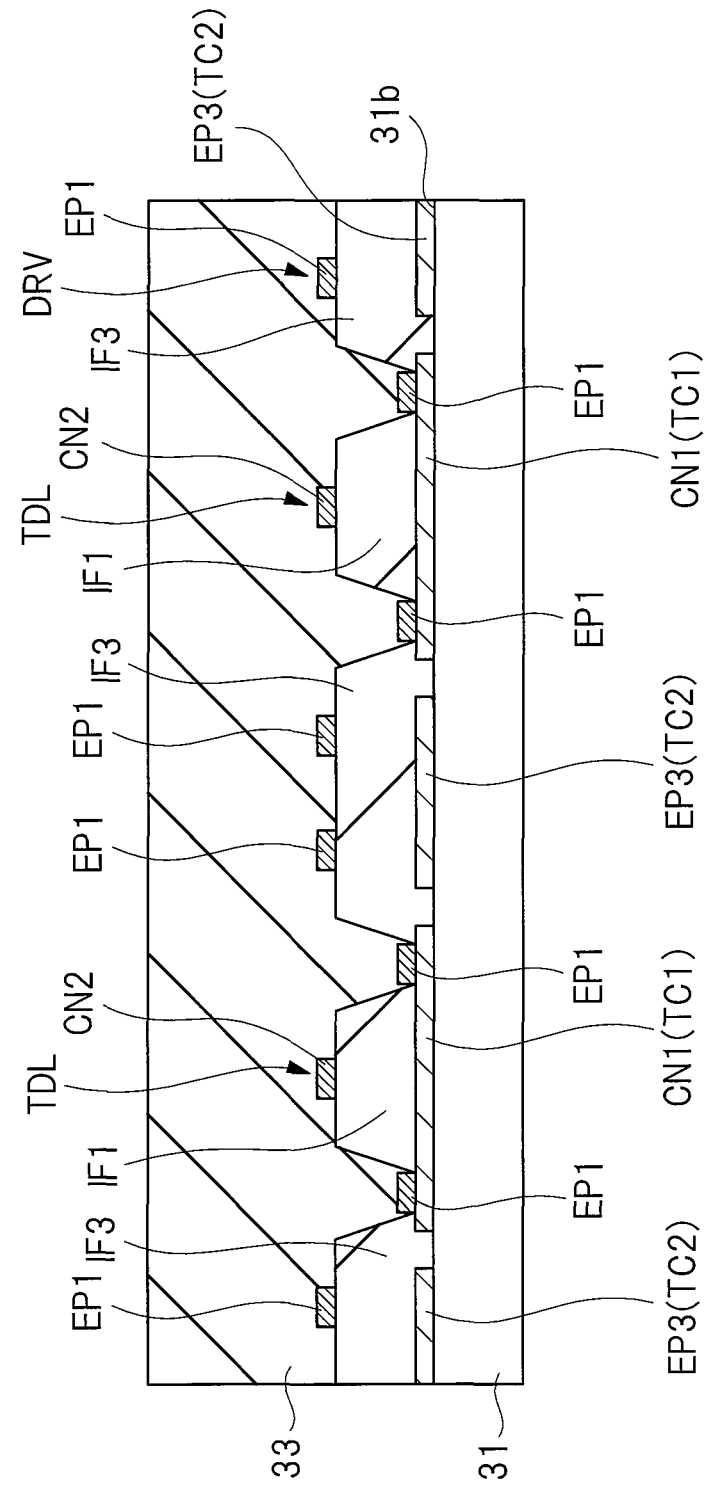
FIG. 44 is a cross-sectional view illustrating the drive electrode and the detection electrode for touch detection in the third modification example of the second embodiment.

FIG. 43 is a plan view illustrating a drive electrode and a detection electrode for touch detection in the third modification example of the second embodiment. FIG. 44 is a cross-sectional view illustrating the drive electrode and the detection electrode for touch detection in the third modification example of the second embodiment. FIG. 44 is the cross-sectional view taken along a line C-C of FIG. 43.

In the third modification example, the insulating film IF3 is formed between any one of the plurality of electrode portions EP1 included in each of the plurality of drive electrodes DRV, and the upper surface 31b of the substrate 31, as illustrated in FIG. 44. The insulating film IF3 is composed of the same material as that of the insulating film IF1. It is possible to form the insulating film IF3 using the photolithography, as with the insulating film IF1, or through the ink-jet method or the electric field jet method.

In addition, the electrode portion EP3 is formed between the insulating film IF3 and the upper surface 31b of the substrate 31, as illustrated in FIG. 44, in the third modification example. The electrode portion EP3 is not electrically connected to the connection portion CN1, and further, is not electrically connected to the electrode portion EP1, either. The electrode portion EP3 is composed of a transparent conductive film TC2.

In addition, the two electrode portions EP3, which are adjacent to each other in the Y-axis direction, may be electrically connected with each other via a connection portion CN4 in the third modification example. The two electrode portions EP3 and the connection portion CN4 may be formed in an integrated manner, and may be composed of the transparent conductive film as with the connection portion CN1. Accordingly, it is possible to form an electrode SHL. The electrode SHL is formed of a plurality of the electrode portions EP3 which are arranged with an interval in the Y-axis direction, and of a plurality of the connection portions CN4 each of which electrically connects the two electrode portions EP3 adjacent to each other in the Y-axis direction. Thus, when the electrode SHL is used as a shield electrode for active shield, it is possible to reduce the influence of noise from the liquid crystal display device at the time of touch detection, thereby making it possible to improve the detection sensitivity of touch detection in the touch detection device, as will be described with reference to FIGS. 45 and 46 to be described later, for example.

Incidentally, a fixed potential may be supplied to the electrode SHL by allowing the electrode SHL to be connected to an external circuit that supplies the fixed potential. Alternatively, a potential of the electrode SHL may be equal to a ground potential by allowing the electrode SHL to be grounded. Alternatively, the electrode SHL may be in an electrically floating state, that is, in a floating state without being connected to the external circuit.

Alternatively, each of the plurality of electrode portions EP3 may be in an electrically floating state, that is, in a floating state, and the two electrode portions EP3, which are adjacent to each other in the Y-axis direction, may not be electrically connected with each other via the connection portion CN4.

In all the above-described cases, it is possible to adjust the distribution of the electric field around the electrode portion EP1, to increase the capacitance between the drive electrode DRV and the detection electrode TDL in the mutual capacitance system, and to increase the capacitance of the drive electrode DRV or the detection electrode TDL in the self-capacitance system. Thus, it is possible to improve the detection sensitivity of touch detection in the touch detection device.

Figure 45:
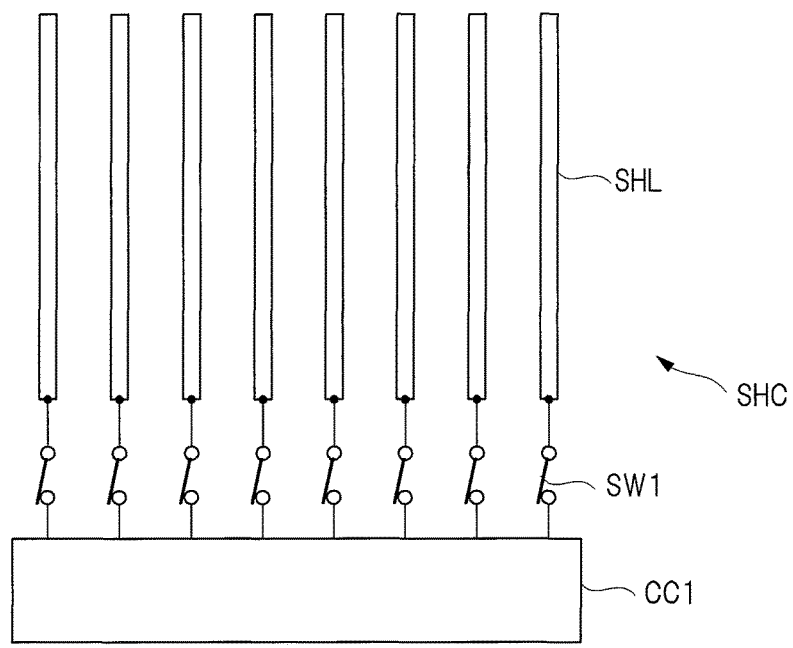
FIG. 45 is a diagram for describing an active shield in the third modification example of the second embodiment.
Figure 46:
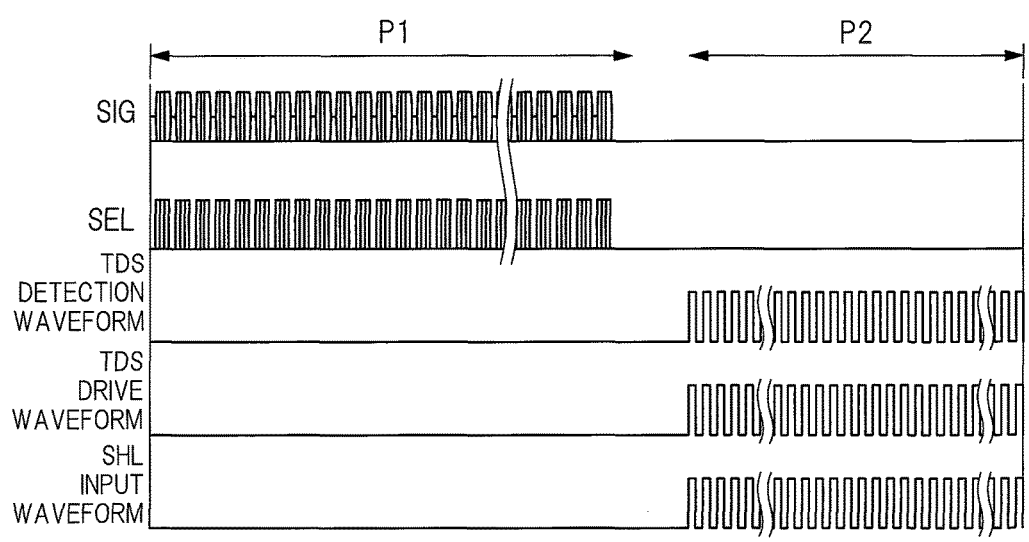
FIG. 46 is a diagram for describing an active shield in the third modification example of the second embodiment.

FIGS. 45 and 46 are diagrams for describing the active shield in the third modification example of the second embodiment.

Incidentally, a description will be given regarding the active shield at the time of touch detection in the self-capacitance system hereinafter, but the active shield at the time of touch detection in the mutual capacitance system can also be performed in the same manner.

As illustrated in FIG. 45, a shield circuit SHC to perform the active shield includes a shield waveform application circuit CC1, the electrode SHL, and a switch SW1 that connects the electrode SHL and the shield waveform application circuit CC1.

In the self-capacitance system, first, an operation to output a video signal SIG for each of colors, in response to a signal SEL to select three colors of RGB, is executed for the entire display row, in a period P1 illustrated in FIG. 46, thereby displaying a video of one frame.

Next, a touch detection operation of the self-capacitance system is executed by inputting a drive waveform to the plurality of detection electrodes TDS (see FIGS. 9 and 10), which is formed of the plurality of drive electrodes DRV and the plurality of detection electrodes TDL, in a period P2 illustrated in FIG. 46. At this time, the switch SW1 is set to a closed state, that is, a conduction state, so as to electrically connect the electrode SHL and the shield waveform application circuit CC with each other, as illustrated in FIG. 45, at the time of executing the touch detection operation in the period P2. Further, the same waveform, which is synchronized with the drive waveform to drive each of the plurality of detection electrodes TDS formed of the plurality of drive electrodes DRV and the plurality of detection electrodes TDL, is input to the electrode SHL, as illustrated in FIG. 46.

In other words, a signal having the same potential or the same phase as the signal to be input to the detection electrode TDS (see FIG. 9 and FIG. 10) is input to the electrode SHL in the period P2 in which the touch detection operation is executed. That is, when a signal (a TDS drive waveform in FIG. 46) is input to the detection electrode TDS provided on the upper surface 31b of the substrate 31 in the display provided with the input device of the self-capacitance system, a signal (an SHL input waveform in FIG. 46) having the same potential or the same phase is input to the electrode SHL.

In other words, when the signal for touch detection is input to any one of the plurality of electrode portions EP1, the signal for the active shield having the same potential or the same phase as the signal for touch detection is input to the electrode portion EP3 formed below any one of the electrode portions EP1 via the insulating film IF3.

Accordingly, it is possible to reduce a parasitic capacitance between the detection electrode TDS and a part around the detection electrode TDS. Thus, it is possible to improve the responsiveness of the signal (the TDS drive waveform in FIG. 46), which is input to the detection electrode TDS, thereby making it possible to improve the touch detection speed. Alternatively, it is possible to improve the touch detection sensitivity as a noise signal, that is, noise is reduced in a signal (a TDS detection waveform in FIG. 46) which is detected in the detection electrode TDS.

Incidentally, an electrode to apply a shield waveform is not limited to the electrode SHL, in the case of performing the active shield at the time of touch detection in the self-capacitance system. Accordingly, for example, the shield waveform may be applied to any one of the drive electrode COML, the signal line SGL, the scan line GCL, the dummy electrode (not illustrated), the routing wiring (not illustrated) formed in the surrounding area As, and the other various types of portions having conductivity. In this case, it is also possible to reduce the parasitic capacitance between the detection electrode TDS and the part around the detection electrode TDS, thereby making it possible to improve the touch detection speed, and to improve the touch detection sensitivity.

Incidentally, although the description has been given in the above-described example regarding a case where the active shield is applied to the display provided with the input device of the self-capacitance system, the above-described active shield can be applied also to a display provided with an input device of the mutual capacitance system.

Third Embodiment

The description has been given in the first embodiment regarding the example in which the touch panel serving as the input device is provided onto the counter substrate 3 of the liquid crystal display, and further, is applied to the touch detection function-equipped liquid crystal display of the on-cell type in which the drive electrode COML of the display has no function as the drive electrode of the input device. On the other hand, a description will be given in a third embodiment regarding an example in which a touch panel serving as an input device is applied to an input device which can be used as a touch detection function-equipped liquid crystal display by externally mounting the touch panel to a display plane side of the liquid crystal display.

Incidentally, the input device according to the third embodiment can be externally mounted to each display plane side of various types of displays such as the liquid crystal display, and the organic EL display.

<Input Device>

Figure 47:
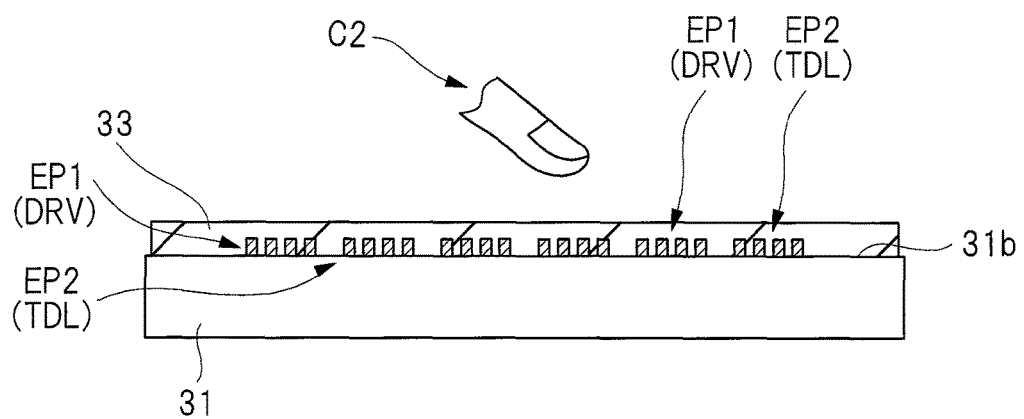
FIG. 47 is a cross-sectional view illustrating an input device according to the third embodiment.

FIG. 47 is a cross-sectional view illustrating the input device according to the third embodiment. In the example illustrated in FIG. 47, the input device has substantially the same configuration as that of the substrate 31, the protective film 33, and a part between the substrate 31 and the protective film 33 in the touch detection function-equipped display device illustrated in FIG. 6.

As illustrated in FIG. 47, the input device according to the third embodiment includes the plurality of drive electrodes DRV and the plurality of detection electrodes TDL, which are provided on the upper surface 31b of the substrate 31, and the protective film 33. In addition, as with the first embodiment, each of the plurality of drive electrodes DRV includes the plurality of electrode portions EP1 and the plurality of connection portions CN1 (see FIG. 11), and each of the plurality of detection electrodes TDL includes the plurality of electrode portions EP2 and the plurality of connection portions CN2 (see FIG. 11), also in the third embodiment.

As with the input device provided in the display according to the first embodiment, the input device according to the third embodiment also has each of the plurality of electrode portions EP1 and the plurality of electrode portions EP2 containing metal or alloy as the main component and having the mesh shape, and thus, the input device according to the third embodiment has the same effect as that of the display according to the first embodiment.

In addition, an input device, which is provided in each display in the modification examples of the first embodiment, in the second embodiment, and in the modification examples of the second embodiment, can be applied, as the modification example of the input device according to the third embodiment.

As described above, the invention by the inventors has been specifically explained according to the embodiments, however, it is obvious that the invention is not limited to the embodiments and various changes may be made without departing from the scope of the invention.

Further, in the foregoing embodiments, the cases of a liquid crystal display have been illustrated as disclosure examples, but all kinds of flat-panel displays such as an organic EL display, other self-luminous type displays and electronic paper displays having electrophoresis elements may be listed as other application examples. Further, it goes without saying that the present invention is applicable to small, medium and large sized devices without any particular limitation.

In the category of the idea of the present invention, a person with ordinary skill in the art can conceive various modification examples and revised examples, and such modification examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is effective when applied to a display, an input device, and a manufacturing method of the display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An input device comprising:
   a substrate having a first main surface and a second main surface on an opposite side of the first main surface; and
   a plurality of first electrodes and a plurality of second electrodes which are provided on the second main surface of the substrate,
   wherein each of the plurality of first electrodes is provided along a first direction and is arranged with an interval in a second direction intersecting with the first direction in a planar view,
   wherein each of the plurality of second electrodes is provided along the second direction and is arranged with an interval in the first direction in a planar view,
   wherein each of the plurality of first electrodes includes:
      a plurality of first electrode portions which are arranged with an interval in the first direction in a planar view; and
      a plurality of first connection portions each of which electrically connects the two first electrode portions adjacent to each other in the first direction,
   wherein each of the plurality of second electrodes includes:
      a plurality of second electrode portions which are arranged with an interval in the second direction in a planar view; and
      a plurality of second connection portions each of which electrically connects the two second electrode portions adjacent to each other in the second direction,
   wherein any one of the plurality of first connection portions overlaps with any one of the plurality of second connection portions in a planar view,
   wherein each of the plurality of first electrode portions contains metal or alloy, and has a mesh shape,
   wherein each of the plurality of second electrode portions contains metal or alloy, and has a mesh shape,
   wherein the plurality of first electrode portions, and the plurality of second electrode portions and the plurality of second connection portions are formed on the same second main surface of the substrate,
   wherein each of the plurality of first connection portions is composed of a first transparent conductive film,
   wherein each of the plurality of second connection portions is composed of a first light-shielding film containing metal or alloy,
   wherein a first insulating film covers the first electrode portions, the second electrode portions, and any one of the second connection portions,
   wherein the plurality of first connection portions respectively covers the first insulating film that is provided on the second connection portions, and
   wherein each of the first connection portions covers any one of the first electrode portions at a portion where a corresponding first electrode portion contacts a corresponding first connection portion.

2. The input device according to claim 1,
   wherein each of the first electrode portion and the second electrode portion has a light shielding property.

3. The input device according to claim 1, further comprising:
   a second insulating film which covers any one of the plurality of first electrode portions; and
   a third electrode portion that is formed on any one of the first electrode portions via the second insulating film,
   wherein the third electrode portion is composed of a second transparent conductive film.

4. The input device according to claim 3,
   wherein the third electrode portion is in an electrically floating state.

5. The input device according to claim 3,
   wherein an input position is detected using a detection value of the first electrode based on a first signal which is a drive signal for touch detection, and
   wherein a second signal having a same potential or a same phase as the first signal is input to the third electrode portion when the first signal is input to any one of the first electrode portion and the second electrode portion.

6. The input device according to claim 1,
   wherein each of the plurality of first electrodes includes a plurality of first terminal portions each of which is electrically connected to each of the plurality of first electrode portions,
   wherein each of the plurality of first electrode portions has a mesh shape which is formed of a plurality of first conductive lines and a plurality of second conductive lines intersecting with each other,
   wherein each of the plurality of first connection portions electrically connects the two first terminal portions which are electrically connected respectively to the two first electrode portions, and
   wherein a first width of the first terminal portion in the first direction is wider than a second width of the first conductive line in the first direction and a third width of the second conductive line in the first direction.

* * * * *